(12) United States Patent
Lee et al.

(10) Patent No.: US 10,531,113 B2
(45) Date of Patent: Jan. 7, 2020

(54) METHOD AND DEVICE FOR ENCODING/DECODING MOTION VECTOR

(71) Applicant: SAMSUNG ELECTRONICS CO., LTD., Suwon-si (KR)

(72) Inventors: Jin-young Lee, Suwon-si (KR); Seung-soo Jeong, Seoul (KR); Jung-hye Min, Yongin-si (KR); Sun-il Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/523,180

(22) PCT Filed: Nov. 2, 2015

(86) PCT No.: PCT/KR2015/011647
§ 371 (c)(1),
(2) Date: Apr. 28, 2017

(87) PCT Pub. No.: WO2016/068674
PCT Pub. Date: May 6, 2016

(65) Prior Publication Data
US 2017/0339426 A1    Nov. 23, 2017

Related U.S. Application Data

(60) Provisional application No. 62/073,326, filed on Oct. 31, 2014.

(51) Int. Cl.
*H04N 11/02*      (2006.01)
*H04N 19/52*      (2014.01)
(Continued)

(52) U.S. Cl.
CPC .......... *H04N 19/52* (2014.11); *H04N 19/176* (2014.11); *H04N 19/182* (2014.11); *H04N 19/51* (2014.11); *H04N 19/70* (2014.11)

(58) Field of Classification Search
CPC ....................................................... H04N 19/52
(Continued)

(56) References Cited

U.S. PATENT DOCUMENTS 5,587,741 A * 12/1996 Kim ...................... H04N 19/53
                                                              348/699
6,483,928 B1 * 11/2002 Bagni ................... H04N 19/56
                                                              375/E7.107
(Continued)

FOREIGN PATENT DOCUMENTS

CN           1550110 A      11/2004
CN         101990097 A       3/2011
(Continued)

OTHER PUBLICATIONS

Communication dated Feb. 24, 2016 issued by the International Searching Authority in counterpart International Application PCT/KR2015/011647 (PCT/ISA/220/210/237).
(Continued)

*Primary Examiner* — Leron Beck
(74) *Attorney, Agent, or Firm* — Sughrue Mion, PLLC

(57) ABSTRACT

A motion vector encoding apparatus includes: a predictor configured to obtain motion vector predictor candidates of a plurality of predetermined motion vector resolutions by using a spatial candidate block and a temporal candidate block of a current block, and to determine motion vector predictor of the current block, a motion vector of the current block, and a motion vector resolution of the current block by using the motion vector predictor candidates; and an encoder configured to encode information representing the motion vector predictor of the current block, a residual motion vector between the motion vector of the current block and the motion vector predictor of the current block, and information representing the motion vector resolution of the current block, wherein the plurality of predetermined motion
(Continued)

vector resolutions include a resolution of a pixel unit that is greater than a resolution of one-pel unit.

20 Claims, 30 Drawing Sheets

(51) Int. Cl.
    *H04N 19/176* (2014.01)
    *H04N 19/70* (2014.01)
    *H04N 19/182* (2014.01)
    *H04N 19/51* (2014.01)
(58) Field of Classification Search
    USPC .................................. 375/240.01–240.29
    See application file for complete search history.

(56) References Cited

U.S. PATENT DOCUMENTS

| | | | |
|---|---|---|---|
| 8,537,896 B2 | 9/2013 | Tanaka et al. | |
| 9,154,806 B2 | 10/2015 | Kim et al. | |
| 9,319,657 B2* | 4/2016 | Kang | H04N 19/105 |
| 9,491,480 B2* | 11/2016 | Lim | H04N 19/523 |
| 2004/0114688 A1* | 6/2004 | Kang | H04N 19/53 |
| | | | 375/240.12 |
| 2004/0240550 A1 | 12/2004 | Suzuki | |
| 2005/0013498 A1* | 1/2005 | Srinivasan | H04N 19/51 |
| | | | 382/239 |
| 2007/0217513 A1* | 9/2007 | Lopez | H04N 19/63 |
| | | | 375/240.16 |
| 2008/0175322 A1* | 7/2008 | Lee | H04N 19/139 |
| | | | 375/240.16 |
| 2011/0026597 A1* | 2/2011 | Tanaka | H04N 19/61 |
| | | | 375/240.16 |
| 2011/0170608 A1* | 7/2011 | Shi | H04N 19/147 |
| | | | 375/240.24 |
| 2011/0206125 A1* | 8/2011 | Chien | H04N 19/52 |
| | | | 375/240.16 |
| 2012/0051431 A1* | 3/2012 | Chien | H04N 19/105 |
| | | | 375/240.16 |
| 2012/0093226 A1 | 4/2012 | Chien et al. | |
| 2012/0183056 A1* | 7/2012 | He | H04N 19/33 |
| | | | 375/240.12 |
| 2012/0269270 A1* | 10/2012 | Chen | H04N 19/597 |
| | | | 375/240.16 |
| 2012/0314771 A1* | 12/2012 | Lim | H04N 19/117 |
| | | | 375/240.16 |
| 2013/0177084 A1* | 7/2013 | Wang | H04N 19/176 |
| | | | 375/240.16 |
| 2013/0188715 A1* | 7/2013 | Seregin | H04N 19/52 |
| | | | 375/240.16 |
| 2013/0202047 A1* | 8/2013 | Song | H04N 19/52 |
| | | | 375/240.16 |
| 2013/0272377 A1* | 10/2013 | Karczewicz | H03M 7/30 |
| | | | 375/240.02 |
| 2013/0294518 A1* | 11/2013 | Lim | H04N 19/52 |
| | | | 375/240.16 |
| 2013/0335522 A1* | 12/2013 | Zhang | H04N 19/597 |
| | | | 348/43 |
| 2014/0003522 A1* | 1/2014 | Park | H04N 19/105 |
| | | | 375/240.16 |
| 2014/0341284 A1 | 11/2014 | Kim et al. | |

FOREIGN PATENT DOCUMENTS

| | | |
|---|---|---|
| EP | 0 609 022 A2 | 8/1994 |
| EP | 1 469 682 A1 | 10/2004 |
| EP | 3203743 A1 | 8/2017 |
| JP | 7-240927 A | 9/1995 |
| JP | 2006-187025 A | 7/2006 |
| KR | 1994-0019160 A | 8/1994 |
| KR | 10-2005-0074151 A | 7/2005 |
| KR | 10-2007-0108571 A | 11/2007 |
| KR | 10-2012-0080552 A | 7/2012 |
| KR | 10-2013-0063285 A | 6/2013 |
| KR | 10-2014-0075661 A | 6/2014 |
| KR | 10-2014-0110806 A | 9/2014 |
| WO | 03/063503 A1 | 10/2019 |

OTHER PUBLICATIONS

You Zhou et al; "RCE1: Subtest 1—Motion Vector Resolution Control"; Joint Collaborative Team on Video Coding (JCT-VC) of ITU-T SG 16 WP 3 and ISO/IEC JTC 1/SC 29/WG 11 17th Meeting: Valencia, ES, Mar. 27-Apr. 4, 2014; Document: JCTVC-Q0155; 5 pgs. total.

Xiang Li et al; "RCE1.2 Adaptive MV Precision"; Joint Collaborative Team on Video Coding (JCT-VC) of ITU-T SG 16 WP 3 and ISO/IEC JTC 1/SC 29/WG 11 17th Meeting: Valencia, ES, Mar. 27-Apr. 4, 2014; Document: JCTVC-Q0049; 4 pgs. total.

Guillaume Laroche et al; "Non-RCE1: On MV resolution and motion vector predictor number"; Joint Collaborative Team on Video Coding (JCT-VC) of ITU-T SG 16 WP 3 and ISO/IEC JTC 1/SC 29/WG 11 17th Meeting: Valencia, ES, Mar. 27-Apr. 4, 2014; Document: JCTVC-Q0067; 5 pgs. total.

Lim, et al., "Description of video coding technology proposal by SK telecom, Sejong Univ. and Sungkyunkwan Univ.", Joint Collaborative Team on Video Coding (JCT-VC) of ITU-T SG16 WP3 and ISO/IEC JTC1/SC29/WG11, Apr. 2010, JCTVC-A113, 41 pages total, XP 030007551.

Lim, et al., "Description of video coding technology proposal", 2010, SK telecom, Sejong University and Sungkyunkwan University, Joint Collaborative Team on Video Coding (JCT-VC) of ITU-T SG16 WP3 and ISO/IEC JTC1/SC29/WG11, 2010, JCTVC-A113, 18 pages total, XP 030007552.

Karczewicz, et al., "Video coding technology proposal by Qualcomm Inc.", May 2010, Joint Collaborative Team on Video Coding (JCT-VC) of ITU-T SG16 WP3 and ISO/IEC JTC1/SC29/WG11, JCTVC-A121, 25 pages total, XP 030007567.

Laroche, et al., "RD Optimized Coding for Motion Vector Predictor Selection", Sep. 2008, IEEE Transactions on Circuits and Systems for Video Technology, vol. 18, Issue No. 9, pp. 1247-1257, XP 011231739.

Communication dated Sep. 5, 2017, issued by the European Patent Office in counterpart European Patent Application No. 15855617.5.

Communication dated Jun. 19, 2019, from the State Intellectual Property Office of People's Republic of China in counterpart Application No. 201580068110.4.

Communication dated Oct. 23, 2019, issued by the Japanese Patent Office in counterpart Japanese Application No. 2017-523511.

* cited by examiner

FIG. 3A

1/4-PEL UNIT

1/2-PEL UNIT

1-PEL UNIT

2-PEL UNIT

FIG. 5B

```
prediction_unit( x0, y0, nPbW, nPbH) {
    parsedMVResolution= 0                              ── 510
    mv_resolution_idx = 0                              ── 512
    if( cu_skip_flag[x0][y0] ) {
        if( MaxNumMergeCand> 1 )
            merge_idx [x0][y0]
    } else { /* MODE_INTER */
        merge_flag[x0][y0]
        if(merge_flag[x0][y0]) {
            if( MaxNumMergeCand> 1 )
                merge_idx [x0][y0]
        } else {                                       ── 513
            if( !parsedMotionVectorResolution) {       ── 514
                cu_resolution_idx[x0][y0]              ── 516
                parsedMVResolution= 1                  ── 518
                mv_resolution_idx= cu_resolution_idx[x0][y0]  ── 520
            }
            ...
        }
    }
}
```

FIG. 5C

```
prediction_unit( x0, y0, nPbW, nPbH) {
  if( cu_skip_flag[x0][y0] ) {
    if( MaxNumMergeCand> 1 )
      merge_idx [x0][y0]
  } else { /* MODE_INTER */
    merge_flag[x0][y0]
    if(merge_flag[x0][y0]) {
      if( MaxNumMergeCand> 1 )
        merge_idx [x0][y0]
    } else {
      cu_resolution_idx[x0][y0]                    ──524
      ...
    }
  }
}
```

FIG. 5D

```
prediction_unit( x0, y0, nPbW, nPbH) {
  cu_resolution_idx[x0][y0]                        ── 534
  if( cu_skip_flag[x0][y0] ) {
    if( MaxNumMergeCand> 1 )
      merge_idx [x0][y0]
  } else { /* MODE_INTER */
    merge_flag[x0][y0]
    if(merge_flag[x0][y0]) {
      if( MaxNumMergeCand> 1 )
        merge_idx [x0][y0]
    } else {
      ...
    }
  }
}
```

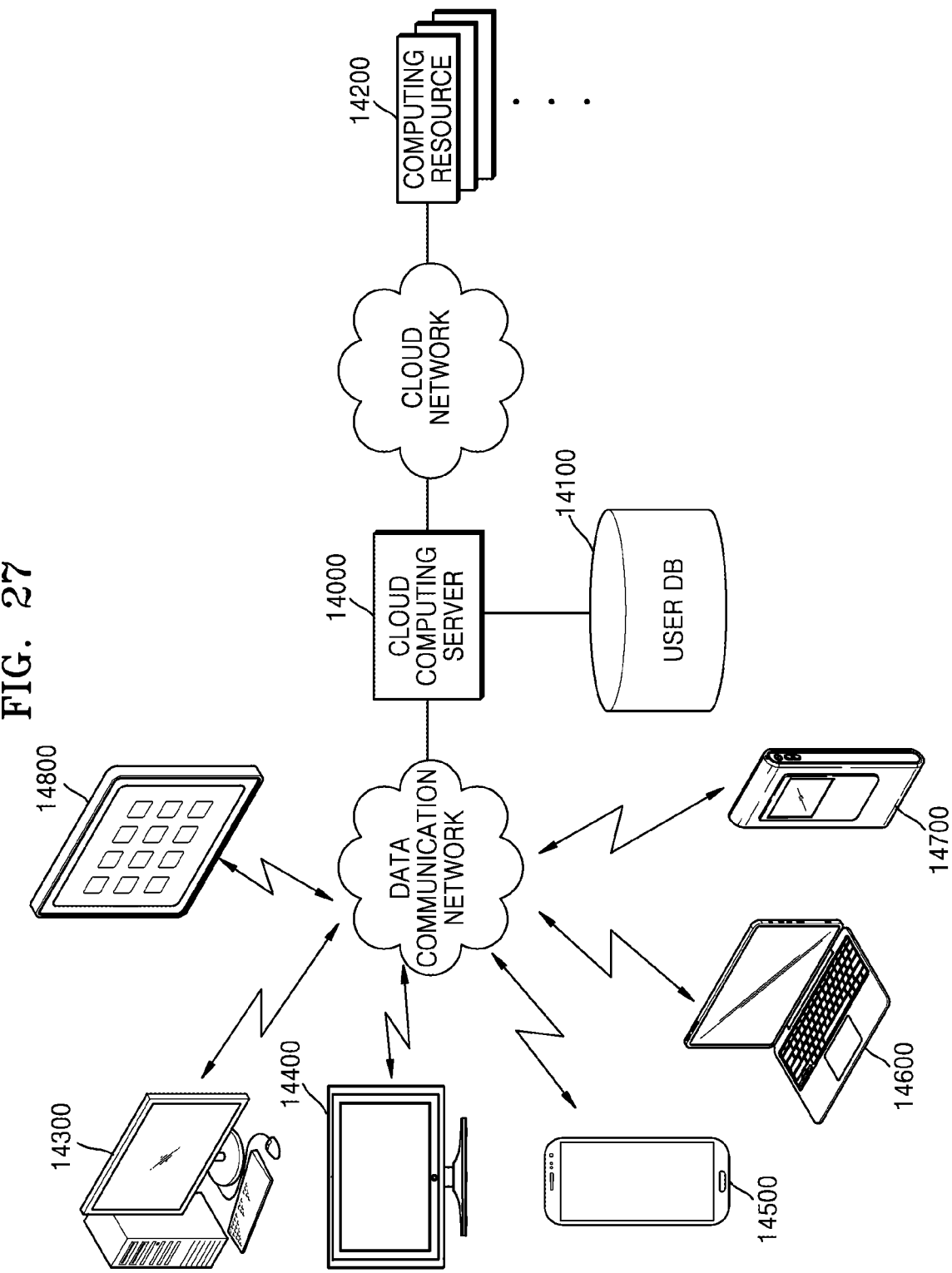

METHOD AND DEVICE FOR ENCODING/DECODING MOTION VECTOR

TECHNICAL FIELD

The present disclosure relates to video encoding and decoding methods, and more particularly, to methods and apparatuses for encoding and decoding a motion vector of a video image by predicting the motion vector.

BACKGROUND ART

In a codec such as H.264 advanced video coding (AVC) and high efficiency video coding (HEVC), motion vectors of blocks that are previously encoded and adjacent to a current block or co-located blocks in a previously encoded picture may be used for motion vector predictor of the current block in order to predict a motion vector of the current block.

In video encoding and decoding methods, in order to encode an image, one picture may be split into macro blocks and each of the macro blocks may be prediction encoded by using inter prediction or intra prediction.

Inter prediction is a method of compressing an image by removing temporal redundancy among pictures, and motion estimation encoding is a representative example of the inter prediction. In the motion estimation encoding, each of blocks in a current picture is predicted by using at least one reference picture. A reference block that is the most similar to the current block is searched for within a predetermined search range by using a predetermined evaluation function.

The current block is predicted based on the reference block, and a residual block that is obtained by subtracting a prediction block generated through the prediction from the current block is encoded. Here, in order to precisely perform the prediction, interpolation is performed on the search range of the reference picture to generate sub-pel-unit pixels smaller than integer-pel-unit pixels, and inter prediction is performed on the generated sub-pel-unit pixels.

DETAILED DESCRIPTION OF THE INVENTION

Advantageous Effects

According to motion vector decoding and encoding apparatuses and methods of the present disclosure, optimal motion vector predictor and resolution of a motion vector may be determined in order to efficiently encode or decode video, and a complexity of an apparatus may be reduced.

It will be appreciated by one of ordinary skill in the art that that the objectives and effects that may be achieved with the present disclosure are not limited to what has been particularly described above and other objectives of the present disclosure will be more clearly understood from the following detailed description.

DESCRIPTION OF THE DRAWINGS

FIG. 3A is a diagram showing interpolation for performing motion compensation based on various resolutions.

FIG. 5B shows a part of a prediction_unit syntax according to an embodiment for transferring a motion vector resolution that has been adaptively determined.

FIG. 5C shows a part of a prediction_unit syntax according to another embodiment for transferring a motion vector resolution that has been adaptively determined.

FIG. 5D shows a part of a prediction_unit syntax according to another embodiment for transferring a motion vector resolution that has been adaptively determined.

FIG. 27 illustrates a network structure of a cloud computing system using the video encoding apparatus and the video decoding apparatus, according to an embodiment.

BEST MODE

Figure 1A:
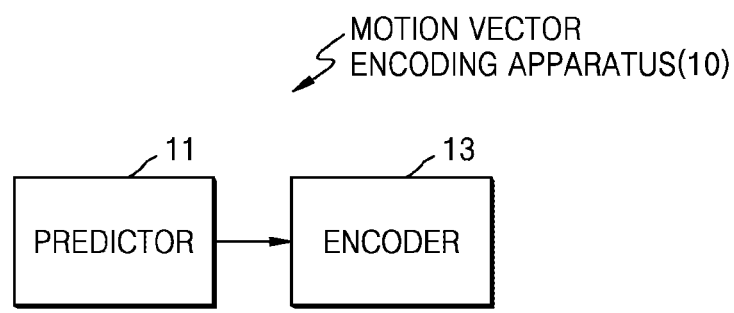
FIG. 1A is a block diagram of an apparatus for encoding a motion vector, according to an embodiment.

According to an aspect of the present disclosure, a motion vector encoding apparatus includes: a predictor configured to obtain motion vector predictor candidates of a plurality of predetermined motion vector resolutions by using a spatial candidate block and a temporal candidate block of a current block, and to determine motion vector predictor of the current block, a motion vector of the current block, and a motion vector resolution of the current block by using the motion vector predictor candidates; and an encoder configured to encode information representing the motion vector predictor of the current block, a residual motion vector between the motion vector of the current block and the motion vector predictor of the current block, and information representing the motion vector resolution of the current block, wherein the plurality of predetermined motion vector resolutions include a resolution of a pixel unit that is greater than a resolution of one-pel unit.

The predictor may perform searching in a reference block in pixel units of a first motion vector resolution by using a set of first motion vector candidates including one or more motion vector predictor candidates selected from the motion vector predictor candidates, and may perform searching in the reference block in pixel units of a second motion vector resolution by using a set of second motion vector candidates including one or more motion vector predictor candidates selected from the motion vector predictor candidates, wherein the first motion vector resolution and the second motion vector resolution may be different from each other, and the set of the first motion vector predictor candidates and the set of the second motion vector predictor candidates may be obtained from candidate blocks that are different from each other from among candidate blocks included in the spatial candidate block and the temporal candidate block.

The predictor may perform searching in a reference block in pixel units of a first motion vector resolution by using a set of first motion vector candidates including one or more motion vector predictor candidates selected from the motion vector predictor candidates, and may perform searching in the reference block in pixel units of a second motion vector resolution by using a set of second motion vector candidates including one or more motion vector predictor candidates selected from the motion vector predictor candidates, wherein the first motion vector resolution and the second motion vector resolution may be different from each other, and the set of the first motion vector predictor candidates and the set of the second motion vector predictor candidates may include different numbers of motion vector predictors from each other.

When a pixel unit of the resolution of a motion vector of the current block is greater than a pixel unit of a minimum motion vector resolution, the encoder may down-scale the residual motion vector according to the resolution of the motion vector of the current block to encode the residual motion vector.

When the current block is a current block coding unit of an image, a motion vector resolution is equally determined with respect to each coding unit, and there is a prediction unit that is predicted in an advanced motion vector prediction (AMVP) mode in the current coding unit, the encoder may encode the information indicating a motion vector resolution of the prediction unit predicted in the AMVP mode as information representing the motion vector resolution of the current block.

When the current block is a current block coding unit of an image, a motion vector resolution is equally determined with respect to each prediction unit, and there is a prediction unit that is predicted in an advanced motion vector prediction (AMVP) mode in the current coding unit, the encoder may encode information representing a motion vector resolution for each prediction unit predicted in the AMVP mode in the current block, as information representing the motion vector resolution of the current block.

According to an aspect of the present disclosure, a motion vector encoding apparatus includes: a predictor configured to obtain motion vector predictor candidates of a plurality of predetermined motion vector resolutions by using a spatial candidate block and a temporal candidate block of a current block, and to determine motion vector predictor of the current block, a motion vector of the current block, and a motion vector resolution of the current block by using the motion vector predictor candidates; and an encoder configured to encode information representing the motion vector predictor of the current block, a residual motion vector between a motion vector of the current block and the motion vector predictor of the current block, and information representing the motion vector resolution of the current block, wherein the predictor performs searching in a reference block in pixel units of a first motion vector resolution by using a set of first motion vector candidates including one or more motion vector predictor candidates selected from the motion vector predictor candidates, and performs searching in the reference block in pixel units of a second motion vector resolution by using a set of second motion vector candidates including one or more motion vector predictor candidates selected from the motion vector predictor candidates, wherein the first motion vector resolution and the second motion vector resolution are different from each other, and the set of the first motion vector predictor candidates and the set of the second motion vector predictor candidates are obtained from candidate blocks that are different from each other from among candidate blocks included in the spatial candidate block and the temporal candidate block or include different numbers of motion vector predictor candidates from each other.

According to an aspect of the present disclosure, a motion vector encoding apparatus is configured to: generate a merge candidate list including at least one merge candidate with respect to a current block, and determine and encode a motion vector of the current block by using a motion vector of one of the at least one merge candidate included in the merge candidate list, wherein the merge candidate list includes a motion vector obtained by down-scaling a motion vector of the at least one merge candidate included in the merge candidate list according to a plurality of predetermined motion vector resolutions.

The down-scaling may include selecting one of peripheral pixels around a pixel indicated by a motion vector of the minimum motion vector resolution based on the resolution of the motion vector of the current block, instead of a pixel indicated by the motion vector of the minimum motion vector resolution, and adjusting the motion vector of the minimum motion vector resolution to indicate the selected pixel.

According to an aspect of the present disclosure, a motion vector decoding apparatus includes: an obtainer configured to obtain motion vector predictor candidates of a plurality of predetermined motion vector resolutions by using a spatial candidate block and a temporal candidate block of a current block, to obtain information representing motion vector predictor of the current block from among the motion vector predictor candidates, and to obtain a residual motion vector between a motion vector of the current block and the motion vector predictor of the current block and information representing a motion vector resolution of the current block; and a decoder configured to reconstruct the motion vector of the current block based on the residual motion vector, the information representing the motion vector predictor of the current block, and motion vector resolution information of the current block, wherein the plurality of predetermined motion vector resolutions include a resolution of a pixel unit that is greater than a resolution of one-pel unit.

The motion vector predictor candidates of the plurality of predetermined motion vector resolutions may include a set of first motion vector predictor candidates including one or more motion vector predictor candidates of a first motion vector resolution and a set of second motion vector predictor candidates including one or more motion vector predictor candidates of a second motion vector resolution, wherein the first motion vector resolution and the second motion vector resolution may be different from each other, and the set of the first motion vector predictor candidates and the set of the second motion vector predictor candidates may be obtained from candidate blocks that are different from each other from among candidate blocks included in the spatial candidate block and the temporal candidate block or include different numbers of motion vector predictor candidates from each other.

When a pixel unit of the resolution of the motion vector of the current block is greater than a pixel unit of a minimum motion vector resolution, the decoder may up-scale the residual motion vector according to the minimum motion vector resolution to reconstruct the residual motion vector.

When the current block is a current block coding unit of an image, a motion vector resolution is equally determined with respect to each coding unit, and there is a prediction unit that is predicted in an advanced motion vector prediction (AMVP) mode in the current coding unit, the obtainer may obtain information representing the motion vector resolution of the prediction unit predicted in the AMVP mode, as information representing the motion vector resolution of the current block, from a bitstream.

According to an aspect of the present disclosure, a motion vector decoding apparatus is configured to: generate a merge candidate list including at least one merge candidate with respect to a current block, and determine and decode a motion vector of the current block by using a motion vector of one of the at least one merge candidate included in the merge candidate list, wherein the merge candidate list includes a motion vector obtained by down-scaling a motion vector of the at least one merge candidate included in the merge candidate list according to a plurality of predetermined motion vector resolutions.

According to an aspect of the present disclosure, a motion vector decoding apparatus includes: an obtainer configured to obtain motion vector predictor candidates of a plurality of predetermined motion vector resolutions by using a spatial candidate block and a temporal candidate block of a current block, to obtain information representing motion vector predictor of the current block from among the motion vector predictor candidates, and to obtain a residual motion vector between a motion vector of the current block and the motion vector predictor of the current block and information representing a motion vector resolution of the current block; and a decoder configured to reconstruct the motion vector of the current block based on the residual motion vector, the information representing the motion vector predictor of the current block, and motion vector resolution information of the current block, wherein the motion vector predictor candidates of the plurality of predetermined motion vector resolutions include a set of first motion vector predictor candidates including one or more motion vector predictor candidates of a first motion vector resolution and a set of second motion vector predictor candidates including one or more motion vector predictor candidates of a second motion vector resolution, wherein the first motion vector resolution and the second motion vector resolution are different from each other, and the set of the first motion vector predictor candidates and the set of the second motion vector predictor candidates are obtained from candidate blocks that are different from each other from among candidate blocks included in the spatial candidate block and the temporal candidate block or include different numbers of motion vector predictor candidates from each other.

According to an aspect of the present disclosure, there may be provided a non-transitory computer-readable recording medium having embodied thereon a program for executing the motion vector decoding method.

Mode of the Invention

Hereinafter, an apparatus and method for encoding and decoding a motion vector resolution for a video encoding and decoding apparatus and method, according to the present disclosure, will be described below with reference to FIGS. 1A to 7B. Hereinafter, the video encoding apparatus and method may respectively include an apparatus and method for encoding a motion vector that will be described later. Also, the video decoding apparatus and method may respectively include an apparatus and method for decoding a motion vector that will be described later.

Also, a video encoding technique and a video decoding technique based on coding units having a tree structure according to an embodiment, which may be applied to previously suggested video encoding and decoding methods, will be described with reference to FIGS. 8 to 20. In addition, embodiments to which the previously suggested video encoding and decoding methods may be applied will be described with reference to FIGS. 21 to 27.

Hereinafter, an "image" may refer to a still image or a moving image of a video, or a video itself.

Hereinafter, a "sample" refers to data that is assigned to a sampling location of an image and is to be processed. For example, pixels in an image of a spatial domain may be samples.

Hereinafter, a "current block" may refer to a block of a coding unit or a prediction unit in a current image to be encoded or to be decoded.

Throughout the specification, when a part "includes" or "comprises" an element, unless there is a particular description contrary thereto, the part can further include other elements, not excluding the other elements. The term "unit", as used herein, means a software or hardware component, such as a Field Programmable Gate Array (FPGA) or Application Specific Integrated Circuit (ASIC), which performs certain tasks. However, the term "unit" is not limited to software or hardware. A "unit" may advantageously be configured to reside on the addressable storage medium and configured to execute on one or more processors. Thus, a unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and "units" may be combined into fewer components and "units" or may be further separated into additional components and "units".

First, method and apparatus for encoding a motion vector in order to encode a video and method and apparatus for decoding a motion vector in order to decode a video will be described with reference to FIGS. 1A to 7B.

FIG. 1A is a block diagram of a motion vector encoding apparatus 10 according to an embodiment.

In video encoding, an inter prediction denotes a prediction method using similarity between a current image and other images. In a reference image that is reconstructed before the current image, a reference region that is similar to a current region in the current image is detected, a distance between the current region and the reference region on a coordinate is expressed as a motion vector, and a difference between pixel values of the current region and the reference region may be expressed as residual data. Therefore, instead of directly outputting image information of the current region, an index indicating the reference image, a motion vector, and residual data through inter prediction on the current region may be output to improve efficiency in encoding/decoding operations.

The motion vector encoding apparatus 10 according to the present embodiment may encode a motion vector that is used to perform inter prediction on blocks of each of images in a video. A type of a block may be a square or a rectangle, or may be an arbitrary geometrical shape. The block is not limited to a data unit having a uniform size. A block according to an embodiment may be, from among coding units according to a tree structure, a largest coding unit, a coding unit, a prediction unit, or a transformation unit. Video encoding and decoding methods based on coding units according to a tree structure will be described below with reference to FIGS. 8 through 20.

The motion vector encoding apparatus 10 may include a predictor 11 and an encoder 13.

The motion vector encoding apparatus 10 according to the present embodiment may perform encoding of a motion vector for performing inter prediction on each block of each of the images in a video.

The motion vector encoding apparatus 10 may determine a motion vector of a current block with reference to a motion vector of a block different from the current block, in order to perform motion vector prediction, prediction unit (PU) merging, or advanced motion vector prediction (AMVP).

The motion vector encoding apparatus 10 according to the present embodiment may determine a motion vector of a current block with reference to a motion vector of another block that is temporally or spatially adjacent to the current block. The motion vector encoding apparatus 10 may determine prediction candidates including motion vectors of candidate blocks that may be targets referred to by the motion vector of the current block. The motion vector encoding apparatus 10 may determine the motion vector of the current block with reference to one motion vector selected from among the prediction candidates.

The motion vector encoding apparatus 10 according to the present embodiment splits a coding unit into prediction units that are base units of prediction, searches a reference picture adjacent to a current picture for a prediction block that is most similar to a current coding unit through motion estimation, and determines a motion parameter representing motion information between the current block and the prediction block.

A prediction unit according to the present embodiment is split from a coding unit, and may not be split as a quadtree, but may be only split once. For example, one coding unit may be split into a plurality of prediction units, and a prediction unit obtained from the split may not be additionally split.

The motion vector encoding apparatus 10 may expand a resolution of the reference picture by maximum n times (n is an integer) greater in a transverse direction and in a longitudinal direction for the motion estimation, and may determine the motion vector of the current block with an accuracy of 1/n in a pixel location. In this case, n is referred to as a minimum motion vector resolution of a picture.

For example, if a pixel unit of the minimum motion vector resolution is ¼ pixel, the motion vector encoding apparatus 10 may expand the resolution of the picture to be four times greater in the transverse and longitudinal directions, thereby determining a motion vector of an accuracy of a ¼-pel location. However, it may not be sufficient to determine the motion vector in the ¼-pel unit according to characteristic of an image, and on the other hand, it may be inefficient to determine the motion vector in the ¼-pel unit compared to determining of the motion vector in a ½-pel unit. Therefore, the motion vector encoding apparatus 10 according to the present embodiment may adaptively determine a resolution of the motion vector of the current block, and may encode determined motion vector predictor, an actual motion vector, and the motion vector resolution.

The predictor 11 according to the present embodiment may determine an optimal motion vector for the inter prediction of the current block, by using one of motion vector predictor candidates.

The predictor 11 obtains motion vector predictor candidates at a plurality of predetermined motion vector resolutions by using a spatial candidate block and a temporal candidate block of the current block, and may determine motion vector predictor of the current block, a motion vector of the current block, and a motion vector resolution of the current block by using the motion vector predictor candidates. The spatial candidate block may include at least one peripheral block that is spatially adjacent to the current block. In addition, the temporal candidate block may include at least one peripheral block that is spatially adjacent to a block at the same location as that of the current block within the reference picture having a picture order count (POC) that is different from that of the current block. The predictor 11 according to the present embodiment may determine the motion vector of the current block by copying, combining, or transforming at least one motion vector predictor candidate.

The predictor 11 may determine motion vector predictor of the current block, a motion vector of the current block, and a motion vector resolution of the current block by using the motion vector predictor candidates. A plurality of predetermined motion vector resolutions may include a resolution of a pixel unit that is greater than a resolution of a one-pel unit. That is, the plurality of predetermined motion vector resolutions may include resolutions of a two-pel unit, a three-pel unit, a four-pel unit, etc. However, the plurality of predetermined motion vector resolutions may not only include the resolution of one or more-pel units, but also include the resolution of one or less-pel units.

The predictor 11 may search for a reference block in a pixel unit of a first motion vector resolution by using a set of first motion vector predictor candidates including one or more motion vector predictor candidates that are selected from the motion vector predictor candidates, and may search for a reference block in a pixel unit of a second motion vector resolution by using a set of second motion vector predictor candidates including one or more motion vector predictor candidates selected from the motion vector predictor candidates. The first motion vector resolution and the second motion vector resolution may be different from each other. The set of the first motion vector predictor candidates and the set of the second motion vector predictor candidates may be obtained from different candidate blocks from among the candidate blocks included in the spatial candidate block and the temporal candidate block. The set of the first motion vector predictor candidates and the second of the second motion vector predictor candidates may include motion vector predictor candidates of different numbers.

A method for the predictor 11 to determine the motion vector predictor of the current block, the motion vector of the current block, and the motion vector resolution of the current block by using the motion vector predictor candidates of a plurality of predetermined motion vector resolutions will be described later with reference to FIG. 4B.

The encoder 13 may encode information representing the motion vector predictor of the current block, a residual motion vector between the motion vector of the current block and the motion vector predictor of the current block, and information representing the motion vector resolution of the current block. The encoder 13 may encode the motion vector of the current block by using a small number of bits because the residual motion vector between the actual motion vector and the motion vector predictor is used, and thus, a compression rate of the video encoding may be improved. The encoder 13 may encode an index indicating the motion vector resolution of the current block, as will be described later. Also, the encoder 13 may encode the residual motion vector after down-scaling the residual motion vector based on a difference between a minimum motion vector resolution and the motion vector resolution of the current block.

Figure 1B:
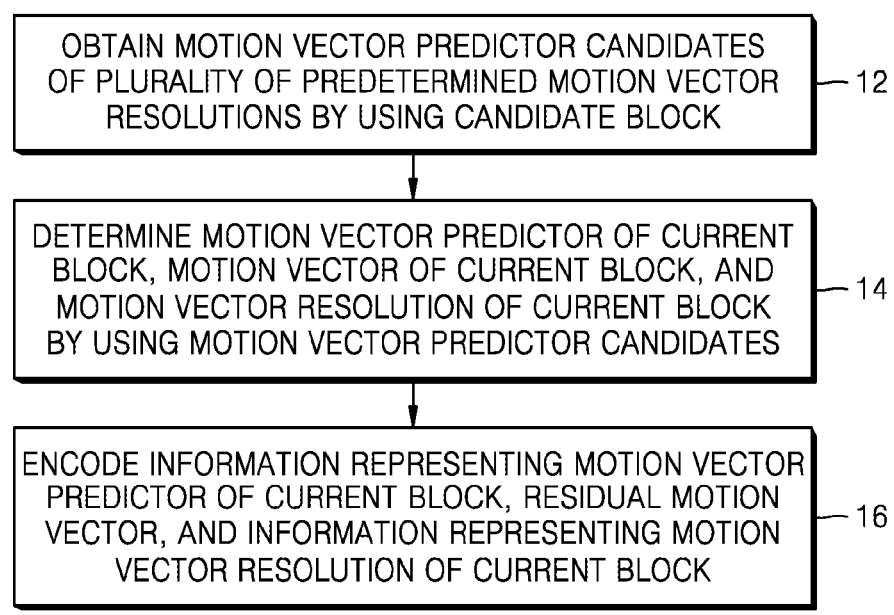
FIG. 1B is a flowchart of a method of encoding a motion vector, according to an embodiment.

FIG. 1B is a flowchart of a method of encoding a motion vector according to an embodiment.

In operation 12, the motion vector encoding apparatus 10 according to the present embodiment may acquire motion vector predictor candidates of a plurality of predetermined motion vector resolutions, by using the motion vectors of the spatial candidate block and the temporal candidate block of the current block. A plurality of predetermined motion vector resolutions may include a resolution of a pixel unit that is greater than a resolution of one-pel unit.

In operation 14, the motion vector encoding apparatus 10 according to the present embodiment may determine the motion vector predictor of the current block, the motion vector of the current block, and the motion vector resolution of the current block by using the motion vector predictor candidates acquired in operation 12.

In operation 16, the motion vector encoding apparatus 10 according to the present embodiment may encode information representing the motion vector predictor determined in operation 14, the residual motion vector between the motion vector of the current block and the motion vector predictor of the current block, and information representing the motion vector resolution of the current block.

Figure 2A:
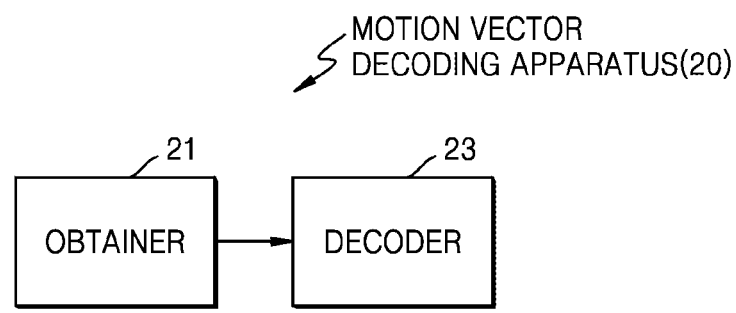
FIG. 2A is a block diagram of an apparatus for decoding a motion vector, according to an embodiment.

FIG. 2A is a block diagram of a motion vector decoding apparatus according to an embodiment.

The motion vector decoding apparatus 20 may determine a motion vector for performing inter prediction of a current block, by parsing a received bitstream.

An obtainer 21 may acquire motion vector predictor candidates of a plurality of predetermined motion vector resolutions by using a spatial candidate block and a temporal candidate block of a current block. The spatial candidate block may include at least one peripheral block that is spatially adjacent to the current block. In addition, the temporal candidate block may include at least one peripheral block that is spatially adjacent to a block of the same location as that of the current block within the reference picture having a picture order count (POC) that is different from that of the current block. A plurality of predetermined motion vector resolutions may include a resolution of a pixel unit that is greater than a resolution of one-pel unit. That is, the plurality of predetermined motion vector resolutions may include resolutions of a two-pel unit, a three-pel unit, a four-pel unit, etc. However, the plurality of predetermined motion vector resolutions may not only include the resolution of one or more pixel units, but also includes the resolution of one or less pixel units.

The motion vector predictor candidates of the plurality of predetermined motion vector resolutions may include a set of first motion vector predictor candidates including one or more motion vector predictor candidates of a first motion vector resolution and a set of second motion vector predictor candidates including one or more motion vector predictor candidates of a second motion vector resolution. The first motion vector resolution and the second motion vector resolution are different from each other. The set of the first motion vector predictor candidates and the set of the second motion vector predictor candidates may be obtained from different candidate blocks from among the candidate blocks included in the spatial candidate block and the temporal candidate block. Also, the set of the first motion vector predictor candidates and the second of the second motion vector predictor candidates may include motion vector predictor candidates of different numbers.

The obtainer 21 may acquire, from the received bitstream, information indicating the motion vector predictor of the current block from among the motion vector predictor candidates, and information about a residual motion vector between the motion vector of the current block and the motion vector predictor of the current block and the motion vector resolution of the current block.

A decoder 23 may reconstruct the motion vector of the current block based on the residual motion vector, the information indicating the motion vector predictor of the current block, and the motion vector resolution information of the current block acquired by the obtainer 21. The decoder 23 may up-scale and reconstruct data about the received residual motion vector based on a difference between the minimum motion vector resolution and the motion vector resolution of the current block.

A method for the motion vector decoding apparatus 20 according to the present embodiment of obtaining the motion vector resolution of the current block by parsing the received bitstream will be described later with reference to FIGS. 5A to 5D.

Figure 2B:
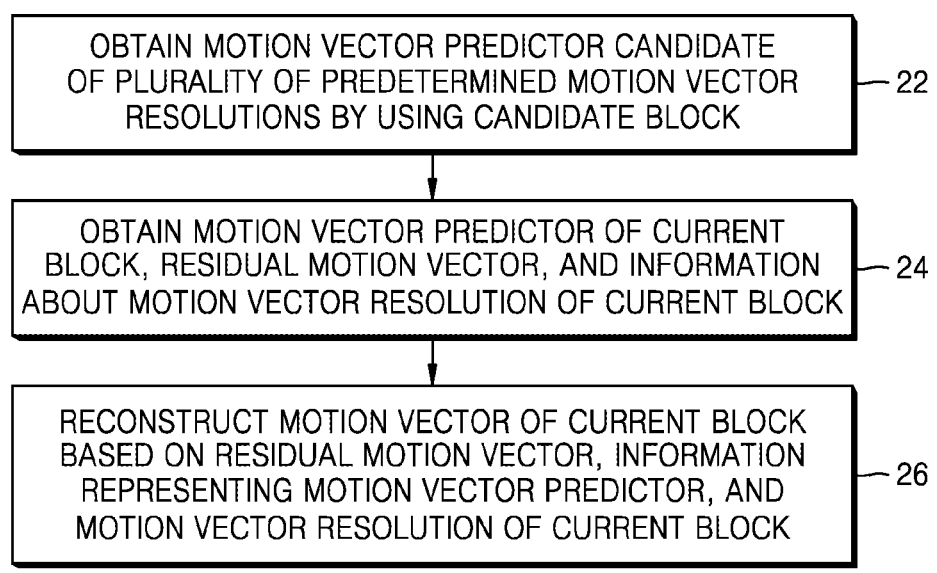
FIG. 2B is a flowchart of a method of decoding a motion vector, according to an embodiment.

FIG. 2B is a flowchart of a method of decoding a motion vector according to an embodiment.

In operation 22, the motion vector decoding apparatus 20 according to the present embodiment may acquire motion vector predictor candidates of a plurality of predetermined motion vector resolutions by using the spatial candidate block and the temporal candidate block of the current block.

In operation 24, the motion vector decoding apparatus 20 according to the present embodiment may obtain, from the bitstream, information representing the motion vector predictor of the current block from among the motion vector predictor candidates, and information representing the residual motion vector between the motion vector of the current block and the motion vector predictor of the current block and the motion vector resolution of the current block. A plurality of predetermined motion vector resolutions may include a resolution of a pixel unit that is greater than a resolution of one-pel unit.

In operation 26, the motion vector decoding apparatus 20 according to the present embodiment may reconstruct the motion vector of the current block based on the information representing the residual motion vector and the motion vector predictor of the current block obtained in operation 24, and the motion vector resolution information of the current block.

Figure 3A:
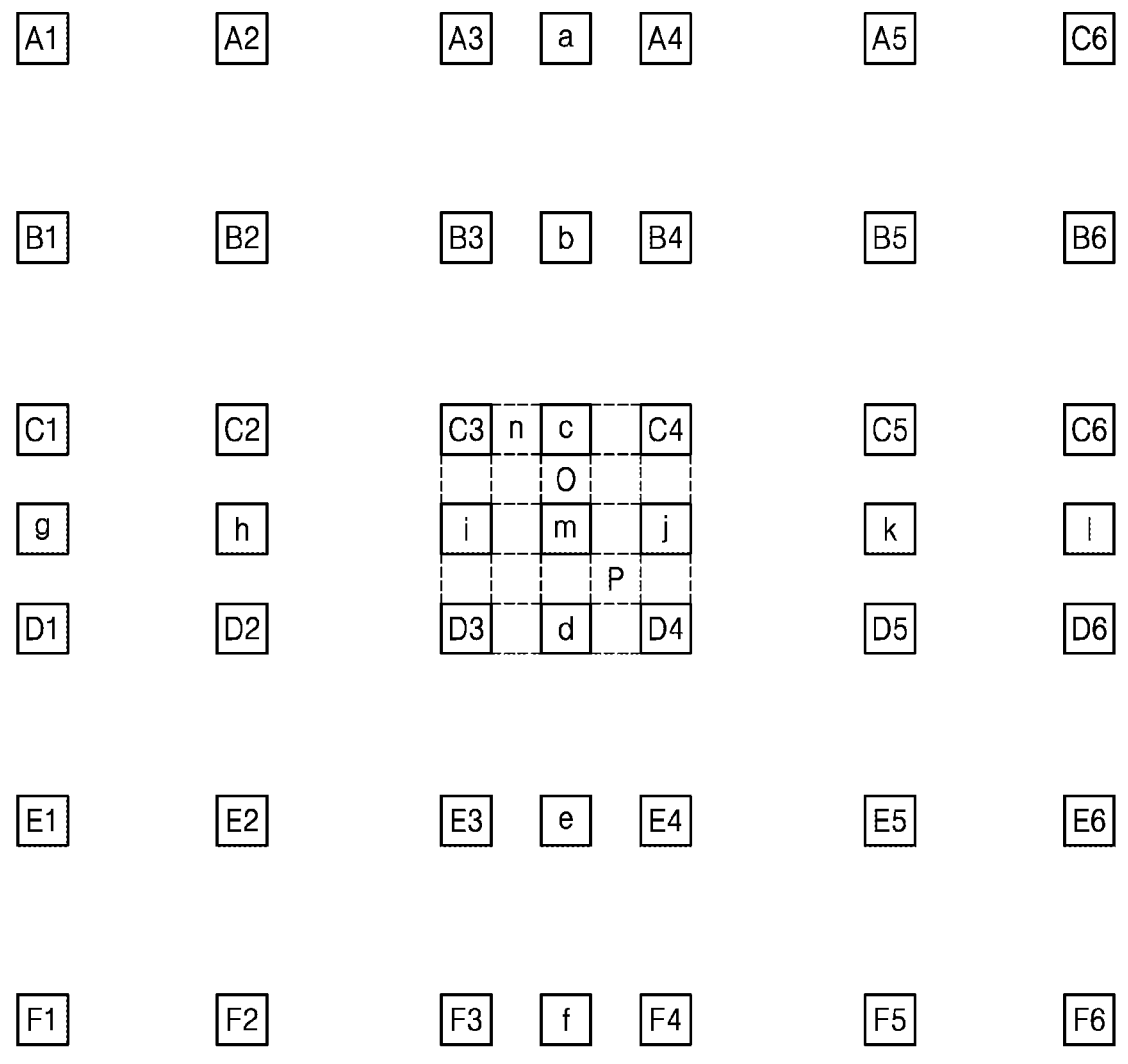

FIG. 3A is a diagram showing interpolation for performing motion compensation based on various resolutions.

The motion vector encoding apparatus 10 may determine motion vector of a plurality of predetermined motion vector resolutions, for performing inter prediction on the current block. The plurality of predetermined motion vector resolutions may include resolutions of 2k-pel unit (k is an integer). If k is greater than 0, the motion vector may indicate only some of pixels in the reference image, and if k is less than 0, sub-pel-unit pixels are generated by an interpolation using a finite impulse response (FIR) filter of n-tap (n is an integer), and the motion vector may indicate the generated sub-pel-unit pixels. For example, the motion vector encoding apparatus 10 may determine the minimum motion vector resolution in a ¼-pel unit, and may determine the plurality of predetermined motion vector resolutions in ¼, ½, 1, and 2-pel units.

For example, sub-pels (a to l) in ½-pel units may be generated by performing interpolation using n-tap FIR filter. When it comes to ½ sub-pels in the longitudinal direction, a sub-pel a may be generated through the interpolation using A1, A2, A3, A4, A5, and A6 of an integer-pel unit, and a sub-pel b may be generated through the interpolation using B1, B2, B3, B4, B5, and B6 of an integer-pel unit. Sub-pels c, d, e, and f may be generated in the same manner as above.

Pixel values of the sub-pels in the transverse direction may be calculated as follows. For example, a and b may be calculated as a=(A1−5×A2+20×A3+20×A4−5×A5+A6)/32 and b=(B1−5×B2+20×B3+20×B4−5×B5+B6)/32. The pixel values of the sub-pels c, d, e, and f may be calculated in the same manner as above.

Like the sub-pels in the transverse direction, sub-pels in the longitudinal direction may be generated by an interpolation using a 6-tap FIR filter. A sub-pel g may be generated by using A1, B1, C1, D1, E1, and F1, and a sub-pel h may be generated by using A2, B2, C2, D2, E2, and F2.

Pixel values of the sub-pels in the longitudinal direction may be calculated in the same manner as the calculation of the pixel values of the sub-pels in the transverse direction. For example, g may be calculated as g=(A1−5×B1+20×C1+20×D1−5×E1+F1)/32.

A sub-pel m in a ½-pel unit in a diagonal direction may be interpolated by using other sub-pels in the ½-pel unit. In other words, a pixel value of the sub-pel m may be calculated as m=(a−5×b+20×c+20×d−5×e+f)/32.

When the sub-pels in the ½-pel unit are generated, sub-pels in ¼-pel unit may be generated by using pixels of the integer-pel unit and sub-pels of the ½-pel unit. Interpolation may be performed by two adjacent pixels to generate the sub-pels in the ¼-pel unit. Alternatively, the sub-pels in the ¼-pel unit may be generated by directly applying an interpolation filter to the pixel values of the integer-pel unit, without using the sub-pel values of the ½-pel unit.

The 6-tap filter is exemplarily provided as the interpolation filter, but the motion vector encoding apparatus 10 may interpolate a picture by using a filter having taps of different number. For example, the interpolation filter may include 4-tap, 7-tap, 8-tap, and 12-tap filters.

As shown in FIG. 3A, when the sub-pels in the ½-pel unit and the sub-pels in the ¼-pel unit are generated through the interpolation on the reference picture, the interpolated reference picture and the current block are compared with each other to search for a block having a sum of absolute differences (SAD) or minimum rate-distortion cost in ¼-pel units and to determine a motion vector having a ¼-pel unit resolution.

Figure 3B:
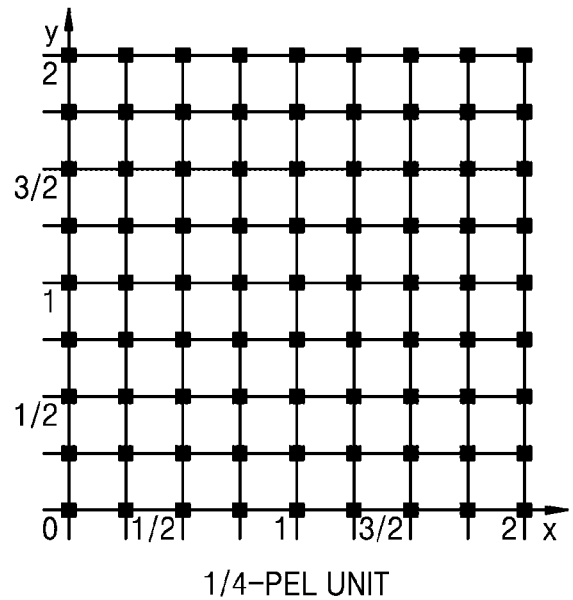
FIG. 3B is a diagram of motion vector resolutions in a ¼-pel unit, a ½-pel unit, a one-pel unit, and a two-pel unit.
Figure 3B:
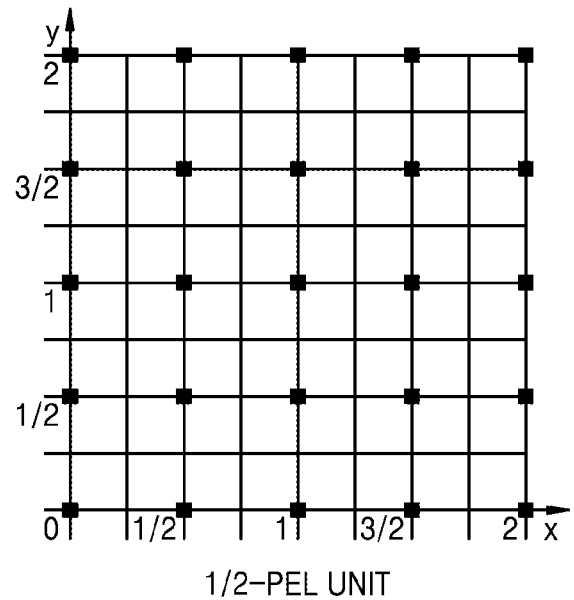
Figure 3B:
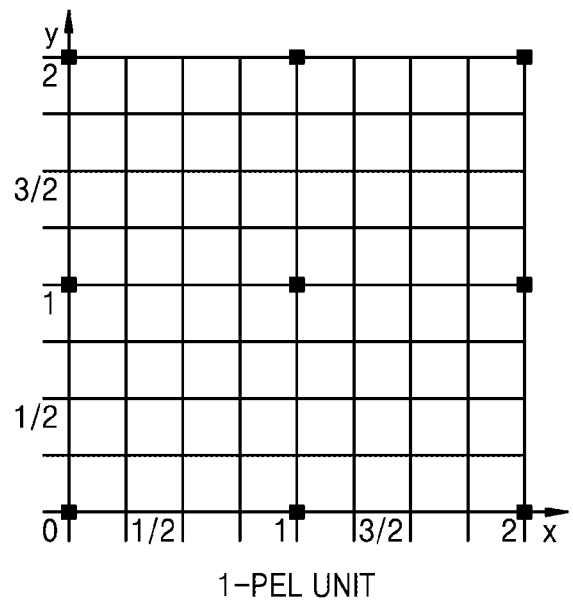
Figure 3B:
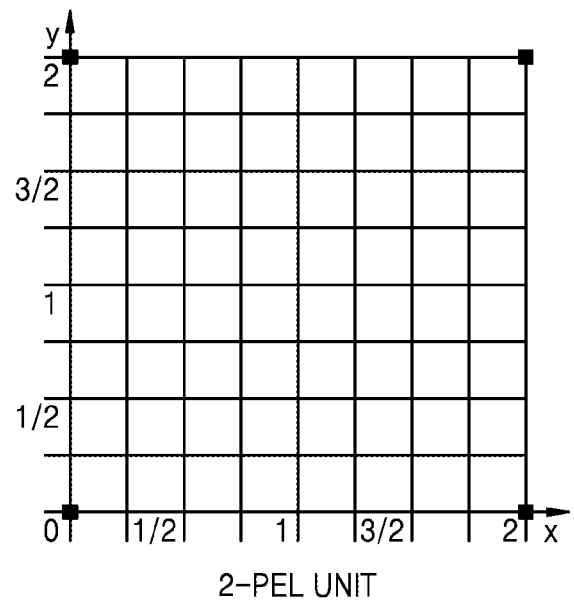

FIG. 3B is a diagram showing motion vector resolutions in ¼-pel, ½-pel, one-pel, and two-pel units in a case where a minimum motion vector resolution is in the ¼-pel unit. FIG. 3B illustrates coordinates (represented as black squares) of pixels that may be indicated by motion vector of the resolutions in the ¼, ½, one, and two-pel units based on a coordinate (0, 0).

The motion vector encoding apparatus 10 according to the present embodiment may search the reference picture for a block similar to the current block, based on the motion vector determined at an integer pixel position, in order to perform motion compensation in a sub-pel unit.

For example, the motion vector encoding apparatus 10 may determine the motion vector at the integer pixel position, and may increase the resolution of the reference picture by two times and search for the most similar prediction block within a range of (−1, −1) to (1, 1) based on the motion vector determined at the integer pixel position. Next, the resolution is expanded again by two times to increase the resolution by four times, and then, the most similar prediction block is searched for within a range of (−1, −1) to (1, 1) based on the motion vector at the ½-pel position in order to finally determine the motion vector in the ¼-pel unit resolution.

For example, in a case where the motion vector at the integer pixel position is (−4, −3) based on the coordinate (0, 0), the motion vector in the ½-pel unit resolution becomes (−8, −6) and the motion vector in the ½-pel unit resolution is finally determined as (−8, −7). Also, the motion vector in the ¼-pel unit resolution is changed to (−16, −14) and is moved by (−1, 0), and then, the final motion vector in the ¼-pel unit resolution may be determined to be (−17, −14).

The motion vector encoding apparatus 10 according to the present embodiment may search the reference picture for a block similar to the current block based on a pixel location greater than 1 pixel location, based on the motion vector determined at the integer pixel position in order to perform motion compensation in a pixel unit greater than the one-pel unit. Hereinafter, a pixel location greater than the one-pel location (e.g., 2-pel, 3-pel, and 4-pel) is referred to as a super pixel.

For example, when the motion vector at the integer pixel location is (−4, −8) based on a coordinate (0, 0), the motion vector in the two-pel unit resolution is determined to be (−2, −4). In order to encode the motion vector in the ¼-pel unit, more bits are consumed than those used to encode the motion vector in the integer-pel unit, but precise inter prediction in the ¼-pel unit may be performed, the number of bits consumed to encode the residual block may be reduced.

However, if the sub-pels are generated through the interpolation in a pixel unit less than the ¼-pel unit, e.g., ⅛-pel unit, and if the motion vector in the ⅛-pel unit is estimated, too many bits are consumed to encode the motion vector and a compression rate of the encoding may degrade.

Also, if there is a lot of noise in the image and if there is less texture, the resolution may be set in the super pixel unit and the motion estimation is performed, so that the compression rate of the encoding may be improved.

Figure 4A:
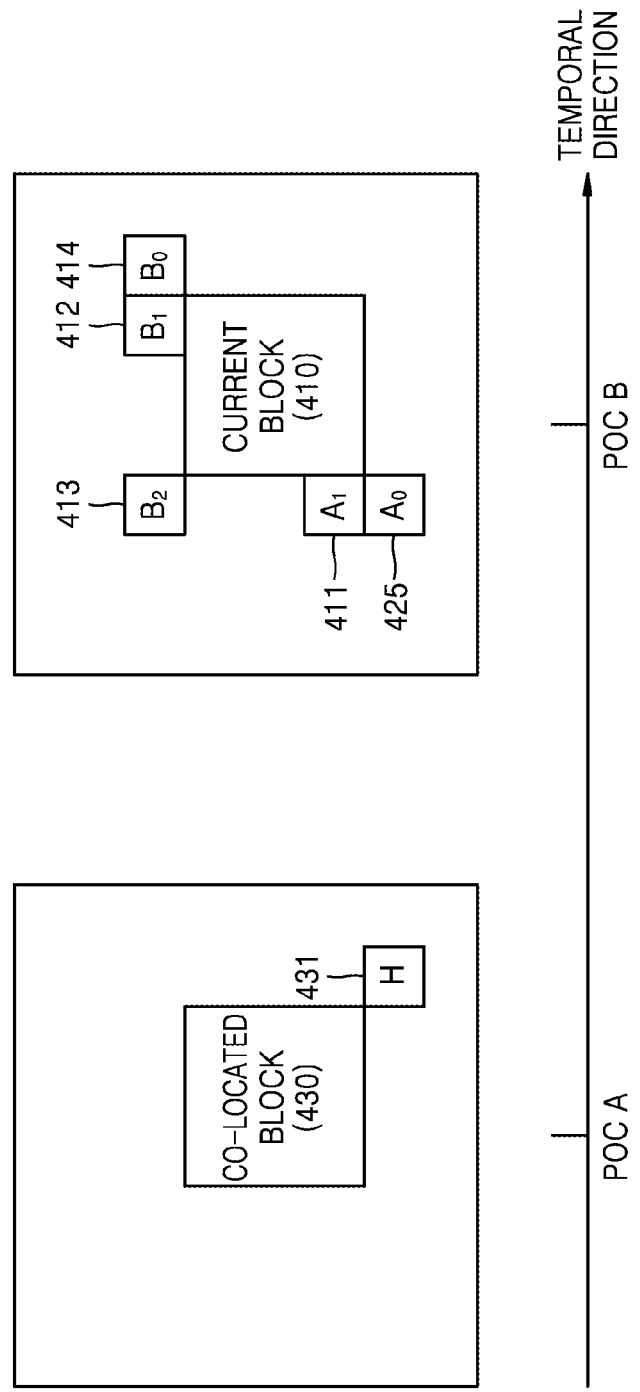
FIG. 4A is a diagram of a candidate block of a current block for obtaining motion vector predictor candidates.

FIG. 4A is a diagram of a candidate block of a current block for obtaining motion vector predictor candidates.

The predictor 11 may acquire one or more candidates for motion vector predictor of the current block, in order to perform the motion estimation on the current block with respect to the reference picture of the current block that is to be encoded. The predictor 11 may acquire at least one of the spatial candidate block and the temporal candidate block of the current block, in order to obtain the candidates for the motion vector predictor.

If the current block is predicted with reference to a reference frame having a different POC, the predictor 11 may acquire the motion vector predictor candidates by using blocks located around the current block, a co-located block included in a reference frame that is temporally different (having different POC) from the current block, and a peripheral block of the co-located block.

For example, the spatial candidate block may include at least one of a left block ($A_1$) 411, an upper block ($B_1$) 412, an upper-left block ($B_2$) 413, an upper-right block ($B_0$) 414, and a lower-left block ($A_0$) 425 that are adjacent blocks of the current block 410. The temporal candidate block may include at least one of a co-located block 430 included in a reference frame having a different POC than that of the current block, and an adjacent block (H) 431 of the co-located block 430. The motion vector encoding apparatus 10 may acquire motion vectors of the temporal candidate block and the spatial candidate block as the motion vector predictor candidates.

The predictor 11 may obtain the motion vector predictor candidates of a plurality of predetermined motion vector resolutions. Each of the motion vector predictor candidates may have a resolution that is different from that of the others. That is, the predictor 11 may search for the reference block in a pixel unit of the first motion vector resolution by using a first motion vector predictor candidate from among the motion vector predictor candidates, and search for the reference block in the pixel unit of the second motion vector resolution by using a second motion vector predictor candidate. The first motion vector predictor candidate and the second motion vector predictor candidate may be obtained by using different blocks from each other, from among blocks included in the spatial candidate block and the temporal candidate block.

The predictor 11 may determine the number and the kind of the set of candidate blocks (that is, a set of the motion vector predictor candidates) varying depending on the resolution of the motion vector.

For example, in a case where the minimum motion vector resolution is ¼-pel and the plurality of predetermined motion vector resolutions are ¼-pel, ½-pel, 1-pel, and two-pel units, the predictor 11 may generate the predetermined number of motion vector predictor candidates for each of the resolutions. The motion vector predictor candidates for each resolution may be motion vectors of different candidate blocks. The predictor 11 acquires the motion vector predictor candidates by using different candidate blocks for each of the resolution, thereby improving a possibility of searching for an optical reference block and reducing rate-distortion costs, and then the encoding efficiency may be improved.

In order to determine the motion vector of the current block, the predictor 11 may determine a search start location within the reference picture by using each motion vector predictor candidate, and may search for the optimal reference block based on the resolution of each motion vector predictor candidate. That is, when the motion vector predictor of the current block is obtained, the motion vector encoding apparatus 10 searches for the reference block in the pixel unit of a predetermined resolution corresponding to each motion vector predictor candidate, and compares the rate-distortion costs based on a difference value between the motion vector of the current block and each motion vector predictor to determine the motion vector predictor having the minimum costs.

The coder 13 may encode information representing the residual motion vector that is a difference vector between the determined one motion vector predictor and the actual motion vector of the current block and the motion vector resolution used to perform the inter prediction of the current block.

The encoder 13 may determine and encode the residual motion vector as shown in Equation 1 below. MVx is an x component in the actual motion vector of the current block, and MVy is a y component in the actual motion vector of the current block. pMVx is an x component in the motion vector predictor of the current block, and pMVy is a y component in the motion vector predictor of the current block. MVDx is an x component in the residual motion vector of the current block, and MVDy is a y component in the residual motion vector of the current block.

$$MVDx=MVx-pMVx \quad MVDy=MVy-pMVy \qquad (1)$$

The decoder 23 may reconstruct the motion vector of the current block by using the information indicating the motion vector predictor obtained from the bitstream and the residual motion vector. The decoder 23 may determine a final motion vector by summing up the motion vector predictor and the residual motion vector as shown in Equation 2 below.

$$MVx=pMVx+MVDx \quad MVy=pMCy+MVDy \qquad (2)$$

If the minimum vector resolution is the sub-pel unit, the motion vector encoding apparatus 10 may represent the motion vector in an integer value by multiplying the motion vector predictor and the actual motion vector by an integer value. If the motion vector predictor of the ¼-pel unit resolution starting from a coordinate (0, 0) indicates a coordinate (1/2, 3/2) and the minimum motion vector resolution is in the ¼-pel unit, the motion vector encoding apparatus 10 may encode a vector (2, 6) that is obtained by multiplying the motion vector predictor by an integer 4 as the motion vector predictor. If the minimum motion vector resolution is in the ⅛-pel unit, the motion vector predictor is multiplied by an integer 8 to obtain a vector (4, 12) and the vector (4, 12) may be encoded as the motion vector predictor.

Figure 4B:
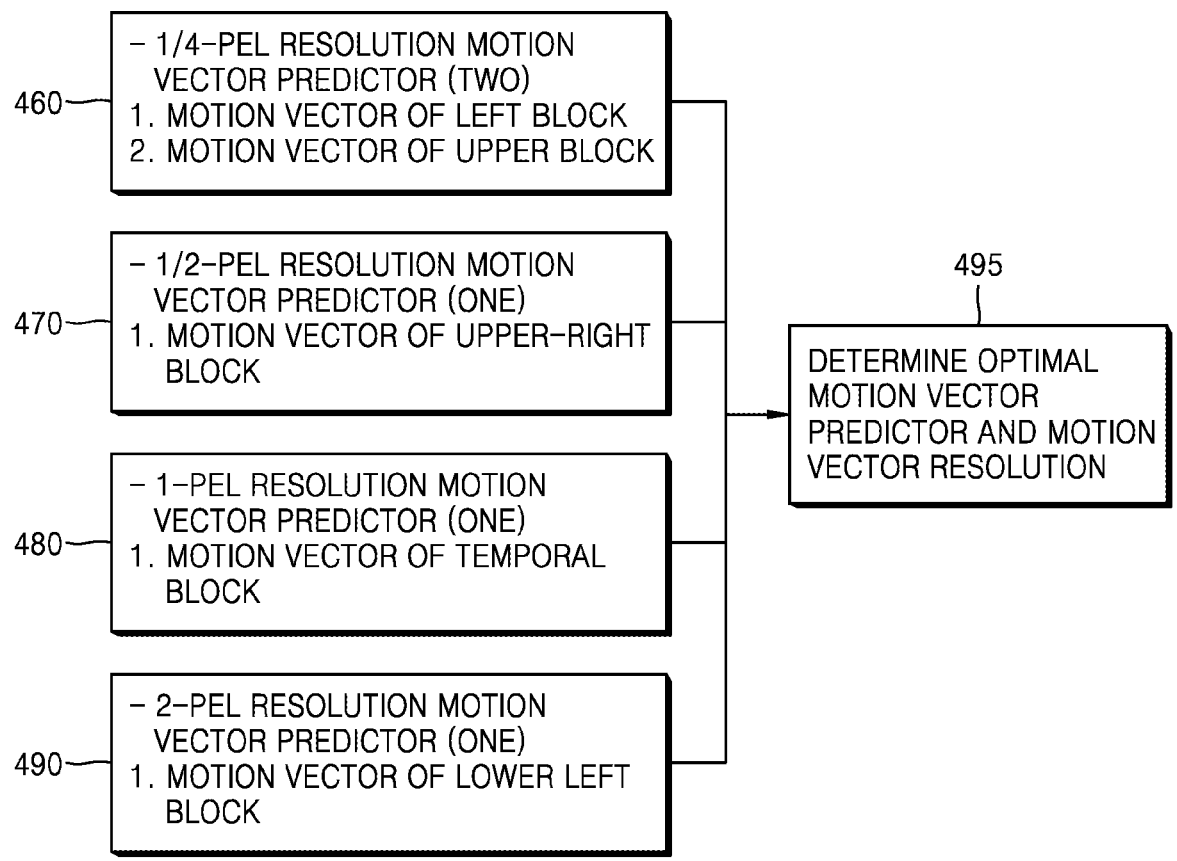
FIG. 4B illustrates processes of generating motion vector predictor candidates, according to an embodiment.

FIG. 4B illustrates processes of generating motion vector predictor candidates according to an embodiment.

As described above, the predictor 11 may obtain motion vector predictor candidates of a plurality of predetermined motion vector resolutions.

For example, in a case where the minimum motion vector resolution is ¼-pel and the plurality of predetermined motion vector resolutions include ¼-pel, ½-pel, 1-pel, and two-pel units, the predictor 11 may generate the predetermined number of motion vector predictor candidates for each of the resolutions. The predictor 11 may generate sets 460, 470, 480, and 490 of the motion vector predictor candidates to be different from one another according to the plurality of predetermined motion vector resolutions. The sets 460, 470, 480, and 490 may include the motion vector predictors obtained from different candidate blocks from one another, and may include the motion vector predictors in different numbers from one another. Since the predictor 11 uses difference candidate blocks with respect to the resolutions, a possibility of searching for the optimal prediction block is improved and the rate-distortion cost is reduced in order to improve the encoding efficiency.

The motion vector predictor candidate 460 in the ¼-pel unit resolution may be determined from two different temporal or spatial candidate blocks. For example, the predictor 11 obtains the motion vectors of a left block 411 and an upper block with respect to the current block as the motion vector predictor candidates 460 in the ¼-pel unit, and may search for an optimal motion vector with respect to each of the motion vector predictor candidates. That is, the predictor 11 may determine the search start location by using the motion vector of the left block 411 of the current block, and may search the reference block in the ¼-pel unit for the optimal motion vector and the reference block. That is, the predictor 11 may determine the search start location by using the motion vector of the upper block 412, and may search the reference block in the ¼-pel unit for another optimal motion vector and the reference block.

The motion vector predictor candidate 470 in the ½-pel unit resolution may be determined from one temporal or spatial candidate block. The motion vector predictor candidate in the ½-pel unit resolution may be different from the motion vector predictor candidates in the ¼-pel unit resolution. For example, the predictor 11 may obtain the motion vector of the upper-right block 414 of the current block as the motion vector predictor candidate 470 in the ½-pel unit. That is, the predictor 11 may determine the search start location by using the motion vector of the upper-right block 414, and may search the reference block in the ½-pel unit for another optimal motion vector and the reference block.

The motion vector predictor candidate 480 in the one-pel unit resolution may be determined from one temporal or spatial candidate block. The motion vector predictor in the one-pel unit resolution may be different from the motion vector predictors used in the ¼-pel unit resolution and the ½-pel unit resolution. For example, the predictor 11 may determine the motion vector of the temporal candidate block 430 as the motion vector predictor candidate 480 in the one-pel unit. That is, the predictor 11 may determine the search start location by using the motion vector of the temporal candidate block 430, and may search the reference block in the one-pel unit for another optimal motion vector and the reference block.

The motion vector predictor candidate 490 in the two-pel unit resolution may be determined from one temporal or spatial candidate block. The motion vector predictor in the two-pel unit resolution may be different from the motion vector predictors used in the other resolutions. For example, the predictor 11 may determine the motion vector of the lower-left block 425 as the motion vector predictor 490 in the two-pel unit. That is, the predictor 11 may determine the search start location by using the motion vector of the lower-left block 425, and may search the reference block in the two-pel unit for another optimal motion vector and the reference block.

The predictor 11 may compare the rate-distortion costs based on the motion vector of the current block and each of the motion vector predictors, so that the motion vector of the current block and one motion vector predictor and one motion vector resolution 495 may be finally determined.

In a case where the pixel unit of the resolution of the motion vector in the current block is greater than the pixel unit of the minimum motion vector resolution, the motion vector encoding apparatus 10 may encode the residual motion vector after down-scaling the residual motion vector according to the resolution of the motion vector of the current block. Also, when the pixel unit of the resolution of the motion vector in the current block is greater than the pixel unit of the minimum motion vector resolution, the motion vector decoding apparatus 20 may reconstruct the residual motion vector after up-scaling the residual motion vector according to the minimum motion vector resolution.

In a case where the minimum motion vector resolution is in the ¼-pel unit and the motion vector resolution of the current block is determined to be the ½-pel unit, the encoder 13 may calculate the residual motion vector by adjusting the determined actual motion vector and the motion vector predictor by the ½-pel unit in order to reduce the size of the residual motion vector.

The encoder 13 may reduce the sizes of the actual motion vector and the motion vector predictor in halves, and may also reduce the size of the residual motion vector in half. That is, when the minimum motion vector resolution is in the ¼-pel unit, the motion vector predictor (MVx, MVy) that is expressed after being multiplied by 4 may be divided by 2 to express the motion vector predictor. For example, in a case where the minimum motion vector resolution is in the ¼-pel unit and the motion vector predictor is (−24, −16), the motion vector in the ½-pel unit resolution is (−12, −8) and the motion vector in the two-pel unit resolution is (−3, −2). Equation 3 below expresses a process of reducing the sizes of the actual motion vector (MVx, MVy) and the motion vector predictor (pMVx, pMCy) into halves by using a bit shift calculation.

$$MVDx=(MVx)\gg 1-(pMVx)\gg 1 \; MVDy=(MVy)\gg 1-(pMCy)\gg 1 \quad (3)$$

The decoder 23 may determine the final motion vector (MVx, MVy) with respect to the current block as represented in Equation 4, by summing up the finally determined motion vector predictor (pMVx, pMCy) and the received residual motion vector (MVDx, MVDy). The decoder 23 may up-scale the obtained motion vector predictor and the residual motion vector by using the bit-shift calculation as shown in Equation 4, and may reconstruct the motion vector with respect to the current block.

$$MVx=(pMVx)\ll 1+(MVDx)\ll 1 \; MVy=(pMCy)\ll 1+(MVDy)\ll 1 \quad (4)$$

If the minimum motion vector resolution is in the 1/2n-pel unit and the motion vector in a 2k-pel unit resolution is determined with respect to the current block, the encoder 13 according to the present embodiment may determine the residual motion vector by using Equation 5 below.

$$MVDx=(MVx)\gg(k+n)-(pMVx)\gg(k+n) \; MVDy=(MVy)\gg(k+n)-(pMCy)\gg(k+n) \quad (5)$$

The decoder 23 may determine the final motion vector of the current block as shown in Equation 6 below, by summing up the finally determined motion vector predictor and the received residual motion vector.

$$MVx=(pMVx)\ll(k+n)+(MVDx)\ll(k+n) \; MVy=(pMCy)\ll(k+n)+(MVDy)\ll(k+n) \quad (6)$$

When the size of the residual motion vector is reduced, the number of bits representing the residual motion vector is also reduced, and thus, the encoding efficiency may be improved.

As described above with reference to FIGS. 3A and 3B, k is less than 0 in the motion vector in the 2k-pel unit, the reference picture performs interpolation in order to generate pixels at non-integer locations. On the contrary, in a case of the motion vector, in which k is greater than 0, pixels at 2k locations, not all the pixels, are only searched for in the reference picture. Therefore, if the motion vector resolution of the current block is equal to or greater than the one-pel unit, the decoder 23 may omit the interpolation on the reference picture according to the resolution of the motion vector in the current block to be decoded.

Figure 5A:
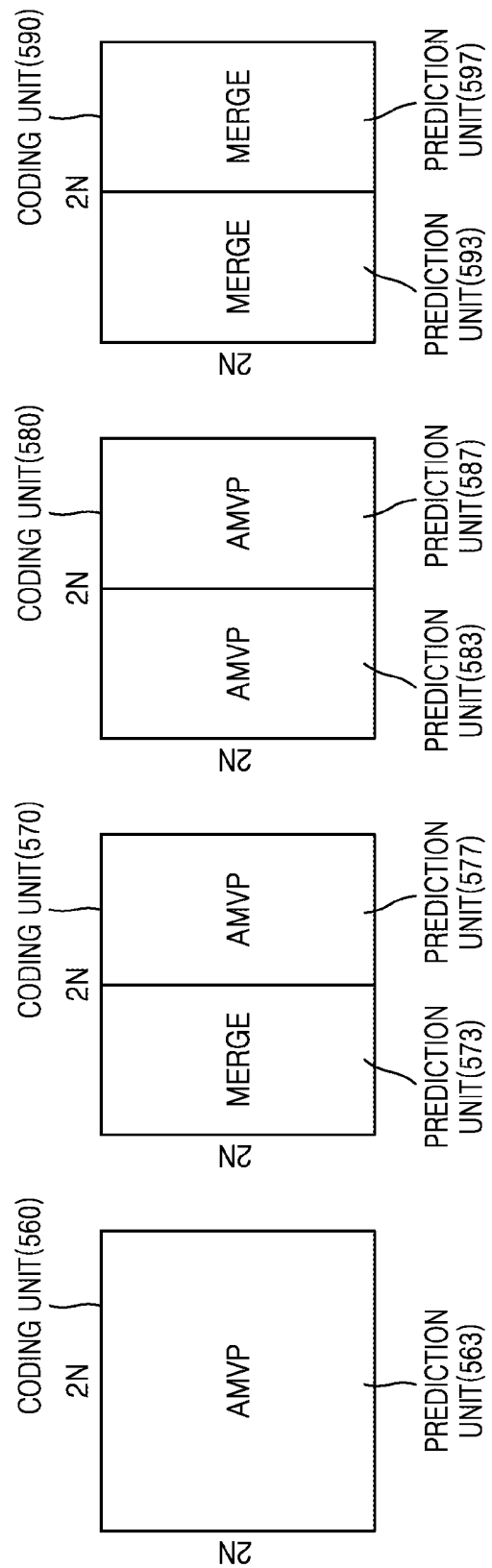
FIG. 5A is a diagram of a coding unit and a prediction unit, according to an embodiment.

FIG. 5A is a diagram of a coding unit and a prediction unit according to an embodiment.

In a case where the current block is a current coding unit that configures an image, the motion vector resolution for inter prediction is determined constantly according to the coding unit, and there are one or more prediction units predicted in an advanced motion vector prediction (AMVP) mode within the current coding unit, the encoder 13 may encode only once information indicating the motion vector resolution of the prediction unit that is predicted in the AMVP mode as information indicating the motion vector resolution of the current block and may transmit the encoded information to the motion vector decoding apparatus 20. The obtainer 21 may obtain only once the information indicating the motion vector resolution of the prediction unit that is predicted in the AMVP mode, as information representing the motion vector resolution of the current block, from the bitstream.

FIG. 5B is a part of a prediction_unit syntax according to an embodiment for transferring a motion vector resolution that has been adaptively determined. FIG. 5B shows a syntax that defines an operation of the motion vector decoding apparatus 20 according to the present embodiment for obtaining information representing a motion vector resolution of the current block.

For example, as shown in FIG. 5A, in a case where a current coding unit 560 has a size of 2N×2N and a prediction unit 563 has a size (2N×2N) equal to that of the coding unit 560 and is predicted in the AMVP mode, the encoder 13, with respect to the current coding unit 560, may once encode information representing the motion vector resolution of the coding unit 560, and the obtainer 21 may once obtain the information representing the motion vector resolution of the coding unit 560 from the bitstream.

When a current coding unit 570 has a size of 2N×2N and is split into two prediction units 573 and 577 respectively having a size of 2N×N, since the prediction unit 573 is predicted in a merge mode, the encoder 13 does not transfer the information representing the motion vector resolution with respect to the prediction unit 573, and since the prediction unit 577 is predicted in the AMVP mode, the encoder 13 once transfers the information motion vector resolution with respect to the prediction unit 577 and the obtainer 21 may once obtain the information representing the motion vector resolution with respect to the prediction unit 577 from the bitstream. That is, the encoder 13 once transfers the information representing the motion vector resolution with respect to the prediction unit 577 as the information representing the motion vector resolution of the current coding unit 570, and the decoder 23 may receive the information representing the motion vector resolution with respect to the prediction unit 577 as the information representing the motion vector resolution of the current coding unit 570. The information representing the motion vector resolution may be an index type such as "cu_resolution_idx [x0][y0]" indicating one of a plurality of predetermined motion vectors.

Referring to the syntax shown in FIG. 5B, initial values of "parsedMVResolution(510)" that is information representing whether to extract the motion vector resolution with respect to the current coding unit and "mv_resolution_idx (512)" that is information representing the motion vector resolution of the current coding unit may be set respectively as 0. First, the prediction unit 573 does not satisfy a condition 513 since it is predicted in the merge mode, the obtainer 21 does not receive "cu_resolution_idx[x0][y0]" that is the information representing the motion vector resolution of the current prediction unit.

The prediction unit 577 satisfies the condition 513 since it is predicted in the AMVP mode and satisfies a condition 514 since the value of "parsedMVResolution" is 0, and the obtainer 21 may receive "cu_resolution_idx[x0][y0](516)". Since "cu_resolution_idx[x0][y0]" is received, the value of "parsedMVResolution" may be set as 1 (518). The received "cu_resolution_idx[x0][y0]" may be stored in "mv_resolution_idx" (520).

In a case where the current coding unit 580 has a size of 2N×2N and is split into two prediction units 583 and 587 having a size of 2N×N, and the prediction unit 583 and the prediction unit 587 are both predicted in the AMVP mode, the encoder 13 once encodes and transmits information representing the motion vector resolution of the current coding unit 580 and the obtainer 21 may once receive the information representing the motion vector resolution of the coding unit 580 from the bitstream.

Referring to the syntax shown in FIG. 5B, the prediction unit 583 satisfies the condition 513 and the value of "parsedMVResolution" is 0 which satisfies the condition 514, and the obtainer 21 may obtain "cu_resolution_idx[x0][y0] (516)". Since the decoder 23 obtains "cu_resolution_idx[x0] [y0]", the value of "parsedMVResolution" may be set as 1 (518) and obtained "cu_resolution_idx[x0][y0]" may be stored in "mv_resolution_idx" (520). However, since the prediction unit 587 does not satisfy the condition 514 because the value of "parsedMVResolution" is 1, the obtainer 21 does not obtain "cu_resolution_idx[x0][y0] (516)". That is, since the obtainer 21 already has received the information representing the motion vector resolution of the current coding unit 580 from the prediction unit 583, the obtainer 21 does not need to obtain the information representing the motion vector resolution (equal to the motion vector resolution of the prediction unit 583) from the prediction unit 587.

In a case where the current coding unit 590 has a size of 2N×2N and is split into two prediction units 593 and 597 having a size of 2N×N, and the prediction unit 593 and the prediction unit 597 are both predicted in the merge mode, the condition 513 is not satisfied, and thus, the obtainer 21 does not obtain the information representing the motion vector resolution with respect to the current coding unit 590.

When a current block is a current coding unit configuring an image, a motion vector resolution for inter prediction is constantly determined according to each prediction unit, and there are one or more prediction units that are predicted in the AMVP mode in the current coding unit, the encoder 13 according to another embodiment may transmit to the motion vector decoding apparatus 20 information representing the motion vector resolution for each of the prediction units predicted in the AMVP mode in the current block as the information representing the motion vector resolution of the current block. The obtainer 21 may obtain the information representing the motion vector resolution of each of the prediction units in the current block, as the information representing the motion vector resolution of the current block, from the bitstream.

FIG. 5C is a part of a prediction_unit syntax according to another embodiment for transferring a motion vector resolution that has been adaptively determined. FIG. 5C shows a syntax that defines an operation of the motion vector decoding apparatus 20 according to another embodiment for obtaining information representing a motion vector resolution of the current block.

The syntax of FIG. 5C is different from the syntax of FIG. 5B in that there is no "parsedMVResolution(510)" that represents whether the motion vector resolution is extracted with respect to the current coding unit, and the obtainer 21 may obtain information "cu_resolution_idx[x0, y0]" representing the motion vector resolution of each of the prediction units in the current coding unit (524).

For example, referring back to FIG. 5A, in a case where a size of the current coding unit 580 is 2N×2N and is split into two prediction units 583 and 587 having a size of 2N×N, the prediction unit 583 and the prediction unit 587 are both predicted in the AMVP mode, and the motion vector resolution of the prediction unit 583 is in ¼-pel unit and the motion vector resolution of the prediction unit 587 is in two-pel unit, the obtainer 21 may obtain information representing two motion vector resolutions with respect to one coding unit 580 (e.g., the motion vector resolution ½ of the prediction unit 583 and the motion vector resolution ¼ of the prediction unit 587) (524).

In a case where the motion vector resolution is determined adaptively to the current prediction unit without regard to the prediction mode of the prediction unit, the encoder 13 according to another embodiment encodes and transmits information representing the motion vector resolution for each of the prediction units without regard to the prediction mode, and the obtainer 21 may obtain from the bitstream the information representing the motion vector resolution for each of the prediction units without regard to the prediction mode.

FIG. 5D is a part of a prediction_unit syntax according to another embodiment for transferring a motion vector resolution that has been adaptively determined. FIG. 5D shows a syntax that defines an operation of the motion vector decoding apparatus 20 according to another embodiment for obtaining information representing a motion vector resolution of the current block.

The syntax described with reference to FIGS. 5B to 5C is under an assumption that the method of adaptively determining the motion vector resolution is applied to only a case where the prediction mode is the AMVP mode, but FIG. 5D shows an example of the syntax under an assumption that the method of adaptively determining the motion vector resolution is applied regardless of the prediction mode. Referring to the syntax of FIG. 5D, the obtainer 21 may receive "cu_resolution_idx[x0][y0]" of each of the prediction units regardless of the prediction mode of the prediction units (534).

The index "cu_resolution_idx[x0][y0]" representing the motion vector resolution described above with reference to FIGS. 5B to 5D may be encoded in a unary or a fixed length to be transmitted. In addition, when two motion vector resolutions are only used, "cu_resolution_idx[x0][y0]" may be data in a flag form.

The motion vector encoding apparatus 10 may adaptively configure a plurality of predetermined motion vector resolutions used in encoding, in a slice or block unit. Also, the motion vector decoding apparatus 20 may adaptively configure a plurality of predetermined motion vector resolutions used in decoding, in a slice or block unit. The plurality of predetermined motion vector resolutions that are adaptively configured in the slice of block unit may be referred to as a motion vector resolution candidate group. That is, the motion vector encoding apparatus 10 and the motion vector decoding apparatus 20 may vary the kinds and the number of the motion vector candidate group of the current block based on information about peripheral blocks that have been encoded or decoded.

For example, the motion vector encoding apparatus 10 or the motion vector decoding apparatus 20 may use the resolutions in the ¼-pel unit, ½-pel unit, one-pel unit, and two-pel unit as the motion vector resolution candidate group that is fixed with respect to all the images, in a case where the minimum motion vector resolution is in the ¼-pel unit. Instead of using the motion vector resolution candidate group that is fixed with respect to all of the images, the motion vector encoding apparatus 10 or the motion vector decoding apparatus 20 may use the resolutions in the ⅛-pel unit, ¼-pel unit, and ½-pel unit as the motion vector resolution candidate group of the current block in a case where the peripheral block that is already encoded has a small motion vector resolution, and may use the resolutions in the ½-pel unit, one-pel unit, and two-pel unit as the motion vector resolution candidate group of the current block in a case where the peripheral block that is already encoded has a large motion vector resolution. The motion vector encoding apparatus 10 or the motion vector decoding apparatus 20 may vary the kinds and the number of the motion vector resolution candidate group in a slice or block unit, based on a size of the motion vector and other information.

The kinds and the number of the resolutions constituting the motion vector resolution candidate group may be constantly set and used by the motion vector encoding apparatus 10 and the motion vector decoding apparatus 20 or may be construed based on information about the peripheral block or other information in the same way. Alternatively, information about the motion vector resolution candidate group used in the motion vector encoding apparatus 10 may be encoded as a bitstream and clearly transmitted to the motion vector decoding apparatus 20.

Figure 6A:
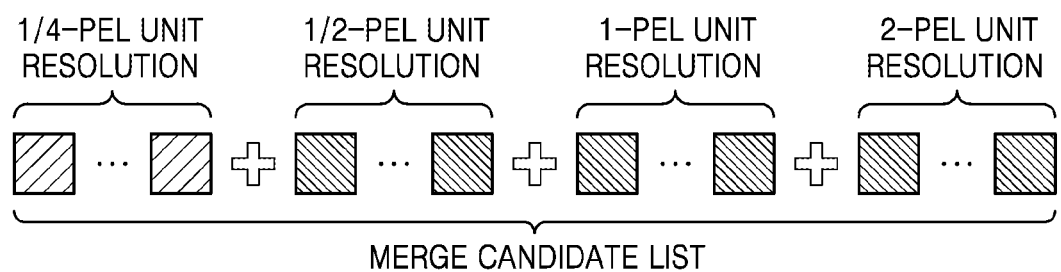
FIG. 6A is a diagram for explaining generating of a merge candidate list by using a plurality of resolutions, according to an embodiment.

FIG. 6A is a diagram of generating a merge candidate list by using a plurality of resolutions, according to an embodiment.

The motion vector encoding apparatus 10 may use a merge mode, in which motion information of the current block is set based on motion information of spatial/temporal peripheral blocks, in order to reduce data amount related to the motion information that is transmitted for each of the prediction units. After generating identical merge candidate lists for predicting the motion information in the encoding apparatus and the decoding apparatus, the motion vector encoding apparatus 10 transmits candidate selection information in the list to the decoding apparatus in order to effectively reduce the amount of data regarding the motion information.

If the current block has a prediction unit predicted in the merge mode, the motion vector decoding apparatus 20 generates the merge candidate list in the same manner as the motion vector encoding apparatus 10, and obtains the candidate selection information in the list from the bitstream to decode the motion vector of the current block.

The merge candidate list may include a spatial candidate based on the motion information of the spatial peripheral block and a temporal candidate based on the motion information of the temporal peripheral block. The motion vector encoding apparatus 10 and the motion vector decoding apparatus 20 may allow spatial and temporal candidates of a plurality of predetermined motion vector resolutions to be included in the merge candidate list, according to a predetermined order.

The above-described method of determining the motion vector resolution with reference to FIGS. 3A to 4B may not be limited to a case where the prediction unit of the current block is predicted in the AMVP mode, but may also be applied to a case where a prediction mode, in which one of the motion vector predictor candidates is directly used as a final motion vector without transmitting a residual motion vector, (e.g., a merge mode) is used.

That is, the motion vector encoding apparatus 10 and the motion vector decoding apparatus 20 may adjust the motion vector predictor candidates to be suitable for a plurality of predetermined motion vector resolutions, and may determine the adjusted motion vector predictor candidate as the motion vector of the current block. That is, the motion vector of the candidate block included in the merge candidate list may include the motion vector that is obtained by down-scaling the motion of the minimum motion vector resolution according to a plurality of predetermined motion vector resolutions. A down-scaling method will be described later with reference to FIGS. 7A and 7B.

For example, it is assumed that the minimum motion vector resolution is in the ¼-pel unit, the plurality of predetermined motion vector resolutions are in the ¼-pel, ½-pel, one-pel, and two-pel units, and the merge candidate list includes A1, B1, B0, A0, B2, and co-located blocks. The obtainer 21 of the motion vector decoding apparatus 20 configures the motion vector predictor candidates in the ¼-pel unit resolution, and adjusts the motion vector predictor in the ¼-pel unit resolution into the ½-pel, one-pel, and two-pel unit resolutions to obtain the merge candidate list of the plurality of resolutions sequentially according to the order of resolutions.

Figure 6B:
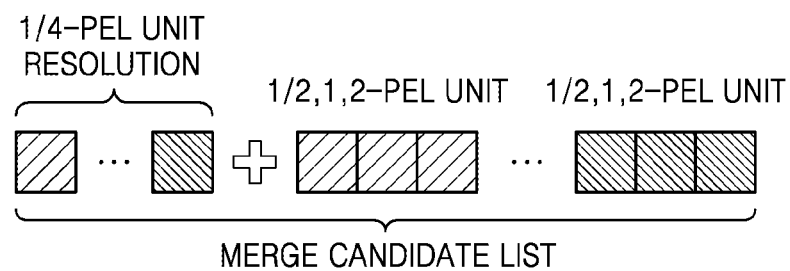
FIG. 6B is a diagram for explaining generating of a merge candidate list by using a plurality of resolutions, according to another embodiment.

FIG. 6B is a diagram of generating a merge candidate list by using a plurality of resolutions, according to another embodiment.

The motion vector encoding apparatus 10 and the motion vector decoding apparatus 20 configure the motion vector predictor candidates in the ¼-pel unit resolution as shown in FIG. 6B, and adjust each of the motion vector predictor candidates in the ¼-pel unit resolution into the ½-pel, one-pel, and two-pel unit resolutions to obtain the merge candidate list of the plurality of resolutions sequentially according to the order of motion vector predictor candidates.

When the current block includes the prediction unit predicted in the merge mode, the motion vector decoding apparatus 20 may determine the motion vector with respect to the current block, based on the merge candidate lists with respect to the plurality of resolutions obtained by the obtainer 21 and information about the merge candidate index obtained from the bitstream.

Figure 7A:
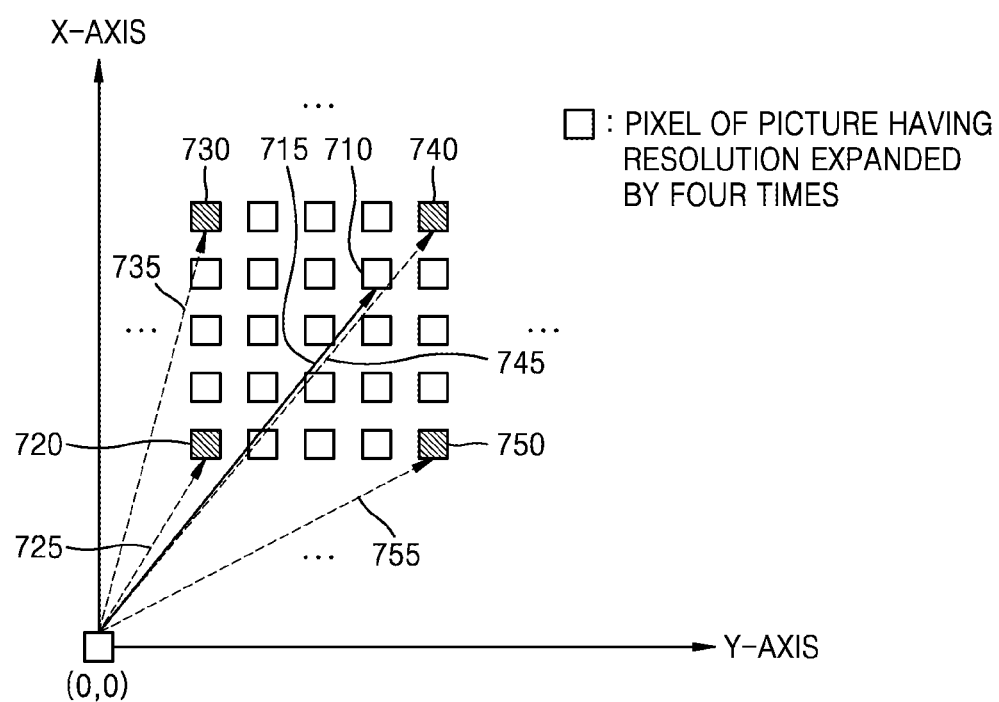
FIG. 7A shows pixels indicated by two motion vectors having different resolutions.

FIG. 7A shows pixels indicated by two motion vectors having different resolutions.

In order to adjust the motion vector of high resolution into a corresponding motion vector of low resolution, the motion vector encoding apparatus 10 may adjust the motion vector to indicate peripheral pixels instead of the pixel indicated by the motion vector of the high resolution. Selecting one of the peripheral pixels is referred to as rounding.

For example, in order to adjust a motion vector in the ¼-pel unit resolution indicating a coordinate (19, 27) based on a coordinate (0, 0), the motion vector (19, 27) in the ¼-pel unit resolution is divided by an integer 4, and rounding occurs during the dividing process. For convenience of description, it will be assumed that a motion vector of each resolution starts from the coordinate (0, 0) and indicates a coordinate (x, y) (x and y are integer).

Referring to FIG. 7A, the minimum motion vector resolution is in the ¼-pel unit, and in order to adjust a motion vector 715 in the ¼-pel unit resolution into a motion vector in the one-pel unit resolution, four integer pixels 720, 730, 740, and 750 around a pixel 710 indicated by the motion vector 715 in the ¼-pel unit resolution may be candidate pixels indicated by corresponding motion vectors 725, 735, 745, and 755 in the one-pel unit resolution. That is, when a value of a coordinate of the pixel 710 is (19, 27), a value of a coordinate of the pixel 720 may be (7, 24), a value of a coordinate of the pixel 730 may be (16, 28), a value of a coordinate of the pixel 740 may be (20, 28), and a value of a coordinate of the pixel 750 may be (20, 24).

When the motion vector encoding apparatus 10 according to the present embodiment may adjust the motion vector 710 in the ¼-pel unit resolution to the corresponding motion vector in the one-pel unit resolution, the motion vector in the one-pel unit resolution may indicate an upper-left integer pixel 740. That is, when the motion vector in the ¼-pel unit resolution starts from the coordinate (0, 0) and indicates a coordinate (19, 27), a corresponding motion vector in the one-pel unit resolution starts from the coordinate (0, 0) and indicates a coordinate (20, 28), and the final motion vector in the one-pel unit resolution may be (5, 7).

When the motion vector in the high resolution is adjusted to the motion vector in the low resolution, the motion vector encoding apparatus 10 according to the present embodiment may allow the adjusted motion vector in the low resolution to always indicate an upper-right portion of the pixel indicated by the motion vector in the high resolution. The motion vector encoding apparatus 10 according to another embodiment may allow the adjusted motion vector in the low resolution to always indicate a pixel at an upper-left portion, a lower-left portion, or a lower-right portion of the pixel indicated by the motion vector in the high resolution.

The motion vector encoding apparatus 10 may select the pixel indicated by the motion vector in the low resolution, from among four pixels at the upper-left portion, the upper-right portion, the lower-left portion, and the lower-right portion around the pixel indicated by the motion vector in the high resolution, to be different according to the motion vector resolution of the current block.

Figure 7B:
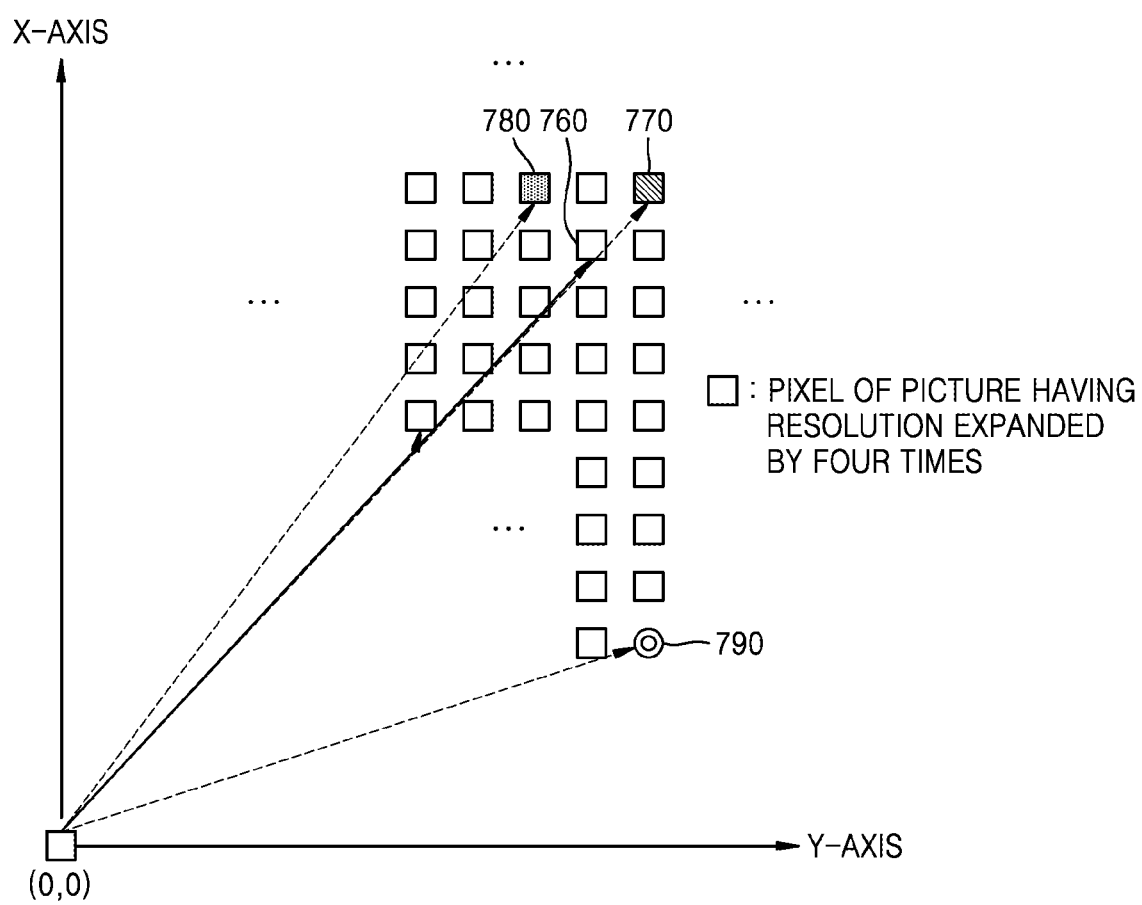
FIG. 7B shows pixels configuring a picture expanded by four times and motion vectors at different resolutions from one another.

For example, referring to FIG. 7B, it may be adjusted so that the motion vector in the ½-pel unit resolution may indicate an upper-left pixel 1080 of a pixel 1060 indicated by the motion vector in the ¼-pel unit resolution, the motion vector in the one-pel unit resolution may indicate an upper-right pixel 1070 of the pixel indicated by the motion vector in the ¼-pel unit resolution, and the motion vector in the two-pel unit resolution may indicate a lower-right pixel 1090 of the pixel indicated by the motion vector in the ¼-pel unit resolution.

The motion vector encoding apparatus 10 may determine one of the peripheral pixels to be indicated by the motion vector in the high resolution based on at least one of the resolution, the motion vector candidate in the ¼-pel unit resolution, information of peripheral block, encoding information, and an arbitrary pattern, instead of indicating the pixel previously indicated by the motion vector in the high resolution.

In addition, for convenience of description, operations of the motion vector encoding apparatus 10 are only described and operations of the motion vector decoding apparatus 20 are omitted, or operations of the motion vector decoding apparatus 20 are only described and the operations of the motion vector encoding apparatus 10 are omitted in FIGS. 3A to 7B, but one of ordinary skill in the art would appreciate that the motion vector encoding apparatus 10 and the motion vector decoding apparatus 20 may perform operations corresponding respectively to those of the motion vector decoding apparatus 20 and the motion vector encoding apparatus 10.

Hereinafter, a video encoding method and apparatus thereof, and a video decoding method and apparatus thereof based on coding units and transformation units of a tree structure, according to an embodiment, will be described with reference to FIGS. 8 through 20. The motion vector encoding apparatus 10 described above with reference to FIGS. 1A to 7B may be included in a video encoding apparatus 800. That is, the motion vector encoding apparatus 10 may encode information representing motion vector predictor for performing inter prediction on an image that the video encoding apparatus 800 is to encode, residual motion vector, and information representing a motion vector resolution by the method described above with reference to FIGS. 1A to 7B.

Figure 8:
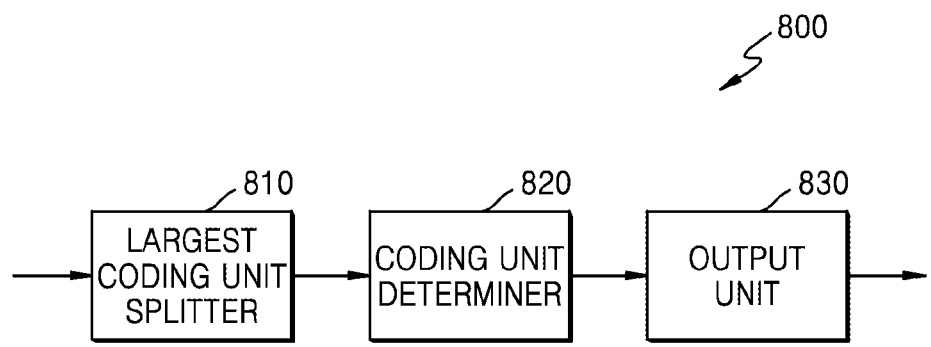
FIG. 8 is a block diagram of a video encoding apparatus based on coding units according to a tree structure, according to an embodiment of the present disclosure.

FIG. 8 is a block diagram of the video encoding apparatus based on coding units according to a tree structure 800, according to an embodiment of the present disclosure.

The video encoding apparatus involving video prediction based on coding units according to a tree structure 800 according to an embodiment includes a coding unit determiner 820 and an output unit 830. Hereinafter, for convenience of description, the video encoding apparatus involving video prediction based on coding units according to a tree structure 800 will be abbreviated to the 'video encoding apparatus 800'.

The coding unit determiner 820 may split a current picture based on a largest coding unit that is a coding unit having a maximum size for a current picture of an image. If the current picture is larger than the largest coding unit, image data of the current picture may be split into the at least one largest coding unit. The largest coding unit according to an embodiment may be a data unit having a size of 32×32, 64×64, 128×128, 256×256, etc., wherein a shape of the data unit is a square having a width and length in squares of 2.

A coding unit according to an embodiment may be characterized by a maximum size and a depth. The depth denotes the number of times the coding unit is spatially split from the largest coding unit, and as the depth deepens, deeper coding units according to depths may be split from the largest coding unit to a smallest coding unit. A depth of the largest coding unit is an uppermost depth and a depth of the smallest coding unit is a lowermost depth. Since a size of a coding unit corresponding to each depth decreases as the depth of the largest coding unit deepens, a coding unit corresponding to an upper depth may include a plurality of coding units corresponding to lower depths.

As described above, the image data of the current picture is split into the largest coding units according to a maximum size of the coding unit, and each of the largest coding units may include deeper coding units that are split according to depths. Since the largest coding unit according to an embodiment is split according to depths, the image data of a spatial domain included in the largest coding unit may be hierarchically classified according to depths.

A maximum depth and a maximum size of a coding unit, which limit the total number of times a height and a width of the largest coding unit are hierarchically split, may be predetermined.

The coding unit determiner 820 encodes at least one split region obtained by splitting a region of the largest coding unit according to depths, and determines a depth to output a finally encoded image data according to the at least one split region. That is, the coding unit determiner 120 determines a final depth by encoding the image data in the deeper coding units according to depths, according to the largest coding unit of the current picture, and selecting a depth having the minimum encoding error. The determined final depth and image data according to largest coding units are output to the output unit 830.

The image data in the largest coding unit is encoded based on the deeper coding units corresponding to at least one depth equal to or below the maximum depth, and results of encoding the image data are compared based on each of the deeper coding units. A depth having the minimum encoding error may be selected after comparing encoding errors of the deeper coding units. At least one final depth may be selected for each largest coding unit.

The size of the largest coding unit is split as a coding unit is hierarchically split according to depths, and as the number of coding units increases. Also, even if coding units correspond to the same depth in one largest coding unit, it is determined whether to split each of the coding units corresponding to the same depth to a lower depth by measuring an encoding error of the image data of the each coding unit, separately. Accordingly, even when image data is included in one largest coding unit, encoding errors according to depths may differ according to regions in the one largest coding unit, and thus the final depths may differ according to regions in the image data. Thus, one or more final depths may be determined in one largest coding unit, and the image data of the largest coding unit may be divided according to coding units of at least one final depth.

Accordingly, the coding unit determiner 820 according to an embodiment may determine coding units having a tree structure included in the largest coding unit. The 'coding units having a tree structure' according to an embodiment include coding units corresponding to a depth determined to be the final depth, from among all deeper coding units included in the largest coding unit. A coding unit of a final depth may be hierarchically determined according to depths in the same region of the largest coding unit, and may be independently determined in different regions. Similarly, a final depth in a current region may be independently determined from a final depth in another region.

A maximum depth according to an embodiment is an index related to the number of splitting times from a largest coding unit to a smallest coding unit. A first maximum depth according to an embodiment may denote the total number of splitting times from the largest coding unit to the smallest coding unit. A second maximum depth according to an embodiment may denote the total number of depth levels from the largest coding unit to the smallest coding unit. For example, when a depth of the largest coding unit is 0, a depth of a coding unit, in which the largest coding unit is split once, may be set to 1, and a depth of a coding unit, in which the largest coding unit is split twice, may be set to 2. Here, if the smallest coding unit is a coding unit in which the largest coding unit is split four times, depth levels of depths 0, 1, 2, 3, and 4 exist, and thus the first maximum depth may be set to 4, and the second maximum depth may be set to 5.

Prediction encoding and transformation may be performed according to the largest coding unit. The prediction encoding and the transformation are also performed based on the deeper coding units according to a depth equal to or depths less than the maximum depth, according to the largest coding unit.

Since the number of deeper coding units increases whenever the largest coding unit is split according to depths, encoding, including the prediction encoding and the transformation, is performed on all of the deeper coding units generated as the depth deepens. For convenience of description, the prediction encoding and the transformation will now be described based on a coding unit of a current depth, in a largest coding unit.

The video encoding apparatus 800 according to an embodiment may variously select a size or shape of a data unit for encoding the image data. In order to encode the image data, operations, such as prediction encoding, transformation, and entropy encoding, are performed, and at this time, the same data unit may be used for all operations or different data units may be used for each operation.

For example, the video encoding apparatus 800 may select not only a coding unit for encoding the image data, but also select a data unit different from the coding unit so as to perform the prediction encoding on the image data in the coding unit.

In order to perform prediction encoding in the largest coding unit, the prediction encoding may be performed based on a coding unit corresponding to a final depth according to an embodiment, i.e., based on a coding unit that is no longer split to coding units corresponding to a lower depth. Hereinafter, the coding unit that is no longer split and becomes a basis unit for prediction encoding will now be referred to as a 'prediction unit'. A partition obtained by splitting the prediction unit may include a prediction unit or a data unit obtained by splitting at least one of a height and a width of the prediction unit. A partition is a data unit where a prediction unit of a coding unit is split, and a prediction unit may be a partition having the same size as a coding unit.

For example, when a coding unit of 2N×2N (where N is a positive integer) is no longer split and becomes a prediction unit of 2N×2N, and a size of a partition may be 2N×2N, 2N×N, N×2N, or N×N. Examples of a partition mode according to an embodiment may selectively include symmetrical partitions that are obtained by symmetrically splitting a height or width of the prediction unit, partitions obtained by asymmetrically splitting the height or width of the prediction unit, such as 1:n or n:1, partitions that are obtained by geometrically splitting the prediction unit, or partitions having arbitrary shapes.

A prediction mode of the prediction unit may be at least one of an intra mode, an inter mode, and a skip mode. For example, the intra mode and the inter mode may be performed on the partition of 2N×2N, 2N×N, N×2N, or N×N. Also, the skip mode may be performed only on the partition of 2N×2N. The encoding may be independently performed on one prediction unit in a coding unit, so that a prediction mode having a minimum encoding error may be selected.

The video encoding apparatus 800 according to an embodiment may also perform the transformation on the image data in a coding unit based not only on the coding unit for encoding the image data, but also based on a data unit that is different from the coding unit. In order to perform the transformation in the coding unit, the transformation may be performed based on a transformation unit having a size smaller than or equal to the coding unit. For example, the transformation unit may include a data unit for an intra mode and a transformation unit for an inter mode.

The transformation unit in the coding unit may be recursively split into smaller sized regions in a manner similar to that in which the coding unit is split according to the tree structure, according to an embodiment. Thus, residual data in the coding unit may be split according to the transformation unit having the tree structure according to transformation depths.

A transformation depth indicating the number of splitting times to reach the transformation unit by splitting the height and width of the coding unit may also be set in the transformation unit according to an embodiment. For example, in a current coding unit of 2N×2N, a transformation depth may be 0 when the size of a transformation unit is 2N×2N, may be 1 when the size of the transformation unit is N×N, and may be 2 when the size of the transformation unit is N/2×N/2. In other words, the transformation unit having the tree structure may be set according to the transformation depths.

Split information according to depths requires not only information about a depth but also requires information related to prediction and transformation. Accordingly, the coding unit determiner 820 not only determines a depth having a minimum encoding error but also determines a partition mode in which a prediction unit is split to partitions, a prediction mode according to prediction units, and a size of a transformation unit for transformation.

Coding units according to a tree structure in a largest coding unit and methods of determining a prediction unit/partition, and a transformation unit, according to embodiments, will be described in detail below with reference to FIGS. 9 through 19.

The coding unit determiner 820 may measure an encoding error of deeper coding units according to depths by using Rate-Distortion Optimization based on Lagrangian multipliers.

The output unit 830 outputs, in bitstreams, the image data of the largest coding unit, which is encoded based on the at least one depth determined by the coding unit determiner 820, and information according to depths.

The encoded image data may be obtained by encoding residual data of an image.

The split information according to depths may include depth information, partition mode information about the prediction unit, prediction mode information, and transformation unit split information.

Final depth information may be defined by using the split information according to depths, which indicates whether encoding is performed on coding units of a lower depth instead of a current depth. If the current depth of the current coding unit is a depth, the current coding unit is encoded by using the coding unit of the current depth, and thus split information of the current depth may be defined not to split the current coding unit to a lower depth. On the contrary, if the current depth of the current coding unit is not the depth, the encoding has to be performed on the coding unit of the lower depth, and thus the split information of the current depth may be defined to split the current coding unit to the coding units of the lower depth.

If the current depth is not the depth, encoding is performed on the coding unit that is split into the coding unit of the lower depth. Since at least one coding unit of the lower depth exists in one coding unit of the current depth, the encoding is repeatedly performed on each coding unit of the lower depth, and thus the encoding may be recursively performed on the coding units having the same depth.

Since the coding units having a tree structure are determined for one largest coding unit, and at least one piece of split information has to be determined for a coding unit of a depth, at least one piece of split information may be determined for one largest coding unit. Also, a depth of data of the largest coding unit may vary according to locations since the data is hierarchically split according to depths, and thus a depth and split information may be set for the data.

Accordingly, the output unit 830 according to the present embodiment may assign encoding information about a corresponding depth and an encoding mode to at least one of the coding unit, the prediction unit, and a minimum unit included in the largest coding unit.

The minimum unit according to an embodiment is a square data unit obtained by splitting the smallest coding unit constituting the lowermost depth by 4. Alternatively, the minimum unit according to an embodiment may be a maximum square data unit that may be included in all of the coding units, prediction units, partition units, and transformation units included in the largest coding unit.

For example, the encoding information output by the output unit 830 may be classified into encoding information according to deeper coding units, and encoding information according to prediction units. The encoding information according to the deeper coding units may include the prediction mode information and the partition size information. The encoding information according to the prediction units may include information about an estimated direction during an inter mode, about a reference image index of the inter mode, about a motion vector, about a chroma component of an intra mode, and about an interpolation method during the intra mode.

Information about a maximum size of the coding unit defined according to pictures, slices, or GOPs, and information about a maximum depth may be inserted into a header of a bitstream, a sequence parameter set, or a picture parameter set.

Information about a maximum size of the transformation unit permitted with respect to a current video, and information about a minimum size of the transformation unit may also be output through a header of a bitstream, a sequence parameter set, or a picture parameter set. The output unit 830 may encode and output reference information, prediction information, and slice type information that are related to prediction.

According to the simplest embodiment for the video encoding apparatus 800, the deeper coding unit may be a coding unit obtained by dividing a height or width of a coding unit of an upper depth, which is one layer above, by two. That is, when the size of the coding unit of the current depth is 2N×2N, the size of the coding unit of the lower depth is N×N. Also, a current coding unit having a size of 2N×2N may maximally include four lower-depth coding units each having a size of N×N.

Accordingly, the video encoding apparatus 800 may form the coding units having the tree structure by determining coding units having an optimum shape and an optimum size for each largest coding unit, based on the size of the largest coding unit and the maximum depth determined considering characteristics of the current picture. Also, since encoding may be performed on each largest coding unit by using any one of various prediction modes and transformations, an optimal encoding mode may be determined by taking into account characteristics of the coding unit of various image sizes.

Thus, if an image having a high resolution or a large data amount is encoded in a conventional macroblock, the number of macroblocks per picture excessively increases. Accordingly, the number of pieces of compressed information generated for each macroblock increases, and thus it is difficult to transmit the compressed information, and data compression efficiency decreases. However, by using the video encoding apparatus according to the present embodiment, image compression efficiency may be increased since a coding unit is adjusted by taking into account characteristics of an image while increasing a maximum size of a coding unit while considering a size of the image.

Figure 9:
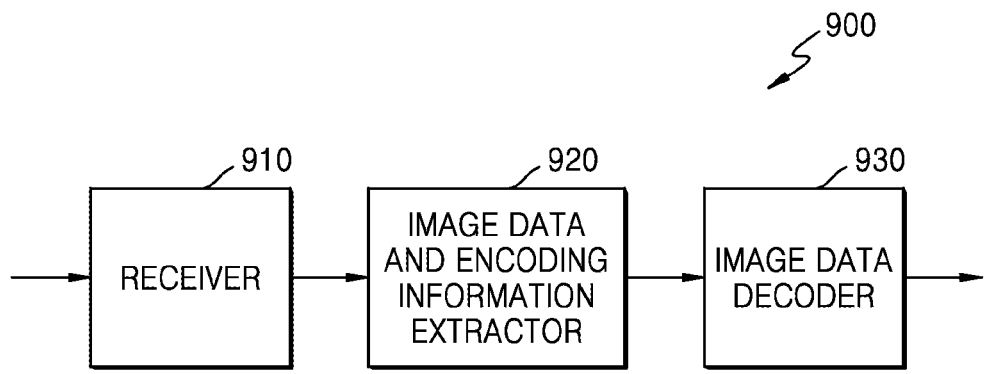
FIG. 9 illustrates a block diagram of a video decoding apparatus based on coding units of a tree structure, according to an embodiment.

FIG. 9 is a block diagram of the video decoding apparatus based on coding units according to a tree structure 900, according to an embodiment.

The motion vector decoding apparatus 20 described above with reference to FIGS. 1B to 7B may be included in the video decoding apparatus 900. That is, the motion vector decoding apparatus 20 parses information representing the motion vector predictor for performing inter prediction on an image to be decoded by the video decoding apparatus 900, the residual motion vector, and the information representing the motion vector resolution from a bitstream about encoded video, and may reconstruct the motion vector based on the parsed information.

The video decoding apparatus involving video prediction based on coding units of the tree structure 900 according to the present embodiment includes a receiver 910, an image data and encoding information extractor 920, and an image data decoder 930. Hereinafter, for convenience of description, the video decoding apparatus involving video prediction based on coding units of the tree structure 900 according to the present embodiment is referred to as the 'video decoding apparatus 900'.

Definitions of various terms, such as a coding unit, a depth, a prediction unit, a transformation unit, and various types of split information for decoding operations of the video decoding apparatus 900 according to the present embodiment are identical to those described with reference to FIG. 8 and the video encoding apparatus 800.

The receiver 910 receives and parses a bitstream of an encoded video. The image data and encoding information extractor 920 extracts encoded image data for each coding unit from the parsed bitstream, wherein the coding units have a tree structure according to each largest coding unit, and outputs the extracted image data to the image data decoder 930. The image data and encoding information extractor 920 may extract information about a maximum size of a coding unit of a current picture, from a header about the current picture, a sequence parameter set, or a picture parameter set.

Also, the image data and encoding information extractor 920 extracts a final depth and split information about the coding units having a tree structure according to each largest coding unit, from the parsed bitstream. The extracted final depth and the extracted split information are output to the image data decoder 930. That is, the image data in a bitstream is split into the largest coding unit so that the image data decoder 930 decodes the image data for each largest coding unit.

A depth and split information according to each of the largest coding units may be set for one or more pieces of depth information, and split information according to depths may include partition mode information of a corresponding coding unit, prediction mode information, and split information of a transformation unit. Also, as the depth information, the split information according to depths may be extracted.

The depth and the split information according to each of the largest coding units extracted by the image data and encoding information extractor 920 are a depth and split information determined to generate a minimum encoding error when an encoder, such as the video encoding apparatus 800, repeatedly performs encoding for each deeper coding unit according to depths according to each largest coding unit. Accordingly, the video decoding apparatus 900 may reconstruct an image by decoding data according to an encoding method that generates the minimum encoding error.

Since encoding information about the depth and the encoding mode may be assigned to a predetermined data unit from among a corresponding coding unit, a prediction unit, and a minimum unit, the image data and encoding information extractor 920 may extract the depth and the split information according to the predetermined data units. If a depth and split information of a corresponding largest coding unit are recorded according to each of the predetermined data units, predetermined data units having the same depth and the split information may be inferred to be the data units included in the same largest coding unit.

The image data decoder 930 reconstructs the current picture by decoding the image data in each largest coding unit based on the depth and the split information according to each of the largest coding units. That is, the image data decoder 930 may decode the encoded image data based on the read information about the partition mode, the prediction mode, and the transformation unit for each coding unit from among the coding units having the tree structure included in each largest coding unit. A decoding process may include a prediction including intra prediction and motion compensation, and an inverse transformation.

The image data decoder 930 may perform intra prediction or motion compensation according to a partition and a prediction mode of each coding unit, based on the information about the partition type and the prediction mode of the prediction unit of the coding unit according to depths.

In addition, the image data decoder 930 may read information about a transformation unit according to a tree structure for each coding unit so as to perform inverse transformation based on transformation units for each coding unit, for inverse transformation for each largest coding unit. Due to the inverse transformation, a pixel value of a spatial domain of the coding unit may be reconstructed.

The image data decoder 930 may determine a depth of a current largest coding unit by using split information according to depths. If the split information indicates that image data is no longer split in the current depth, the current depth is a depth. Accordingly, the image data decoder 930 may decode the image data of the current largest coding unit by using the information about the partition mode of the prediction unit, the prediction mode, and the size of the transformation unit for each coding unit corresponding to the current depth.

That is, data units containing the encoding information including the same split information may be gathered by observing the encoding information set assigned for the predetermined data unit from among the coding unit, the prediction unit, and the minimum unit, and the gathered data units may be considered to be one data unit to be decoded by the image data decoder 930 in the same encoding mode.

As such, the current coding unit may be decoded by obtaining the information about the encoding mode for each coding unit.

Figure 10:
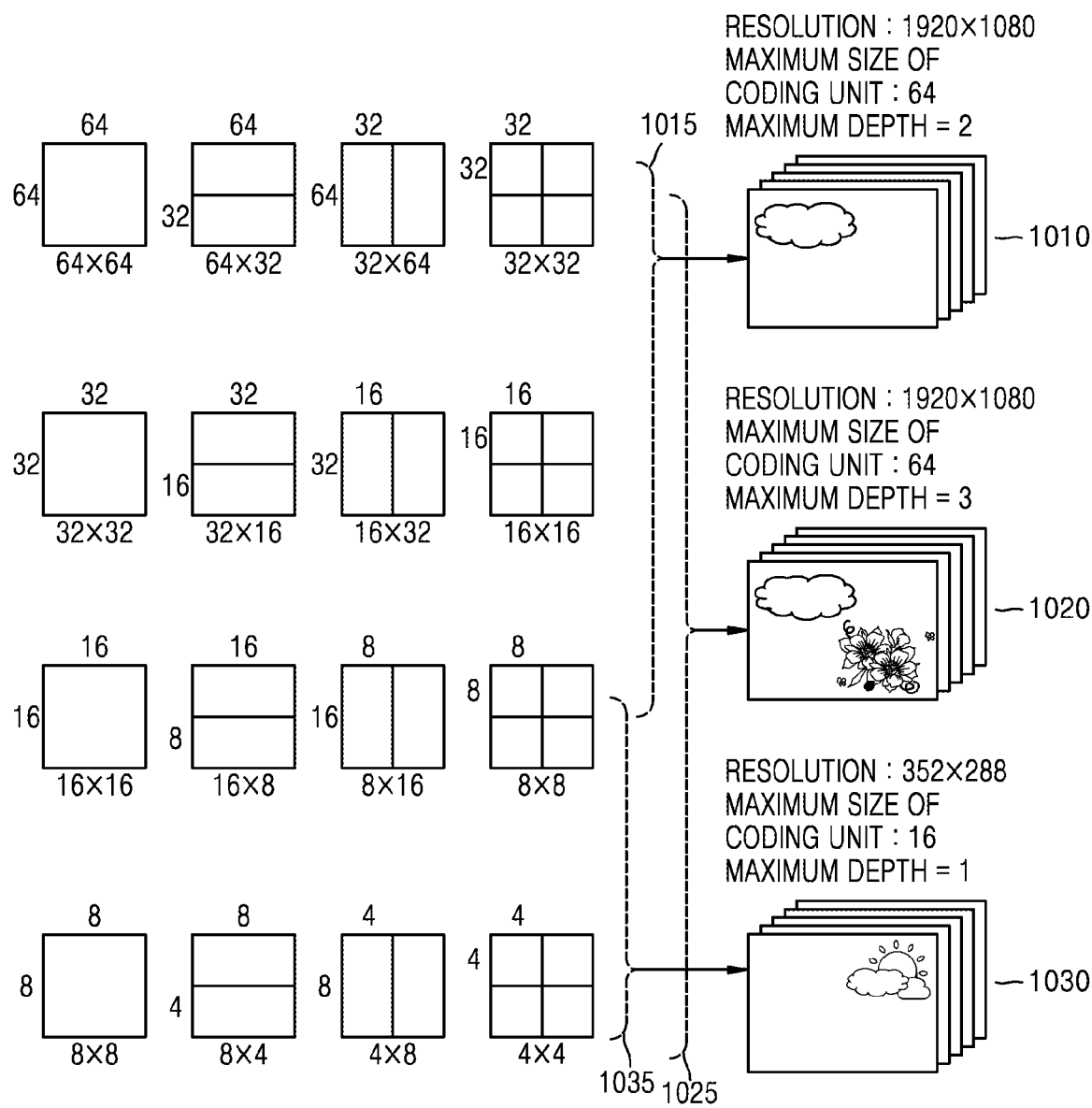
FIG. 10 illustrates a concept of coding units, according to an embodiment.

FIG. 10 illustrates a concept of coding units, according to an embodiment.

A size of a coding unit may be expressed by width x height, and may be 64×64, 32×32, 16×16, and 8×8. A coding unit of 64×64 may be split into partitions of 64×64, 64×32, 32×64, or 32×32, and a coding unit of 32×32 may be split into partitions of 32×32, 32×16, 16×32, or 16×16, a coding unit of 16×16 may be split into partitions of 16×16, 16×8, 8×16, or 8×8, and a coding unit of 8×8 may be split into partitions of 8×8, 8×4, 4×8, or 4×4.

In video data 1010, a resolution is 1920×1080, a maximum size of a coding unit is 64, and a maximum depth is 2. In video data 1020, a resolution is 1920×1080, a maximum size of a coding unit is 64, and a maximum depth is 3. In video data 1030, a resolution is 352×288, a maximum size of a coding unit is 16, and a maximum depth is 1. The maximum depth shown in FIG. 10 denotes the total number of splits from a largest coding unit to a smallest coding unit.

If a resolution is high or a data amount is large, a maximum size of a coding unit may be large so as to not only increase encoding efficiency but also to accurately reflect characteristics of an image. Accordingly, the maximum size of the coding unit of the video data 1010 and 1020 having a higher resolution than the video data 1030 may be 64.

Since the maximum depth of the video data 1010 is 2, coding units 1015 of the vide data 1010 may include a largest coding unit having a long axis size of 64, and coding units having long axis sizes of 32 and 16 since depths are deepened to two layers by splitting the largest coding unit twice. On the other hand, since the maximum depth of the video data 1030 is 1, coding units 1035 of the video data 1030 may include a largest coding unit having a long axis size of 16, and coding units having a long axis size of 8 since depths are deepened to one layer by splitting the largest coding unit once.

Since the maximum depth of the video data 1020 is 3, coding units 1025 of the video data 1020 may include a largest coding unit having a long axis size of 64, and coding units having long axis sizes of 32, 16, and 8 since the depths are deepened to 3 layers by splitting the largest coding unit three times. As a depth deepens, an expression capability with respect to detailed information may be improved.

Figure 11:
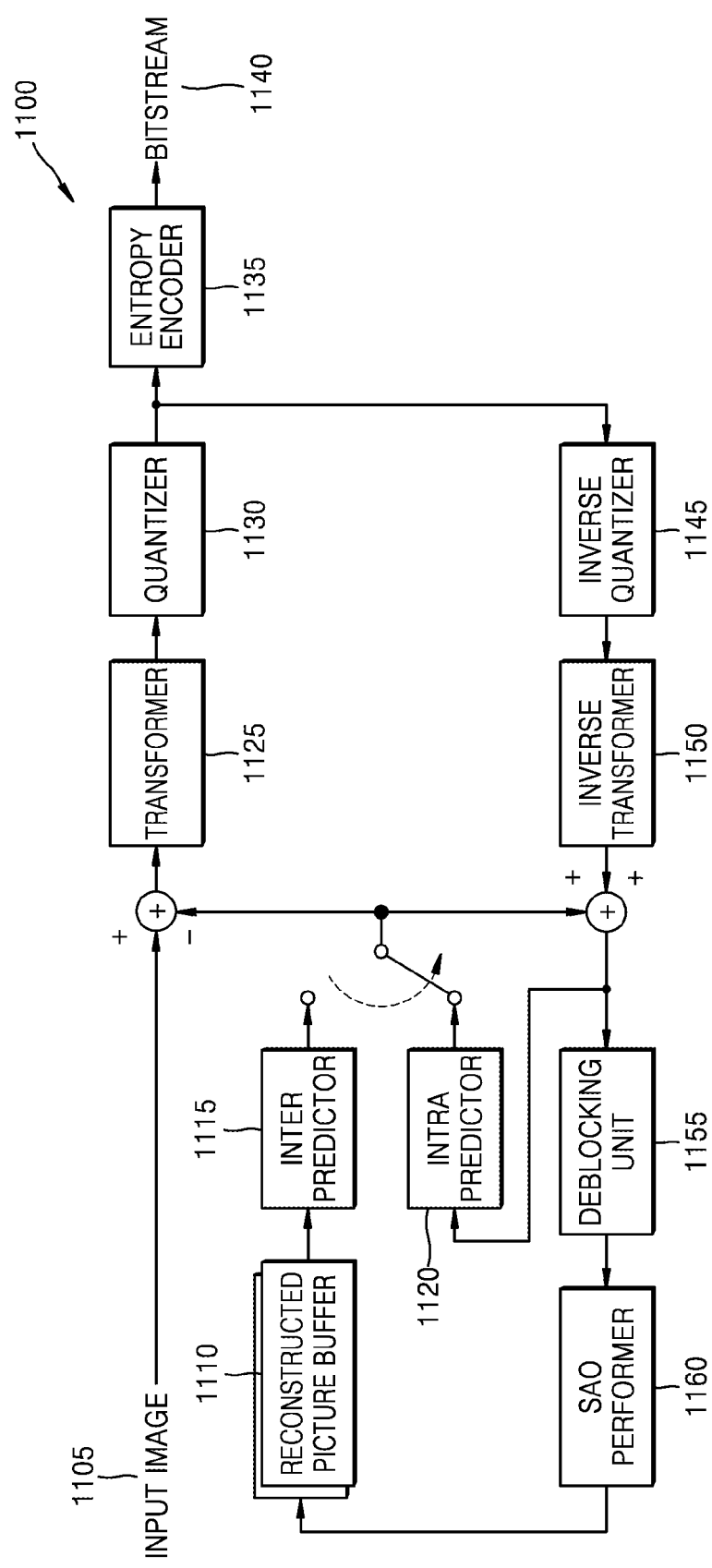
FIG. 11 illustrates a block diagram of a video encoder based on coding units, according to an embodiment.

FIG. 11 illustrates a block diagram of a video encoder 1100 based on coding units, according to an embodiment.

The video encoder 1100 according to an embodiment performs operations of a picture encoder 1520 (□ the coding unit determiner 820?) of the video encoding apparatus 800 to encode image data. That is, an intra predictor 1120 performs intra prediction on coding units in an intra mode according to prediction units, from among a current image 1105, and an inter predictor 1115 performs inter prediction on coding units in an inter mode by using the current image 1105 and a reference image obtained from a reconstructed picture buffer 1110 according to prediction units. The current image 1105 may be split into largest coding units and then the largest coding units may be sequentially encoded. In this regard, encoding may be performed on coding units of a tree structure which are split from the largest coding unit.

Residue data is generated by removing prediction data regarding coding units of each mode that is output from the intra predictor 1120 or the inter predictor 1115 from data regarding encoded coding units of the current image 1105, and the residue data is output as a quantized transformation coefficient according to transformation units via a transformer 1125 and a quantizer 1130. The quantized transformation coefficient is reconstructed to the residue data in a spatial domain via an inverse-quantizer 1145 and an inverse-transformer 1150. The reconstructed residue data in the spatial domain is added to prediction data for coding units of each mode that is output from the intra predictor 1120 or the inter predictor 1115 and thus is reconstructed as data in a spatial domain for coding units of the current image 1105. The reconstructed data in the spatial domain is generated as reconstructed images via a de-blocker 1155 and an SAO performer 1160. The reconstructed images are stored in the reconstructed picture buffer 1110. The reconstructed images stored in the reconstructed picture buffer 1110 may be used as reference images for inter prediction of another image. The transformation coefficient quantized by the transformer 1125 and the quantizer 1130 may be output as a bitstream 1140 via an entropy encoder 1135.

In order for the image encoder 1100 to be applied in the video encoding apparatus 800, all elements of the image encoder 1100, i.e., the inter predictor 1115, the intra predictor 1120, the transformer 1125, the quantizer 1130, the entropy encoder 1135, the inverse-quantizer 1145, the inverse-transformer 1150, the de-blocker 1155, and the SAO performer 1160, perform operations based on each coding unit among coding units having a tree structure according to each largest coding unit.

In particular, the intra predictor 1120 and the inter predictor 1115 may determine a partition mode and a prediction mode of each coding unit from among the coding units having a tree structure by taking into account a maximum size and a maximum depth of a current largest coding unit, and the transformer 1125 may determine whether to split a transformation unit having a quadtree structure in each coding unit from among the coding units having a tree structure.

Figure 12:
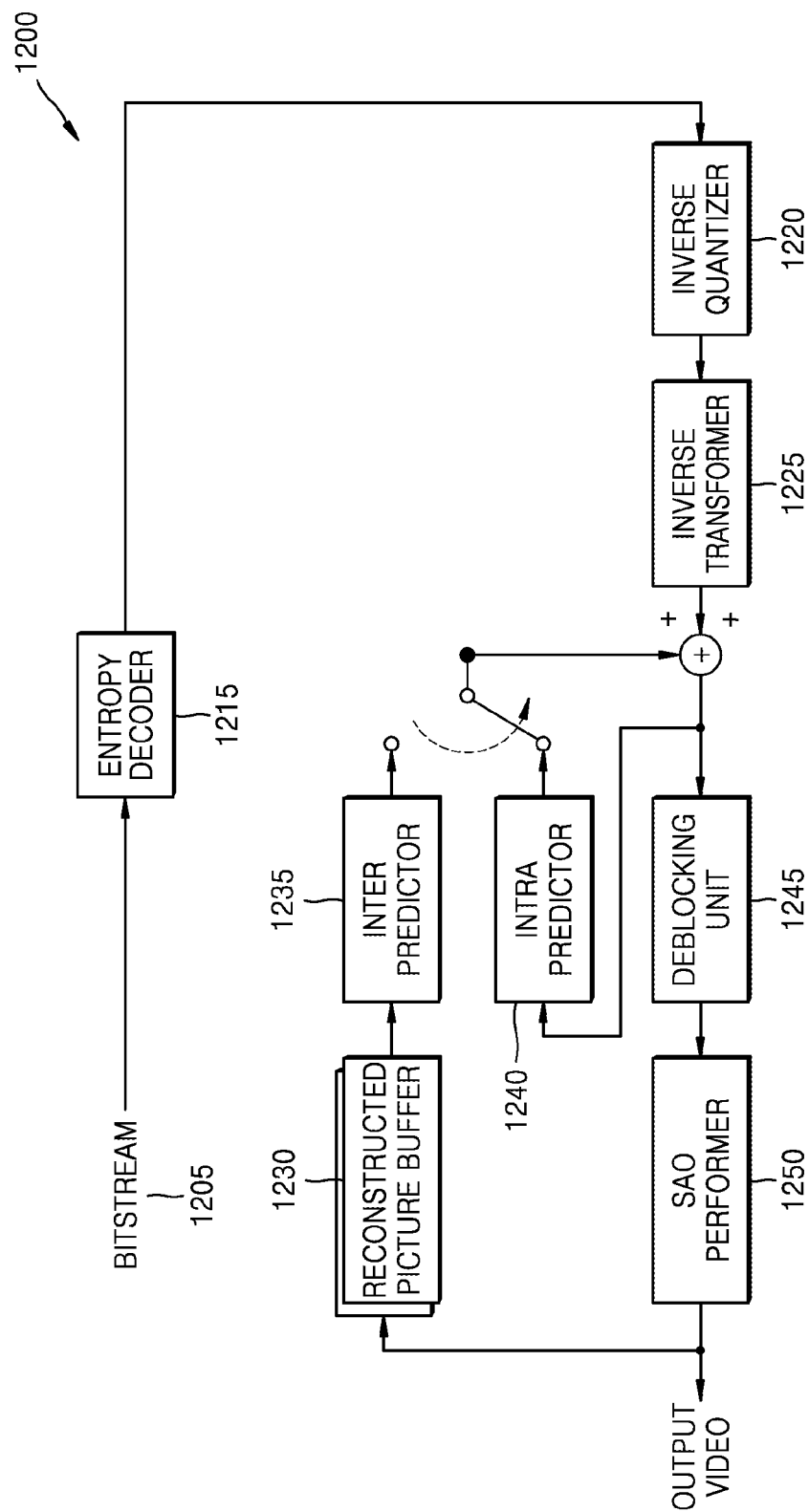
FIG. 12 illustrates a block diagram of a video decoder based on coding units, according to an embodiment.

FIG. 12 illustrates a block diagram of a video decoder 1200 based on coding units, according to an embodiment.

An entropy decoder 1215 parses decoding-target encoded image data and encoding information required for decoding from a bitstream 1205. The encoded image data is a quantized transformation coefficient, and an inverse-quantizer 1220 and an inverse-transformer 1225 reconstructs residue data from the quantized transformation coefficient.

An intra predictor 1240 performs intra prediction on coding units in an intra mode according to each prediction unit. An inter predictor 1235 performs inter prediction on coding units in an inter mode from among a current image for each prediction unit by using a reference image obtained from a reconstructed picture buffer 1230.

Prediction data and residue data regarding coding units of each mode which passed through the intra predictor 1240 or the inter predictor 1235 are summed, and thus data in a spatial domain regarding coding units of the current image 1105 may be reconstructed, and the reconstructed data in the spatial domain may be output as a reconstructed image 1260 via a deblocking unit 1245 and an SAO performer 1250. Reconstructed images stored in the reconstructed picture buffer 1230 may be output as reference images.

In order to decode the image data in a picture decoder 930 of the video decoding apparatus 900, operations after the entropy decoder 1215 of the image decoder 1200 according to an embodiment may be performed.

In order for the image decoder 1200 to be applied in the video decoding apparatus 900 according to an embodiment, all elements of the image decoder 1200, i.e., the entropy decoder 1215, the inverse-quantizer 1220, the inverse-transformer 1225, the inter predictor 1240, the inter predictor 1235, the deblocking unit 1245, and the SAO performer 1250 may perform operations based on coding units having a tree structure for each largest coding unit.

In particular, the intra predictor 1240 and the inter predictor 1235 may determine a partition mode and a prediction mode for each of the coding units having a tree structure, and the inverse-transformer 1225 may determine whether to split a transformation unit according to a quad tree structure for each of the coding units.

Figure 13:
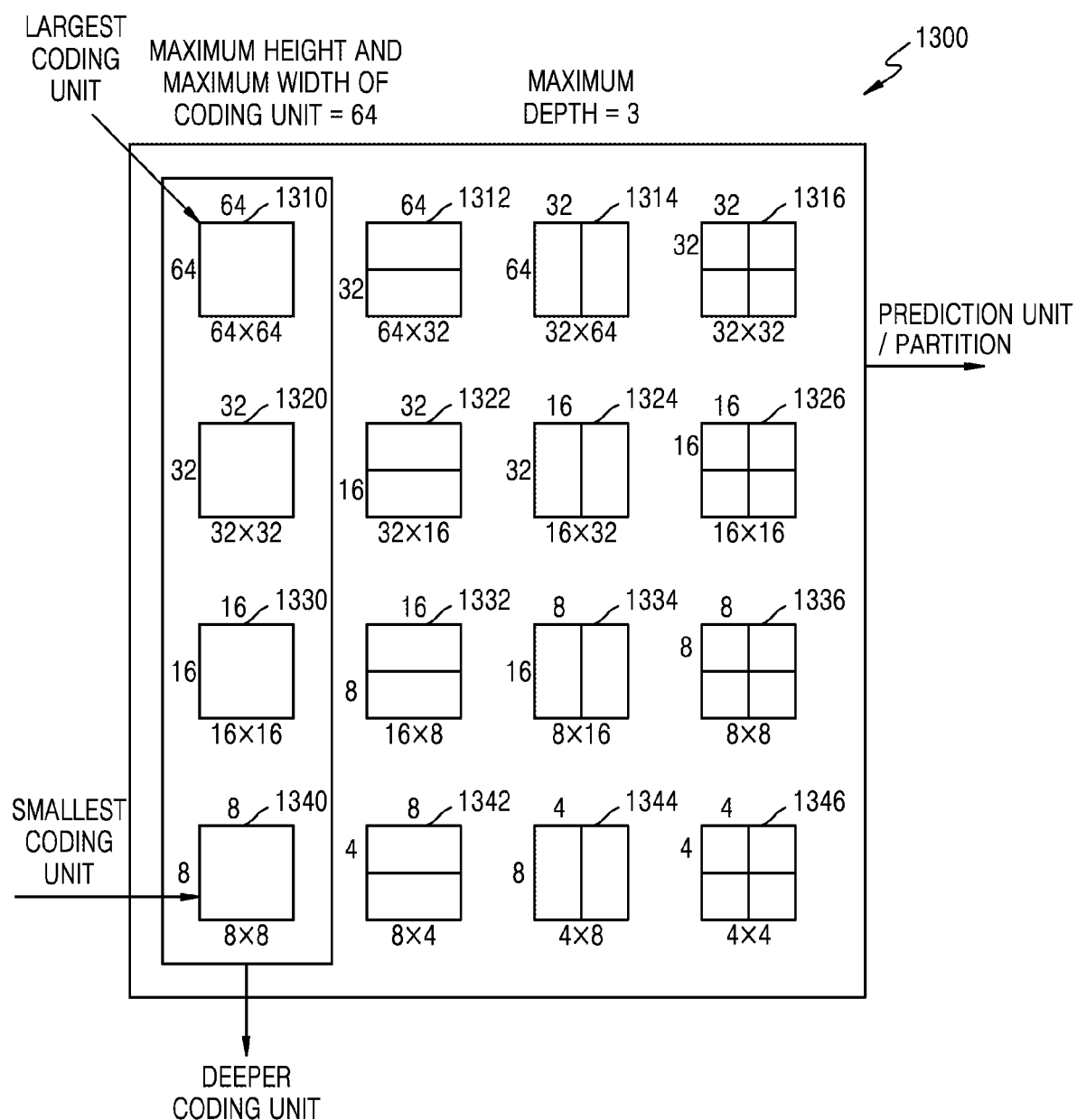
FIG. 13 illustrates deeper coding units according to depths, and partitions, according to an embodiment.

FIG. 13 illustrates deeper coding units according to depths, and partitions, according to an embodiment.

The video encoding apparatus 800 and the video decoding apparatus 900 use hierarchical coding units so as to consider characteristics of an image. A maximum height, a maximum width, and a maximum depth of coding units may be adaptively determined according to the characteristics of the image, or may be variously set according to user requirements. Sizes of deeper coding units according to depths may be determined according to the predetermined maximum size of the coding unit.

In a hierarchical structure of coding units 1300 according to an embodiment, the maximum height and the maximum width of the coding units are each 64, and the maximum depth is 3. In this case, the maximum depth refers to a total number of times the coding unit is split from the largest coding unit to the smallest coding unit. Since a depth deepens along a vertical axis of the hierarchical structure of coding units 1300, a height and a width of the deeper coding unit are each split. Also, a prediction unit and partitions, which are bases for prediction encoding of each deeper coding unit, are shown along a horizontal axis of the hierarchical structure of coding units 1300.

That is, a coding unit 1310 is a largest coding unit in the hierarchical structure of coding units 1300, wherein a depth is 0 and a size, i.e., a height by width, is 64×64. The depth deepens along the vertical axis, and a coding unit 1320 having a size of 32×32 and a depth of 1, a coding unit 1330 having a size of 16×16 and a depth of 2, and a coding unit 1340 having a size of 8×8 and a depth of 3. The coding unit 1340 having the size of 8×8 and the depth of 3 is a smallest coding unit.

The prediction unit and the partitions of a coding unit are arranged along the horizontal axis according to each depth. That is, if the coding unit 1310 having a size of 64×64 and a depth of 0 is a prediction unit, the prediction unit may be split into partitions included in the coding unit 1310 having the size of 64×64, i.e. a partition 1310 having a size of 64×64, partitions 1312 having the size of 64×32, partitions 1314 having the size of 32×64, or partitions 1316 having the size of 32×32.

Equally, a prediction unit of the coding unit 1320 having the size of 32×32 and the depth of 1 may be split into partitions included in the coding unit 1320 having the size of 32×32, i.e. a partition 1320 having a size of 32×32, partitions 1322 having a size of 32×16, partitions 1324 having a size of 16×32, and partitions 1326 having a size of 16×16.

Equally, a prediction unit of the coding unit 1330 having the size of 16×16 and the depth of 2 may be split into partitions included in the coding unit 1330 having the size of 16×16, i.e. a partition 1330 having a size of 16×16 included in the coding unit 1330, partitions 1332 having a size of 16×8, partitions 1334 having a size of 8×16, and partitions 1336 having a size of 8×8.

Equally, a prediction unit of the coding unit 1340 having the size of 8×8 and the depth of 3 may be split into partitions included in the coding unit 1340 having the size of 8×8, i.e. a partition 1340 having a size of 8×8 included in the coding unit 1340, partitions 1342 having a size of 8×4, partitions 1344 having a size of 4×8, and partitions 1346 having a size of 4×4.

The coding unit determiner 820 of the video encoding apparatus 800 has to perform encoding on each of coding units of depths included in the largest coding unit 1310 so as to determine a depth of the largest coding unit 1310.

The number of deeper coding units according to depths including data in the same range and the same size increases as the depth deepens. For example, four coding units corresponding to a depth of 2 are required to cover data that is included in one coding unit corresponding to a depth of 1. Accordingly, in order to compare encoding results of the same data according to depths, the coding unit corresponding to the depth of 1 and four coding units corresponding to the depth of 2 are each encoded.

In order to perform encoding according to each of the depths, a minimum encoding error that is a representative encoding error of a corresponding depth may be selected by performing encoding on each of prediction units of the coding units according to depths, along the horizontal axis of the hierarchical structure of coding units 1300. Alternatively, the minimum encoding error may be searched for by comparing representative encoding errors according to depths, by performing encoding for each depth as the depth deepens along the vertical axis of the hierarchical structure of coding units 1300. A depth and a partition generating the minimum encoding error in the largest coding unit 1310 may be selected as a depth and a partition mode of the largest coding unit 1310.

Figure 14:
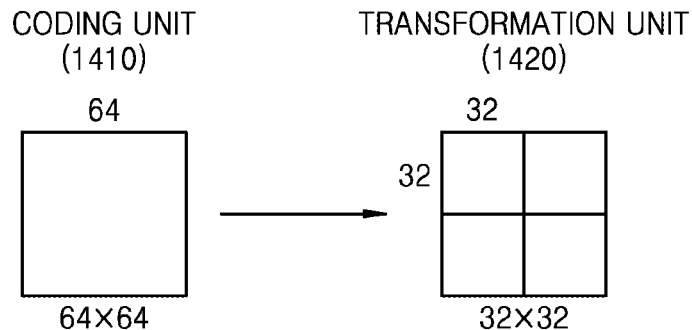
FIG. 14 illustrates a relationship between a coding unit and transformation units, according to an embodiment.

FIG. 14 illustrates a relationship between a coding unit and transformation units, according to an embodiment.

The video encoding apparatus 800 or the video decoding apparatus 900 encodes or decodes an image according to coding units having sizes smaller than or equal to a largest coding unit for each largest coding unit. Sizes of transformation units for transformation during encoding may be selected based on data units that are not larger than a corresponding coding unit.

For example, in the video encoding apparatus 800 or the video decoding apparatus 900, when a size of the coding unit 1410 is 64×64, transformation may be performed by using the transformation units 1420 having a size of 32×32.

Also, data of the coding unit 1410 having the size of 64×64 may be encoded by performing the transformation on each of the transformation units having the size of 32×32, 16×16, 8×8, and 4×4, which are smaller than 64×64, and then a transformation unit having the minimum coding error with respect to an original image may be selected.

Figure 15:
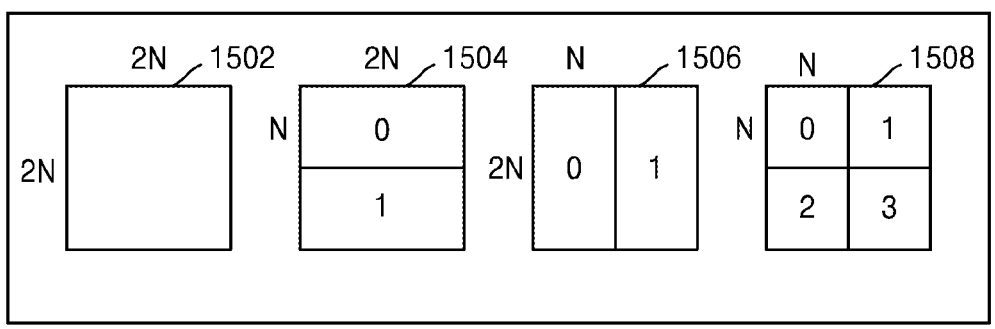
FIG. 15 illustrates a plurality of pieces of encoding information, according to an embodiment.
Figure 15:
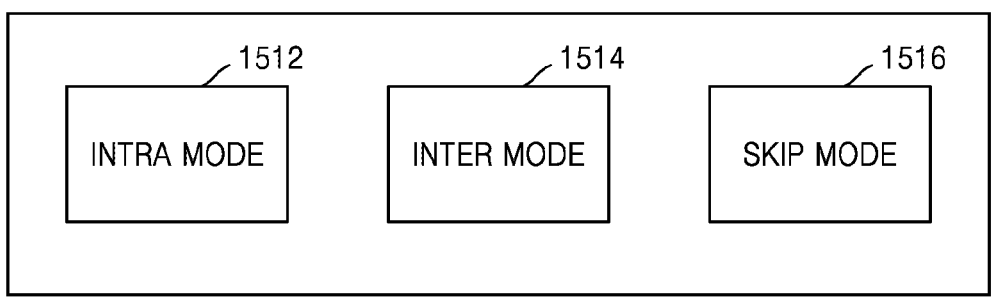
Figure 15:
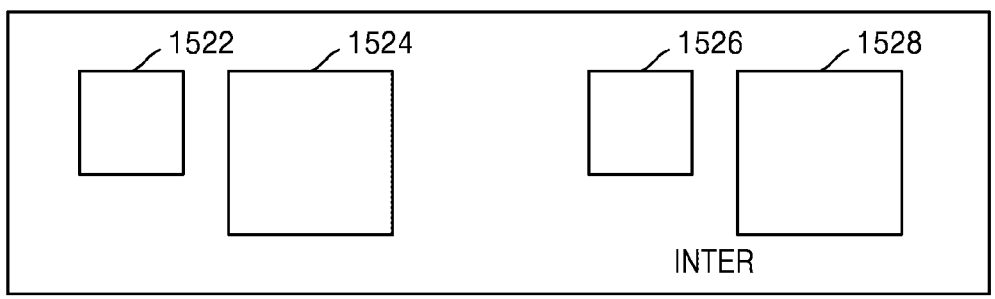

FIG. 15 illustrates a plurality of pieces of encoding information, according to an embodiment.

The output unit 830 of the video encoding apparatus 800 may encode and transmit, as split information, partition mode information 1500, prediction mode information 1510, and transformation unit size information 1520 for each coding unit corresponding to a depth.

The partition mode information 1500 indicates information about a shape of a partition obtained by splitting a prediction unit of a current coding unit, wherein the partition is a data unit for prediction encoding the current coding unit. For example, a current coding unit CU_0 having a size of 2N×2N may be split into any one of a partition 1502 having a size of 2N×2N, a partition 1504 having a size of 2N×N, a partition 1506 having a size of N×2N, and a partition 1508 having a size of N×N. Here, the partition mode information 1500 about a current coding unit is set to indicate one of the partition 1504 having a size of 2N×N, the partition 1506 having a size of N×2N, and the partition 1508 having a size of N×N.

The prediction mode information 1510 indicates a prediction mode of each partition. For example, the prediction mode information 1510 may indicate a mode of prediction encoding performed on a partition indicated by the partition mode information 1500, i.e., an intra mode 1512, an inter mode 1514, or a skip mode 1516.

The transformation unit size information 1520 indicates a transformation unit to be based on when transformation is performed on a current coding unit. For example, the transformation unit may be a first intra transformation unit size 1522, a second intra transformation unit size 1524, a first inter transformation unit size 1526, or a second inter transformation unit size 1528.

The image data and encoding information extractor 1610 of the video decoding apparatus 900 according to an embodiment may extract and use the partition mode information 1500, the prediction mode information 1510, and the transformation unit size information 1520 for decoding, according to each deeper coding unit.

Figure 16:
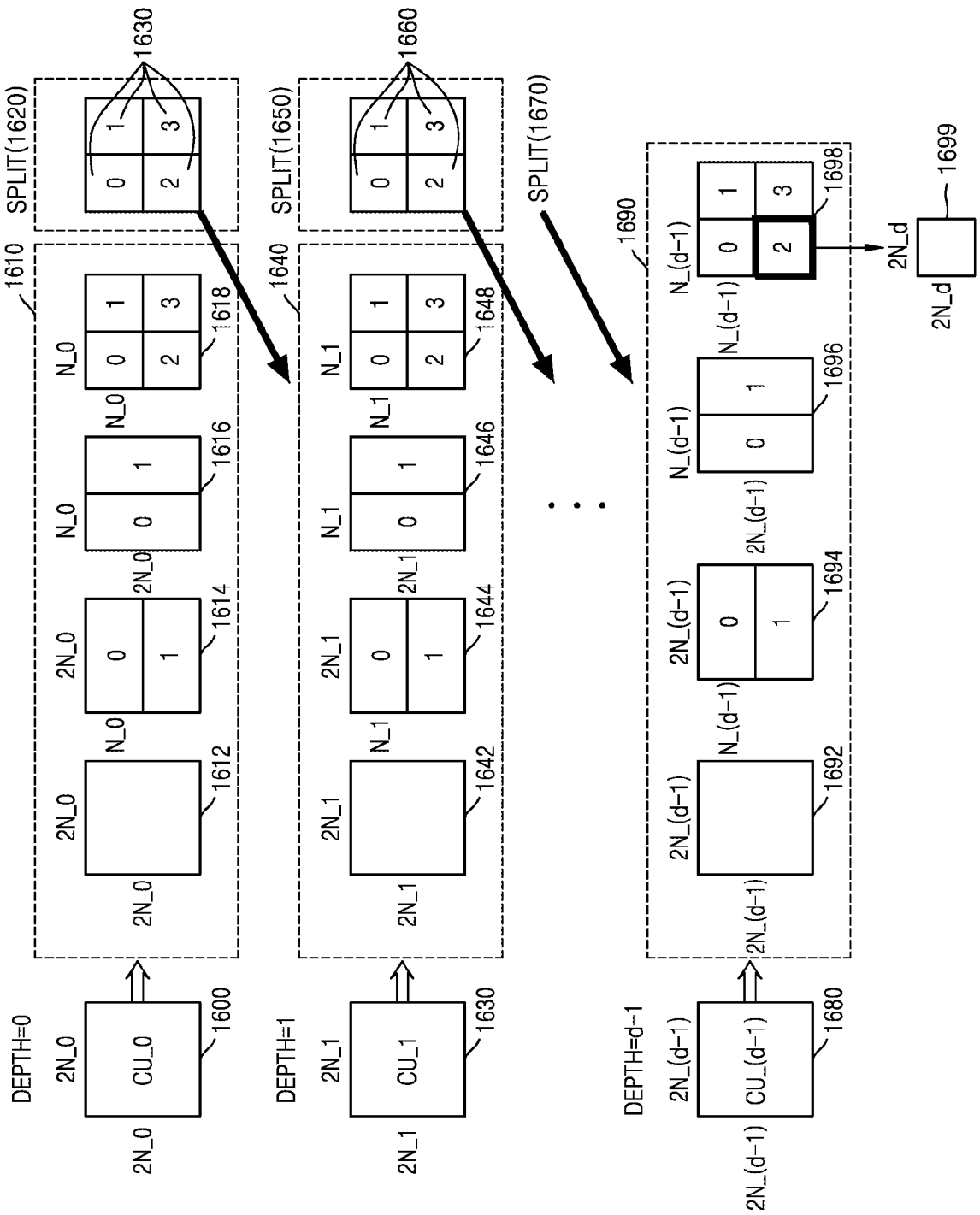
FIG. 16 illustrates deeper coding units according to depths, according to an embodiment.

FIG. 16 illustrates deeper coding units according to depths, according to an embodiment.

Split information may be used to indicate a change in a depth. The spilt information indicates whether a coding unit of a current depth is split into coding units of a lower depth.

A prediction unit 1610 for prediction encoding a coding unit 1600 having a depth of 0 and a size of 2N_0×2N_0 may include partitions of a partition mode 1612 having a size of 2N_0×2N_0, a partition mode 1614 having a size of 2N_0×N_0, a partition mode 1616 having a size of N_0×2N_0, and a partition mode 1618 having a size of N_0×N_0. Only the partition modes 1612, 1614, 1616, and 1618 which are obtained by symmetrically splitting the prediction unit are illustrated, but as described above, a partition mode is not limited thereto and may include asymmetrical partitions, partitions having a predetermined shape, partitions having a geometrical shape, or the like.

According to each partition mode, prediction encoding has to be repeatedly performed on one partition having a size of 2N_0×2N_0, two partitions having a size of 2N_0×N_0, two partitions having a size of N_0×2N_0, and four partitions having a size of N_0×N_0. The prediction encoding in an intra mode and an inter mode may be performed on the partitions having the sizes of 2N_0×2N_0, N_0×2N_0, 2N_0×N_0, and N_0×N_0. The prediction encoding in a skip mode is performed only on the partition having the size of 2N_0×2N_0.

If an encoding error is smallest in one of the partition modes 1612, 1614, and 1616 having the sizes of 2N_0×2N_0, 2N_0×N_0 and N_0×2N_0, the prediction unit 1610 may not be split into a lower depth.

If the encoding error is the smallest in the partition mode 1618 having the size of N_0×N_0, a depth is changed from 0 to 1 and split is performed (operation 1620), and encoding may be repeatedly performed on coding units 1630 of a partition mode having a depth of 2 and a size of N_0×N_0 so as to search for a minimum encoding error.

A prediction unit 1640 for prediction encoding the coding unit 1630 having a depth of 1 and a size of 2N_1×2N_1 (=N_0×N_0) may include a partition mode 1642 having a size of 2N_1×2N_1, a partition mode 1644 having a size of 2N_1×N_1, a partition mode 1646 having a size of N_1×2N_1, and a partition mode 1648 having a size of N_1×N_1.

If an encoding error is the smallest in the partition mode 1648 having the size of N_1×N_1, a depth is changed from 1 to 2 and split is performed (in operation 1650), and encoding may be repeatedly performed on coding units 1660 having a depth of 2 and a size of N_2×N_2 so as to search for a minimum encoding error.

When a maximum depth is d, deeper coding units according to depths may be set until when a depth corresponds to d−1, and split information may be set until when a depth corresponds to d−2. In other words, when encoding is performed up to when the depth is d−1 after a coding unit corresponding to a depth of d−2 is split (in operation 1670), a prediction unit 1690 for prediction encoding a coding unit 1680 having a depth of d−1 and a size of 2N_(d−1)×2N_(d−1) may include partitions of a partition mode 1692 having a size of 2N_(d−1)×2N_(d−1), a partition mode 1694 having a size of 2N_(d−1)×N_(d−1), a partition mode 1696 having a size of N_(d−1)×2N_(d−1), and a partition mode 1698 having a size of N_(d−1)×N_(d−1).

Prediction encoding may be repeatedly performed on one partition having a size of 2N_(d−1)×2N_(d−1), two partitions having a size of 2N_(d−1)×N_(d−1), two partitions having a size of N_(d−1)×2N_(d−1), four partitions having a size of N_(d−1)×N_(d−1) from among the partition modes so as to search for a partition mode having a minimum encoding error.

Even when the partition type 1698 having the size of N_(d−1)×N_(d−1) has the minimum encoding error, since a maximum depth is d, a coding unit CU_(d−1) having a depth of d−1 is no longer split into a lower depth, and a depth for the coding units constituting a current largest coding unit 1600 is determined to be d−1 and a partition mode of the current largest coding unit 1600 may be determined to be N_(d−1)×N_(d−1). Also, since the maximum depth is d, split information for the coding unit 1652 corresponding to a depth of d−1 is not set.

A data unit 1699 may be a 'minimum unit' for the current largest coding unit. A minimum unit according to the present embodiment may be a square data unit obtained by splitting a smallest coding unit having a lowermost depth by 4. By performing the encoding repeatedly, the video encoding apparatus 800 according to the present embodiment may select a depth having the minimum encoding error by comparing encoding errors according to depths of the coding unit 1600 to determine a depth, and set a corresponding partition type and a prediction mode as an encoding mode of the depth.

As such, the minimum encoding errors according to depths are compared in all of the depths of 0, 1, . . . , d−1, d, and a depth having the minimum encoding error may be determined as a depth. The depth, the partition mode of the prediction unit, and the prediction mode may be encoded and transmitted as split information. Also, since a coding unit has to be split from a depth of 0 to a depth, only split information of the depth is set to '0', and split information of depths excluding the depth is set to '1'.

The image data and encoding information extractor 920 of the video decoding apparatus 900 according to the present embodiment may extract and use a depth and prediction unit information about the coding unit 1600 so as to decode the coding unit 1612. The video decoding apparatus 900 according to the present embodiment may determine a depth, in which split information is '0', as a depth by using split information according to depths, and may use, for decoding, split information about the corresponding depth.

Figure 17:
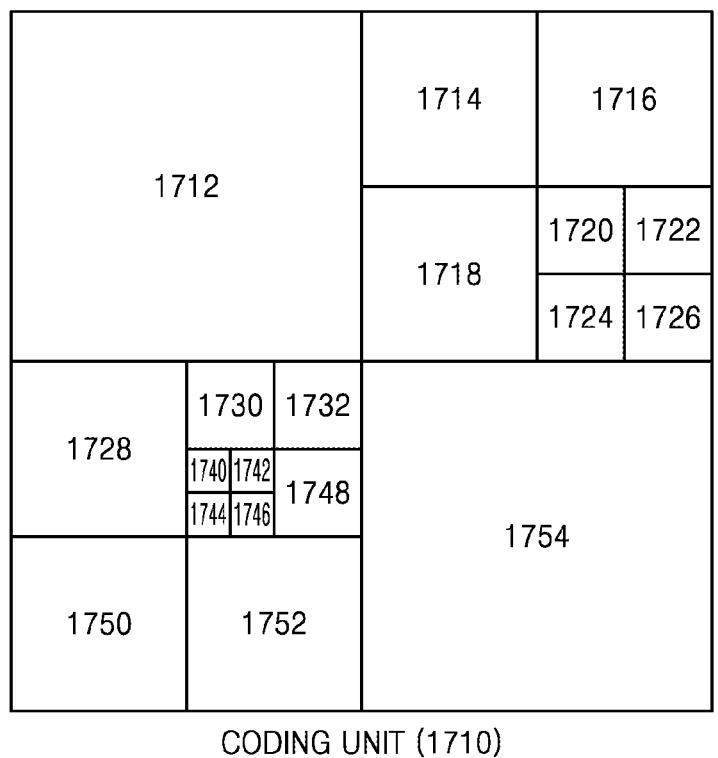
FIGS. 17, 18, and 19 illustrate a relationship between coding units, prediction units, and transformation units, according to an embodiment.
Figure 18:
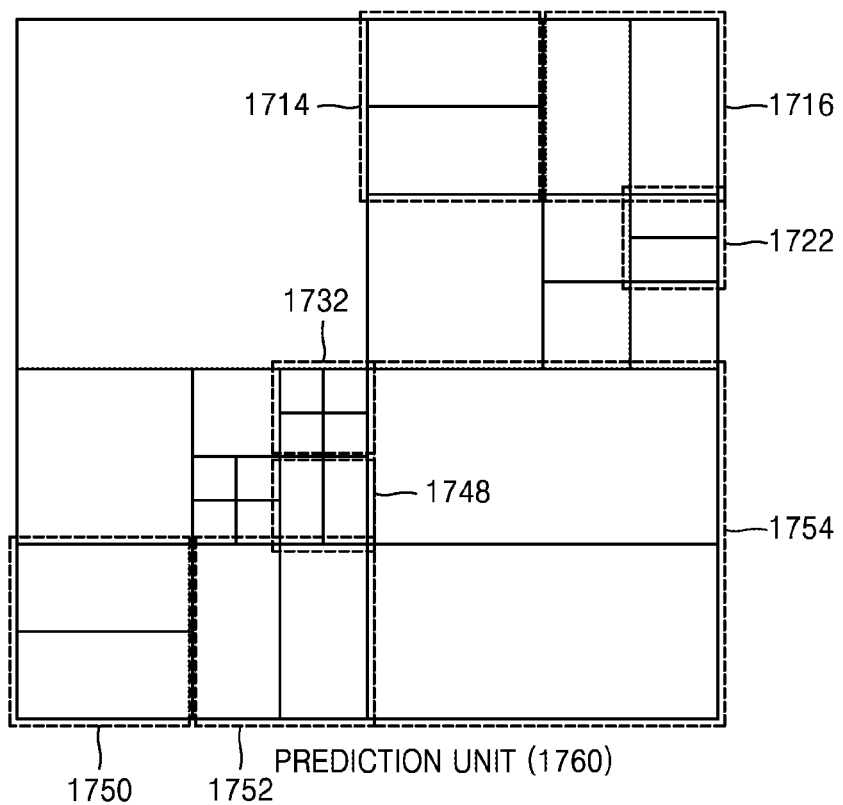
Figure 19:
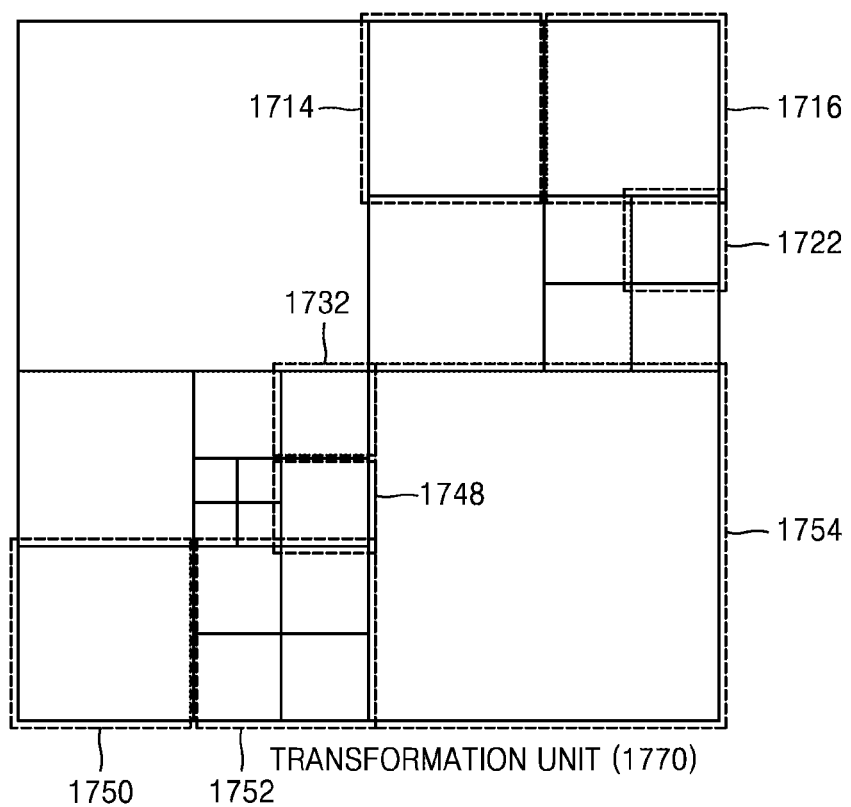

FIGS. 17, 18, and 19 illustrate a relationship between coding units, prediction units, and transformation units, according to an embodiment.

Coding units 1710 are deeper coding units according to depths determined by the video encoding apparatus 800, in a largest coding unit. Prediction units 1760 are partitions of prediction units of each of the coding units 1710 according to depths, and transformation units 1770 are transformation units of each of the coding units according to depths.

When a depth of a largest coding unit is 0 in the deeper coding units 1710, depths of coding units 1712 and 1754 are 1, depths of coding units 1714, 1716, 1718, 1728, 1750, and 1752 are 2, depths of coding units 1720, 1722, 1724, 1726, 1730, 1732, and 1748 are 3, and depths of coding units 1740, 1742, 1744, and 1746 are 4.

Some partitions 1714, 1716, 1722, 1732, 1748, 1750, 1752, and 1754 from among the prediction units 1760 are obtained by splitting the coding unit. That is, partitions 1714, 1722, 1750, and 1754 are a partition mode having a size of 2N×N, partitions 1716, 1748, and 1752 are a partition mode having a size of N×2N, and a partition 1732 is a partition mode having a size of N×N. Prediction units and partitions of the deeper coding units 1710 are smaller than or equal to each coding unit.

Transformation or inverse transformation is performed on image data of the coding unit 1752 in the transformation units 1770 in a data unit that is smaller than the coding unit 1752. Also, the coding units 1714, 1716, 1722, 1732, 1748, 1750, 1752, and 1754 in the transformation units 1760 are data units different from those in the prediction units 1760 in terms of sizes and shapes. That is, the video encoding apparatus 800 and the video decoding apparatus 900 according to embodiments may perform intra prediction/motion estimation/motion compensation/and transformation/inverse transformation on an individual data unit in the same coding unit.

Accordingly, encoding is recursively performed on each of coding units having a hierarchical structure in each region of a largest coding unit to determine an optimum coding unit, and thus coding units having a recursive tree structure may be obtained. Encoding information may include split information about a coding unit, partition mode information, prediction mode information, and transformation unit size information. Table 1 below shows an example of the encoding information that may be set by the video encoding apparatus 800 and the video decoding apparatus 900 according to embodiments.

TABLE 1

Split Information 0
(Encoding on Coding Unit having Size of 2N × 2N and Current Depth of d)

| Prediction Mode | Partition Type | | Size of Transformation Unit | | Split Information 1 |
|---|---|---|---|---|---|
| | Symmetrical Partition Type | Asymmetrical Partition Type | Split Information 0 of Transformation Unit | Split Information 1 of Transformation Unit | |
| Intra Inter Skip (Only 2N × 2N) | 2N × 2N 2N × N N × 2N N × N | 2N × nU 2N × nD nL × 2N nR × 2N | 2N × 2N | N × N (Symmetrical Partition Type) N/2 × N/2 (Asymmetrical Partition Type) | Repeatedly Encode Coding Units having Lower Depth of d + 1 |

The output unit 830 of the video encoding apparatus 800 according to the present embodiment may output the encoding information about the coding units having a tree structure, and the image data and encoding information extractor 920 of the video decoding apparatus 900 according to the present embodiment may extract the encoding information about the coding units having a tree structure from a received bitstream.

Split information specifies whether a current coding unit is split into coding units of a lower depth. If split information of a current depth d is 0, a depth, in which a current coding unit is no longer split into a lower depth, is a depth, and thus partition mode information, prediction mode information, and transformation unit size information may be defined for the depth. If the current coding unit is further split according to the split information, encoding has to be independently performed on four split coding units of a lower depth.

A prediction mode may be one of an intra mode, an inter mode, and a skip mode. The intra mode and the inter mode may be defined in all partition modes, and the skip mode is defined only in a partition mode having a size of 2N×2N.

The partition mode information may indicate symmetrical partition modes having sizes of 2N×2N, 2N×N, N×2N, and N×N, which are obtained by symmetrically splitting a height or a width of a prediction unit, and asymmetrical partition modes having sizes of 2N×nU, 2N×nD, nL×2N, and nR×2N, which are obtained by asymmetrically splitting the height or width of the prediction unit. The asymmetrical partition modes having the sizes of 2N×nU and 2N×nD may be respectively obtained by splitting the height of the prediction unit in 1:3 and 3:1, and the asymmetrical partition modes having the sizes of nL×2N and nR×2N may be respectively obtained by splitting the width of the prediction unit in 1:3 and 3:1.

The size of the transformation unit may be set to be two types in the intra mode and two types in the inter mode. That is, if split information of the transformation unit is 0, the size of the transformation unit may be 2N×2N, which is the size of the current coding unit. If split information of the transformation unit is 1, the transformation units may be obtained by splitting the current coding unit. Also, if a partition mode of the current coding unit having the size of 2N×2N is a symmetrical partition mode, a size of a transformation unit may be N×N, and if the partition mode of the current coding unit is an asymmetrical partition mode, the size of the transformation unit may be N/2×N/2.

The encoding information about coding units having a tree structure according to the present embodiment may be assigned to at least one of a coding unit corresponding to a depth, a prediction unit, and a minimum unit. The coding unit corresponding to the depth may include at least one of a prediction unit and a minimum unit containing the same encoding information.

Accordingly, it is determined whether adjacent data units are included in the same coding unit corresponding to the depth by comparing encoding information of the adjacent data units. Also, a corresponding coding unit corresponding to a depth is determined by using encoding information of a data unit, and thus a distribution of depths in a largest coding unit may be inferred.

Accordingly, if a current coding unit is predicted based on encoding information of adjacent data units, encoding information of data units in deeper coding units adjacent to the current coding unit may be directly referred to and used.

In another embodiment, if a current coding unit is predicted based on encoding information of adjacent data units, data units adjacent to the current coding unit may be searched by using encoded information of the data units, and the searched adjacent coding units may be referred for predicting the current coding unit.

Figure 20:
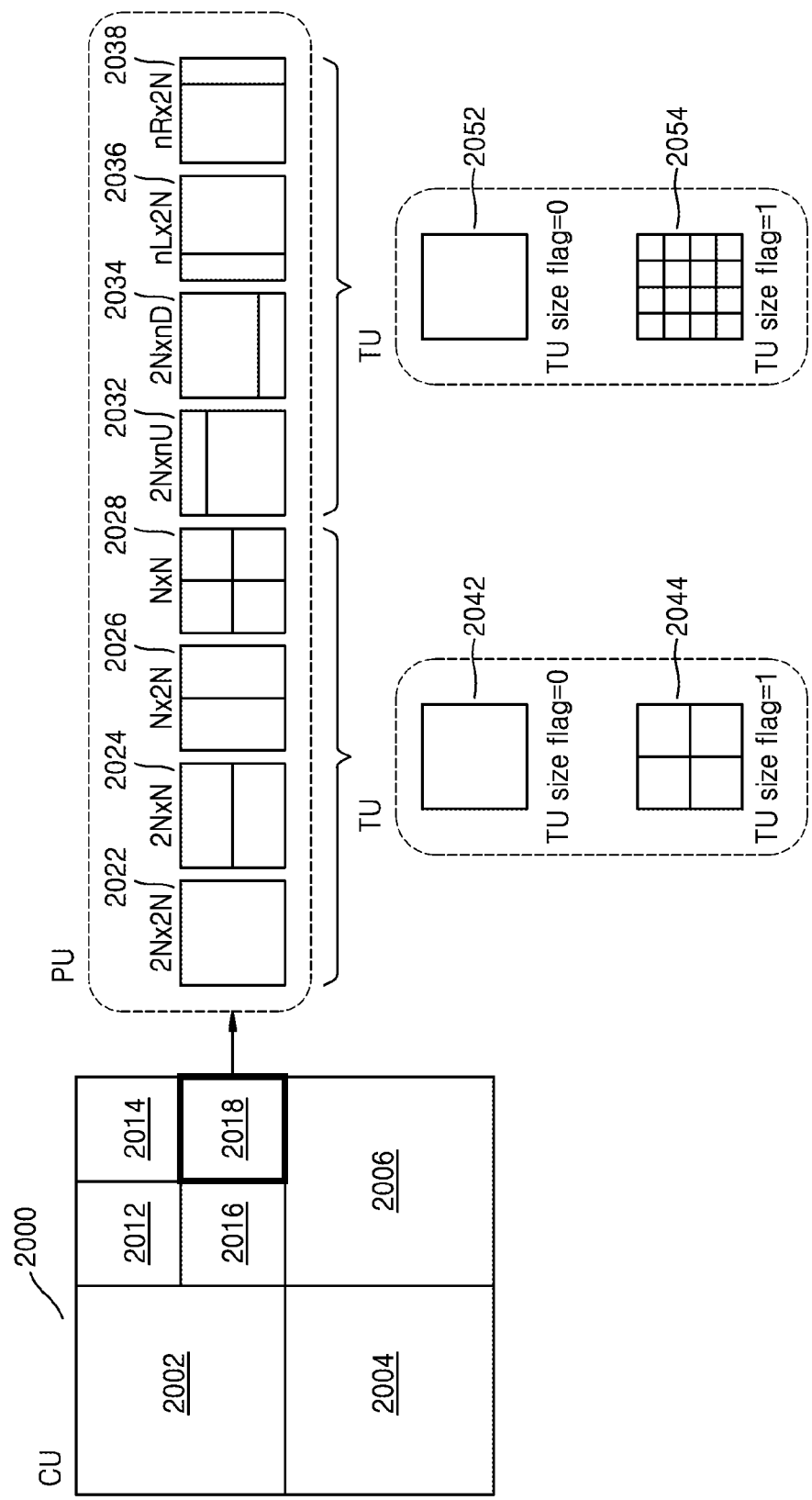
FIG. 20 illustrates a relationship between a coding unit, a prediction unit, and a transformation unit, according to encoding mode information of Table 1.

FIG. 20 illustrates a relationship between a coding unit, a prediction unit, and a transformation unit, according to encoding mode information of Table 1.

A largest coding unit 2000 includes coding units 2002, 2004, 2006, 2012, 2014, 2016, and 2018 of depths. Here, since the coding unit 2018 is a coding unit of a depth, split information may be set to 0. Partition mode information of the coding unit 2018 having a size of 2N×2N may be set to be one of partition modes including 2N×2N 2022, 2N×N 2024, N×2N 2026, N×N 2028, 2N×nU 2032, 2N×nD 2034, nL×2N 2036, and nR×2N 2038.

Transformation unit split information (TU size flag) is a type of a transformation index, and a size of a transformation unit corresponding to the transformation index may be changed according to a prediction unit type or partition mode of the coding unit.

For example, when the partition mode information is set to be one of symmetrical partition modes 2N×2N 2022, 2N×N 2024, N×2N 2026, and N×N 2028, if the transformation unit split information is 0, a transformation unit 2042 having a size of 2N×2N is set, and if the transformation unit split information is 1, a transformation unit 2044 having a size of N×N may be set.

When the partition mode information is set to be one of asymmetrical partition modes 2N×nU 2032, 2N×nD 2034, nL×2N 2036, and nR×2N 2038, if the transformation unit split information (TU size flag) is 0, a transformation unit 2052 having a size of 2N×2N may be set, and if the transformation unit split information is 1, a transformation unit 2054 having a size of N/2×N/2 may be set.

The transformation unit split information (TU size flag) described above with reference to FIG. 19 is a flag having a value of 0 or 1, but the transformation unit split information according to an embodiment is not limited to a flag having 1 bit, and the transformation unit may be hierarchically split while the transformation unit split information increases in a manner of 0, 1, 2, 3 . . . etc., according to setting. The transformation unit split information may be an example of the transformation index.

In this case, the size of a transformation unit that has been actually used may be expressed by using the transformation unit split information according to the present embodiment, together with a maximum size of the transformation unit and a minimum size of the transformation unit. The video encoding apparatus 800 according to the present embodiment may encode maximum transformation unit size information, minimum transformation unit size information, and maximum transformation unit split information. The result of encoding the maximum transformation unit size information, the minimum transformation unit size information, and the maximum transformation unit split information may be inserted into an SPS. The video decoding apparatus 900 according to the present embodiment may decode video by using the maximum transformation unit size information, the minimum transformation unit size information, and the maximum transformation unit split information.

For example, (a) if the size of a current coding unit is 64×64 and a maximum transformation unit size is 32×32, (a-1) then the size of a transformation unit may be 32×32 when a TU size flag is 0, (a-2) may be 16×16 when the TU size flag is 1, and (a-3) may be 8×8 when the TU size flag is 2.

As another example, (b) if the size of the current coding unit is 32×32 and a minimum transformation unit size is 32×32, (b-1) then the size of the transformation unit may be 32×32 when the TU size flag is 0. Here, the TU size flag cannot be set to a value other than 0, since the size of the transformation unit cannot be less than 32×32.

As another example, (c) if the size of the current coding unit is 64×64 and a maximum TU size flag is 1, then the TU size flag may be 0 or 1. Here, the TU size flag cannot be set to a value other than 0 or 1.

Thus, if it is defined that the maximum TU size flag is 'MaxTransformSizeIndex', a minimum transformation unit size is 'MinTransformSize', and a transformation unit size is 'RootTuSize' when the TU size flag is 0, then a current minimum transformation unit size 'CurrMinTuSize' that can be determined in a current coding unit may be defined by Equation (1):

$$CurrMinTuSize = max(MinTransformSize, RootTuSize/(2^{MaxTransformSizeIndex})) \quad (1)$$

Compared to the current minimum transformation unit size 'CurrMinTuSize' that can be determined in the current coding unit, a transformation unit size 'RootTuSize' when the TU size flag is 0 may denote a maximum transformation unit size that can be selected in the system. 'RootTuSize/(2^MaxTransformSizeIndex)' denotes a transformation unit size when the transformation unit size 'RootTuSize', when the TU size flag is 0, is split by the number of times corresponding to the maximum TU size flag, and 'MinTransformSize' denotes a minimum transformation size. Thus, a smaller value from among 'RootTuSize/(2^Ma-xTransformSizeIndex)' and 'MinTransformSize' may be the current minimum transformation unit size 'CurrMinTuSize' that can be determined in the current coding unit.

According to an embodiment, the maximum transformation unit size RootTuSize may vary according to the type of a prediction mode.

For example, if a current prediction mode is an inter mode, then 'RootTuSize' may be determined by using Equation (2) below. In Equation (2), 'MaxTransformSize' denotes a maximum transformation unit size, and 'PUSize' denotes a current prediction unit size.

$$RootTuSize = min(MaxTransformSize, PUSize) \quad (2)$$

That is, if the current prediction mode is the inter mode, the transformation unit size 'RootTuSize', when the TU size flag is 0, may be a smaller value from among the maximum transformation unit size and the current prediction unit size.

If a prediction mode of a current partition unit is an intra mode, 'RootTuSize' may be determined by using Equation (3) below. In Equation (3), 'PartitionSize' denotes the size of the current partition unit.

$$RootTuSize = min(MaxTransformSize, PartitionSize) \quad (3)$$

That is, if the current prediction mode is the intra mode, the transformation unit size 'RootTuSize' when the TU size flag is 0 may be a smaller value from among the maximum transformation unit size and the size of the current partition unit.

However, the current maximum transformation unit size 'RootTuSize' that varies according to the type of a prediction mode in a partition unit is just an embodiment, and a factor for determining the current maximum transformation unit size is not limited thereto.

According to the video encoding method based on coding units of a tree structure described above with reference to FIGS. 8 through 20, image data of a spatial domain is encoded in each of the coding units of the tree structure, and the image data of the spatial domain is reconstructed in a manner that decoding is performed on each largest coding unit according to the video decoding method based on the coding units of the tree structure, so that a video that is formed of pictures and picture sequences may be reconstructed. The reconstructed video may be reproduced by a reproducing apparatus, may be stored in a storage medium, or may be transmitted via a network.

The one or more embodiments of the present disclosure may be written as computer programs and may be implemented in general-use digital computers that execute the programs by using a non-transitory computer-readable recording medium. Examples of the non-transitory computer-readable recording medium include magnetic storage media (e.g., ROM, floppy disks, hard disks, etc.), optical recording media (e.g., CD-ROMs, or DVDs), etc.

For convenience of description, the video encoding methods and/or the video encoding method, which are described with reference to FIGS. 1A through 20, will be collectively referred to as 'the video encoding method of the present disclosure'. Also, the video decoding methods and/or the video decoding method, which are described with reference to FIGS. 1A through 20, will be collectively referred to as 'the video decoding method of the present disclosure'.

Also, a video encoding apparatus including the video encoding apparatus, the video encoding apparatus 800, or the video encoder 1100, which has been described with reference to FIGS. 1A through 20, will be referred to as a 'video encoding apparatus of the present disclosure'. In addition, a video decoding apparatus including the video decoding apparatus 900 or the video decoder 1200, which has been descried with reference to FIGS. 1A through 20, will be referred to as a 'video decoding apparatus of the present disclosure'.

A non-transitory computer-readable recording medium such as a disc 26000 that stores the programs according to an embodiment will now be described in detail.

Figure 21:
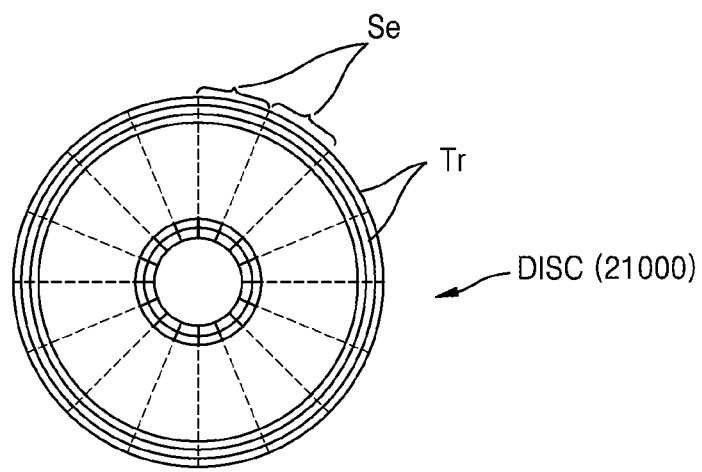
FIG. 21 illustrates a physical structure of a disc in which a program is stored, according to an embodiment.

FIG. 21 illustrates a physical structure of the disc 26000 in which a program is stored, according to an embodiment. The disc 26000, as a storage medium, may be a hard drive, a compact disc-read only memory (CD-ROM) disc, a Blu-ray disc, or a digital versatile disc (DVD). The disc 26000 includes a plurality of concentric tracks Tr that are each divided into a specific number of sectors Se in a circumferential direction of the disc 26000. In a specific region of the disc 26000, a program that executes the quantized parameter determining method, the video encoding method, and the video decoding method described above may be assigned and stored.

A computer system embodied using a storage medium that stores a program for executing the video encoding method and the video decoding method as described above will now be described with reference to FIG. 22.

Figure 22:
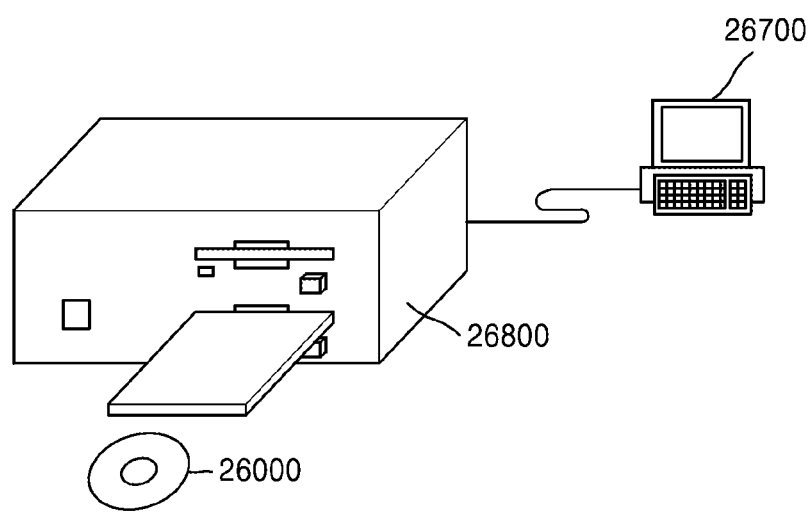
FIG. 22 illustrates a disc drive for recording and reading a program by using the disc.

FIG. 22 illustrates a disc drive 26800 for recording and reading a program by using the disc 26000. A computer system 26700 may store a program that executes at least one of the video encoding method and the video decoding method of the present disclosure, in the disc 26000 via the disc drive 26800. In order to run the program stored in the disc 26000 in the computer system 26700, the program may be read from the disc 26000 and be transmitted to the computer system 26700 by using the disc drive 26800.

The program that executes at least one of the video encoding method and the video decoding method of the present disclosure may be stored not only in the disc 26000 illustrated in FIGS. 21 and 22 but also in a memory card, a ROM cassette, or a solid state drive (SSD).

A system to which the video encoding method and the video decoding method described above are applied will be described below.

Figure 23:
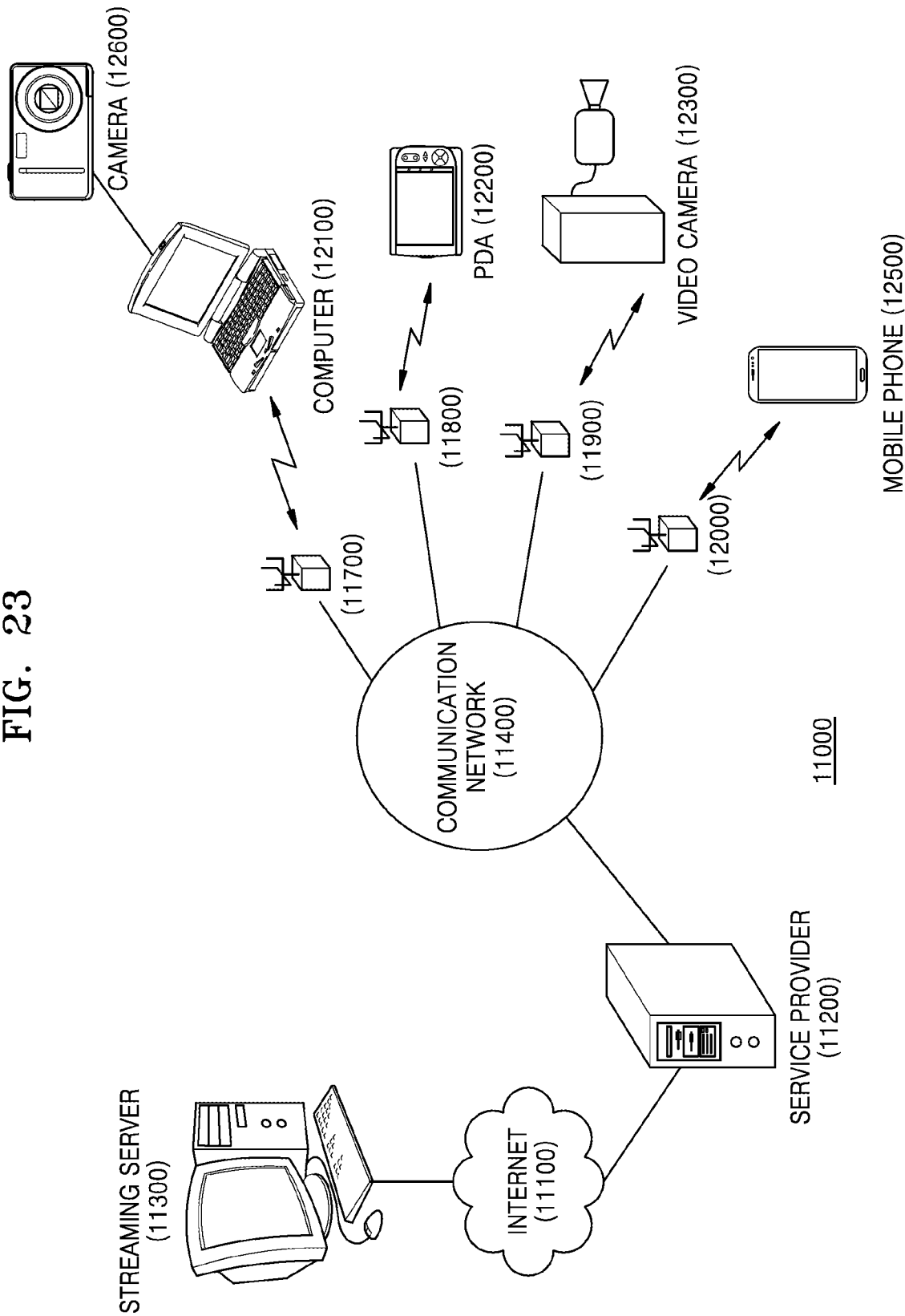
FIG. 23 illustrates an overall structure of a content supply system for providing a content distribution service.

FIG. 23 illustrates a diagram of an overall structure of a content supply system 11000 for providing a content distribution service. A service area of a communication system is divided into predetermined-sized cells, and wireless base stations 11700, 11800, 11900, and 12000 are installed in these cells, respectively.

The content supply system 11000 includes a plurality of independent devices. For example, the plurality of independent devices, such as a computer 12100, a personal digital assistant (PDA) 12200, a video camera 12300, and a mobile phone 12500, are connected to the Internet 11100 via an internet service provider 11200, a communication network 11400, and the wireless base stations 11700, 11800, 11900, and 12000.

However, the content supply system 11000 is not limited to as illustrated in FIG. 23, and devices may be selectively connected thereto. The plurality of independent devices may be directly connected to the communication network 11400, not via the wireless base stations 11700, 11800, 11900, and 12000.

The video camera 12300 is an imaging device, e.g., a digital video camera, which is capable of capturing video images. The mobile phone 12500 may employ at least one communication method from among various protocols, e.g., Personal Digital Communications (PDC), Code Division Multiple Access (CDMA), Wideband-Code Division Multiple Access (W-CDMA), Global System for Mobile Communications (GSM), and Personal Handyphone System (PHS).

The video camera 12300 may be connected to a streaming server 11300 via the wireless base station 11900 and the communication network 11400. The streaming server 11300 allows content received from a user via the video camera 12300 to be streamed via a real-time broadcast. The content received from the video camera 12300 may be encoded by the video camera 12300 or the streaming server 11300. Video data captured by the video camera 12300 may be transmitted to the streaming server 11300 via the computer 12100.

Video data captured by using a camera 12600 may also be transmitted to the streaming server 11300 via the computer 12100. The camera 12600 is an imaging device capable of capturing both still images and video images, similar to a digital camera. The video data captured by using the camera 12600 may be encoded by using the camera 12600 or the computer 12100. Software that performs encoding and decoding video may be stored in a non-transitory computer-readable recording medium, e.g., a CD-ROM disc, a floppy disc, a hard disc drive, an SSD, or a memory card, which may be accessed by the computer 12100.

If video data is captured by using a camera built in the mobile phone 12500, the video data may be received from the mobile phone 12500.

The video data may also be encoded by a large scale integrated circuit (LSI) system installed in the video camera 12300, the mobile phone 12500, or the camera 12600.

The content supply system 11000 may encode content data recorded by a user using the video camera 12300, the camera 12600, the mobile phone 12500, or another imaging device, e.g., content recorded during a concert, and transmit the encoded content data to the streaming server 11300. The streaming server 11300 may transmit the encoded content data in a type of a streaming content to other clients that request the content data.

The clients are devices capable of decoding the encoded content data, e.g., the computer 12100, the PDA 12200, the video camera 12300, or the mobile phone 12500. Thus, the content supply system 11000 allows the clients to receive and reproduce the encoded content data. Also, the content supply system 11000 allows the clients to receive the encoded content data and decode and reproduce the encoded content data in real time, thereby enabling personal broadcasting.

Encoding and decoding operations of the plurality of independent devices included in the content supply system 11000 may be similar to those of a video encoding apparatus and a video decoding apparatus according to embodiments.

Figure 24:
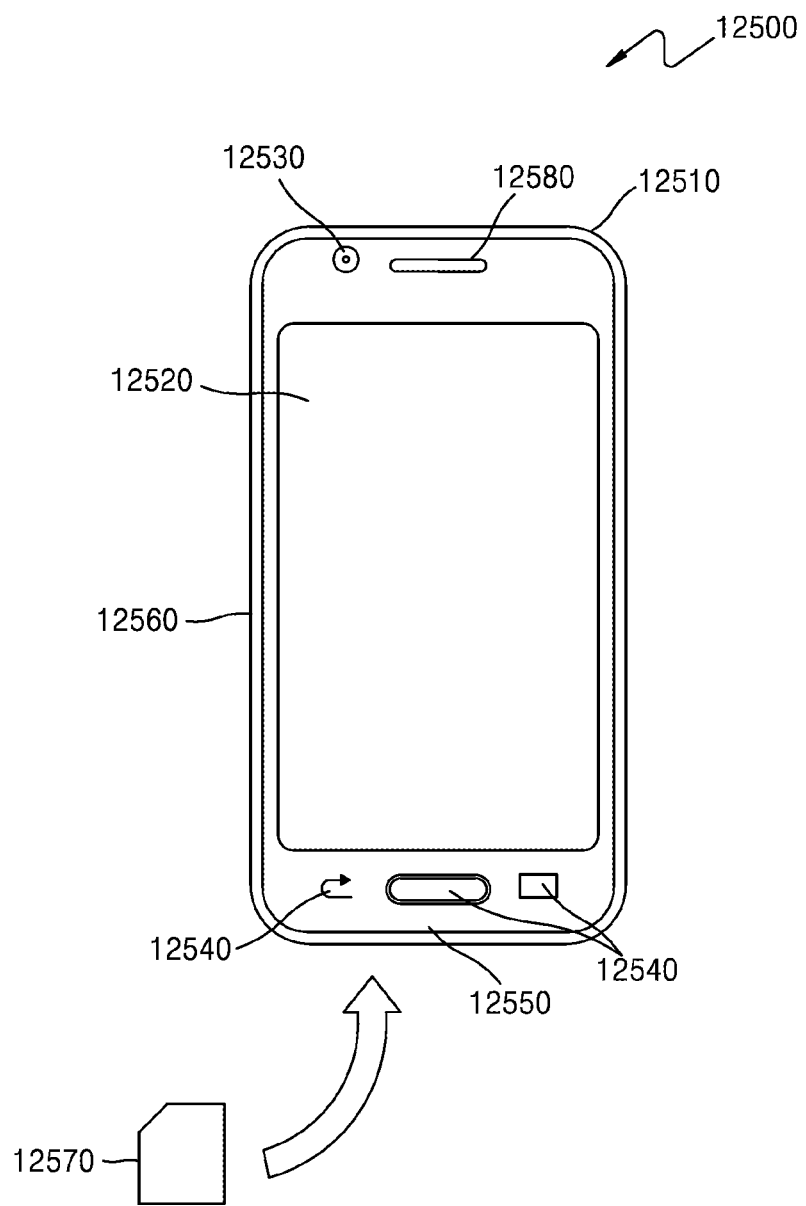
FIG. 24 illustrates an external structure of a mobile phone to which the video encoding method and the video decoding method of the present disclosure are applied, according to an embodiment.
Figure 25:
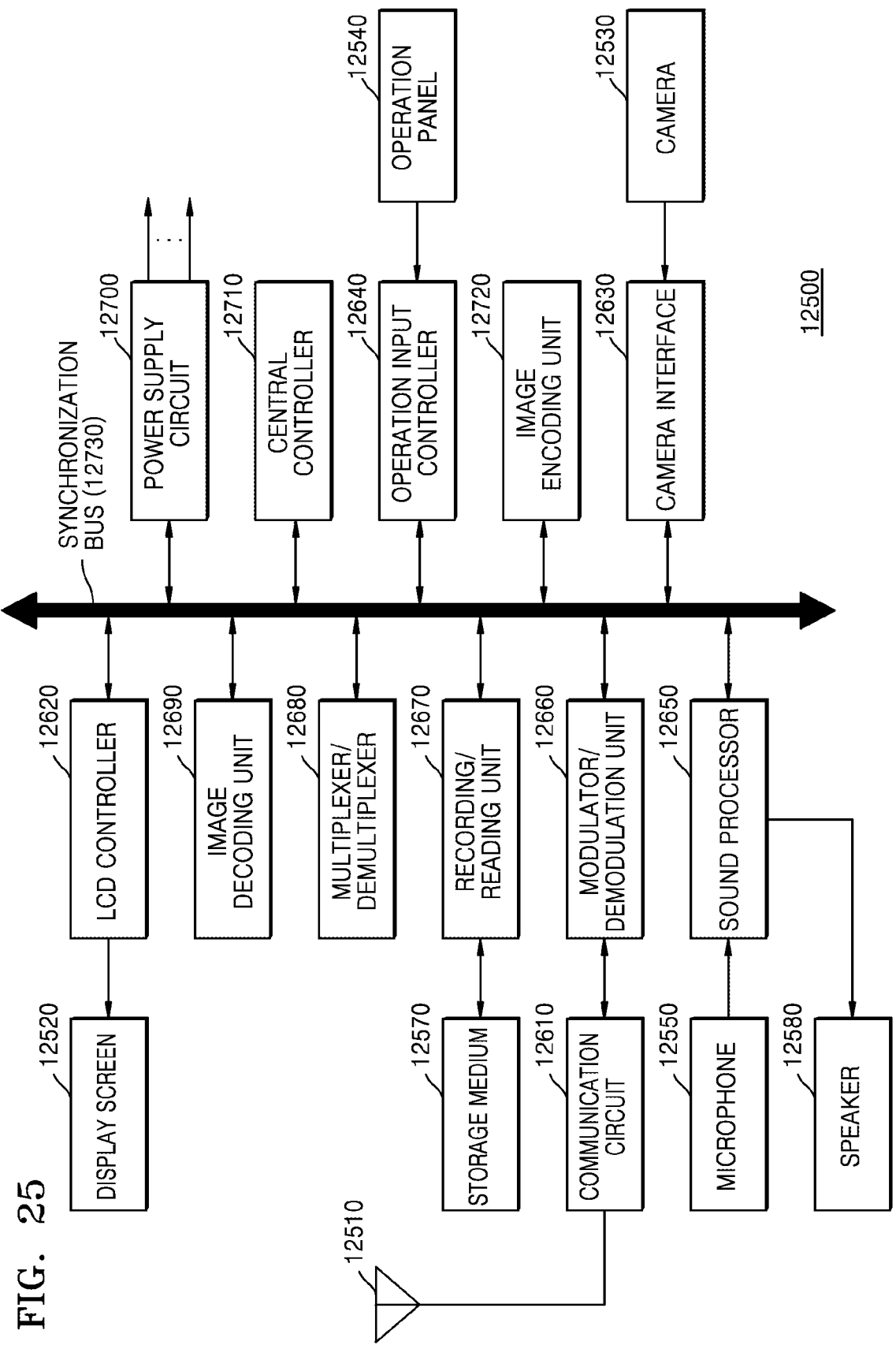
FIG. 25 illustrates an internal structure of the mobile phone.

With reference to FIGS. 24 and 25, the mobile phone 12500 included in the content supply system 11000 according to an embodiment will now be described in detail.

FIG. 24 illustrates an external structure of the mobile phone 12500 to which the video encoding method and the video decoding method of the present disclosure are applied, according to an embodiment. The mobile phone 12500 may be a smart phone, the functions of which are not limited and a large number of the functions of which may be changed or expanded.

The mobile phone 12500 includes an internal antenna 12510 via which a radio-frequency (RF) signal may be exchanged with the wireless base station 12000, and includes a display screen 12520 for displaying images captured by a camera 12530 or images that are received via the antenna 12510 and decoded, e.g., a liquid crystal display (LCD) or an organic light-emitting diode (OLED) screen. The mobile phone 12500 includes an operation panel 12540 including a control button and a touch panel. If the display screen 12520 is a touch screen, the operation panel 12540 further includes a touch sensing panel of the display screen 12520. The mobile phone 12500 includes a speaker 12580 for outputting voice and sound or another type of a sound output unit, and a microphone 12550 for inputting voice and sound or another type of a sound input unit. The mobile phone 12500 further includes the camera 12530, such as a charge-coupled device (CCD) camera, to capture video and still images. The mobile phone 12500 may further include a storage medium 12570 for storing encoded/decoded data, e.g., video or still images captured by the camera 12530, received via email, or obtained according to various ways; and a slot 12560 via which the storage medium 12570 is loaded into the mobile phone 12500. The storage medium 12570 may be a flash memory, e.g., a secure digital (SD) card or an electrically erasable and programmable read only memory (EEPROM) included in a plastic case.

FIG. 25 illustrates an internal structure of the mobile phone 12500. In order to systemically control parts of the mobile phone 12500 including the display screen 12520 and the operation panel 12540, a power supply circuit 12700, an operation input controller 12640, an image encoder 12720, a camera interface 12630, an LCD controller 12620, an image decoder 12690, a multiplexer/demultiplexer 12680, a recording/reading unit 12670, a modulation/demodulation unit 12660, and a sound processor 12650 are connected to a central controller 12710 via a synchronization bus 12730.

If a user operates a power button and sets from a 'power off' state to a 'power on' state, the power supply circuit 12700 supplies power to all the parts of the mobile phone 12500 from a battery pack, thereby setting the mobile phone 12500 to an operation mode.

The central controller 12710 includes a central processing unit (CPU), a read-only memory (ROM), and a random access memory (RAM).

While the mobile phone 12500 transmits communication data to the outside, a digital signal is generated by the mobile phone 12500 by the control of the central controller 12710. For example, the sound processor 12650 may generate a digital sound signal, the video encoder 12720 may generate a digital image signal, and text data of a message may be generated via the operation panel 12540 and the operation input controller 12640. When a digital signal is transmitted to the modulation/demodulation unit 12660 by the control of the central controller 12710, the modulation/demodulation unit 12660 modulates a frequency band of the digital signal, and a communication circuit 12610 performs digital-to-analog conversion (DAC) and frequency conversion on the frequency band-modulated digital sound signal. A transmission signal output from the communication circuit 12610 may be transmitted to a voice communication base station or the wireless base station 12000 via the antenna 12510.

For example, when the mobile phone 12500 is in a conversation mode, a sound signal obtained via the microphone 12550 is converted to a digital sound signal by the sound processor 12650 by the control of the central controller 12710. The generated digital sound signal may be converted to a transmission signal through the modulation/demodulation unit 12660 and the communication circuit 12610, and may be transmitted via the antenna 12510.

When a text message, e.g., email, is transmitted during a data communication mode, text data of the text message is input via the operation panel 12540 and is transmitted to the central controller 12610 via the operation input controller 12640. By the control of the central controller 12610, the text data is transformed into a transmission signal via the modulation/demodulation unit 12660 and the communication circuit 12610 and is transmitted to the wireless base station 12000 via the antenna 12510.

In order to transmit image data during the data communication mode, image data captured by the camera 12530 is provided to the image encoder 12720 via the camera interface 12630. The captured image data may be directly displayed on the display screen 12520 via the camera interface 12630 and the LCD controller 12620.

A structure of the image encoder 12720 may correspond to that of the video encoding apparatus 100 described above. The image encoder 12720 may transform the image data received from the camera 12530 into compressed and encoded image data according to the video encoding method of the present disclosure, and then may output the encoded image data to the multiplexer/demultiplexer 12680. During a recording operation of the camera 12530, a sound signal obtained by the microphone 12550 of the mobile phone 12500 may be transformed into digital sound data via the sound processor 12650, and the digital sound data may be transmitted to the multiplexer/demultiplexer 12680.

The multiplexer/demultiplexer 12680 multiplexes the encoded image data received from the image encoder 12720, together with the sound data received from the sound processor 12650. A result of multiplexing the data may be transformed into a transmission signal via the modulation/demodulation unit 12660 and the communication circuit 12610, and may then be transmitted via the antenna 12510.

While the mobile phone 12500 receives communication data from the outside, frequency recovery and analog-to-digital conversion (ADC) are performed on a signal received via the antenna 12510 to transform the signal into a digital signal. The modulation/demodulation unit 12660 modulates a frequency band of the digital signal. The frequency-band modulated digital signal is transmitted to the video decoder 12690, the sound processor 12650, or the LCD controller 12620, according to the type of the digital signal.

During the conversation mode, the mobile phone 12500 amplifies a signal received via the antenna 12510, and obtains a digital sound signal by performing frequency conversion and ADC on the amplified signal. A received digital sound signal is transformed into an analog sound signal via the modulation/demodulation unit 12660 and the sound processor 12650, and the analog sound signal is output via the speaker 12580 by the control of the central controller 12710.

When during the data communication mode, data of a video file accessed at an Internet website is received, a signal received from the wireless base station 12000 via the antenna 12510 is output as multiplexed data via the modulation/demodulation unit 12660, and the multiplexed data is transmitted to the multiplexer/demultiplexer 12680.

In order to decode the multiplexed data received via the antenna 12510, the multiplexer/demultiplexer 12680 demultiplexes the multiplexed data into an encoded video data stream and an encoded audio data stream. Via the synchronization bus 12730, the encoded video data stream and the encoded audio data stream are provided to the video decoder 12690 and the sound processor 12650, respectively.

A structure of the image decoder 12690 may correspond to that of the video decoding apparatus described above. The image decoder 12690 may decode the encoded video data so as to generate reconstructed video data and provide the reconstructed video data to the display screen 12520 via the LCD controller 12620, by using the aforementioned video decoding method according to the present embodiment.

Thus, the data of the video file accessed at the Internet website may be displayed on the display screen 12520. At the same time, the sound processor 12650 may transform audio data into an analog sound signal, and provide the analog sound signal to the speaker 12580. Thus, audio data contained in the video file accessed at the Internet website may also be reproduced via the speaker 12580.

The mobile phone 12500 or another type of communication terminal may be a transceiving terminal including both the video encoding apparatus and the video decoding apparatus of the present disclosure, may be a transceiving terminal including only the video encoding apparatus of the present disclosure, or may be a transceiving terminal including only the video decoding apparatus of the present disclosure.

A communication system according to an embodiment is not limited to the communication system described above with reference to FIG. 24. For example, FIG. 26 illustrates a digital broadcasting system employing a communication system, according to an embodiment.

Figure 26:
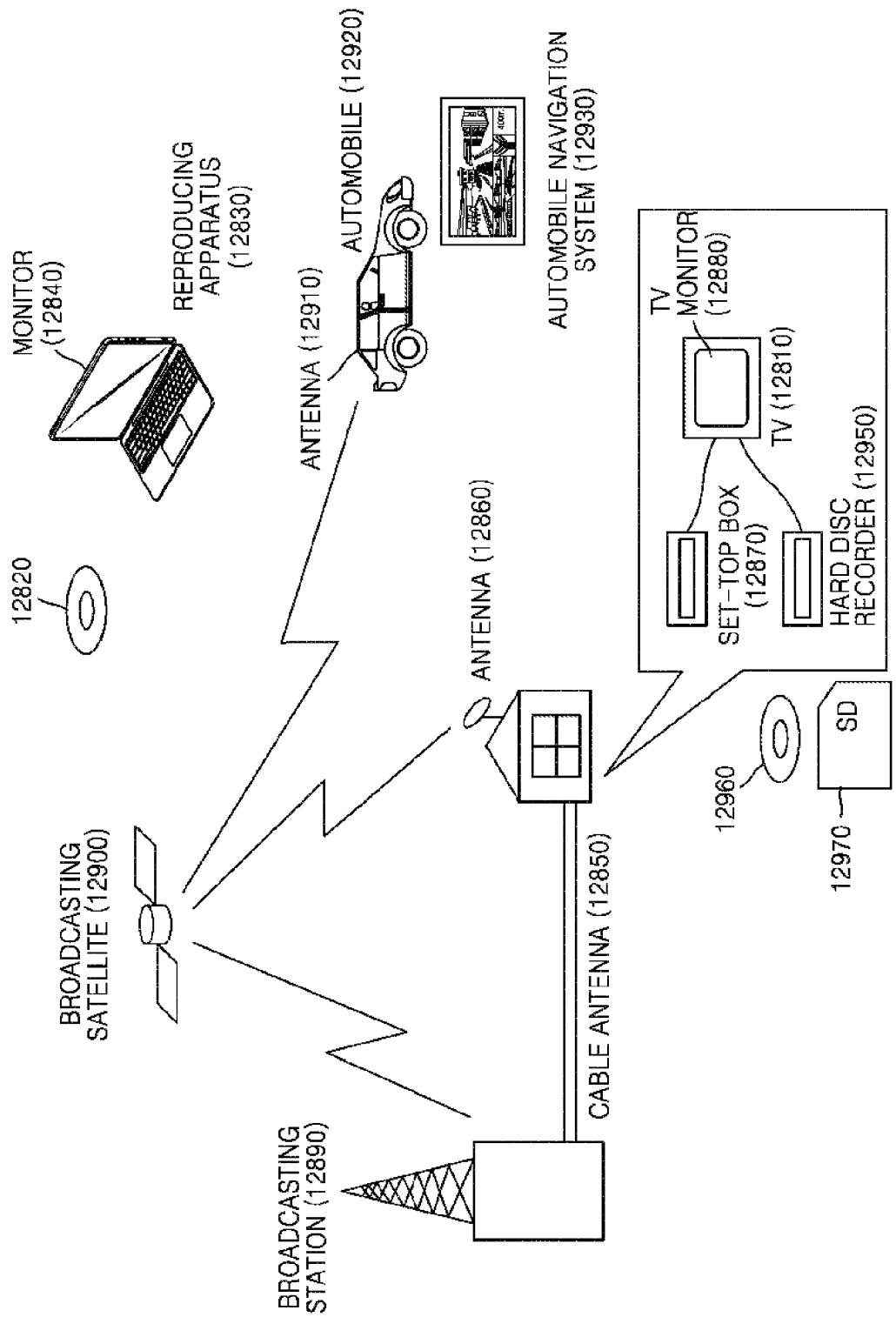
FIG. 26 illustrates a digital broadcasting system employing a communication system, according to an embodiment.

The digital broadcasting system of FIG. 26 according to an embodiment may receive a digital broadcast transmitted via a satellite or a terrestrial network by using the video encoding apparatus and the video decoding apparatus of the present disclosure.

In more detail, a broadcasting station 12890 transmits a video data stream to a communication satellite or a broadcasting satellite 12900 by using radio waves. The broadcasting satellite 12900 transmits a broadcast signal, and the broadcast signal is transmitted to a satellite broadcast receiver via a household antenna 12860. In every house, an encoded video stream may be decoded and reproduced by a TV receiver 12810, a set-top box 12870, or another device.

When the video decoding apparatus according to the present embodiment is implemented in a reproducing apparatus 12830, the reproducing apparatus 12830 may parse and decode an encoded video stream recorded on a storage medium 12820, such as a disc or a memory card to reconstruct digital signals. Thus, the reconstructed video signal may be reproduced, for example, on a monitor 12840.

In the set-top box 12870 connected to the antenna 12860 for a satellite/terrestrial broadcast or a cable antenna 12850 for receiving a cable television (TV) broadcast, the video decoding apparatus of the present disclosure may be installed. Data output from the set-top box 12870 may also be reproduced on a TV monitor 12880.

As another example, the video decoding apparatus according to the present embodiment may be installed in the TV receiver 12810 instead of the set-top box 12870.

An automobile 12220 that has an appropriate antenna 12210 may receive a signal transmitted from the satellite 12200 or the wireless base station 11700. A decoded video may be reproduced on a display screen of an automobile navigation system 12930 installed in the automobile 12920.

A video signal may be encoded by the video encoding apparatus of the present disclosure and may then be recorded to and stored in a storage medium. In more detail, an image signal may be stored in a DVD disc 12960 by a DVD recorder or may be stored in a hard disc by a hard disc recorder 12950. As another example, the video signal may be stored in an SD card 12970. If the hard disc recorder 12950 includes the video decoding apparatus according to the present embodiment, a video signal recorded on the DVD disc 12960, the SD card 12970, or another storage medium may be reproduced on the TV monitor 12880.

The automobile navigation system 12930 may not include the camera 12530, the camera interface 12630, and the video encoder 12720 of FIG. 26. For example, the computer 12100 and the TV receiver 12810 may not include the camera 12530, the camera interface 12630, and the video encoder 12720 of FIG. 26.

FIG. 27 illustrates a network structure of a cloud computing system using the video encoding apparatus and the video decoding apparatus, according to an embodiment.

The cloud computing system may include a cloud computing server 14100, a user database (DB) 14100, a plurality of computing resources 14200, and a user terminal.

The cloud computing system provides an on-demand outsourcing service of the plurality of computing resources 14200 via a data communication network, e.g., the Internet, in response to a request from the user terminal. Under a cloud computing environment, a service provider provides users with desired services by combining computing resources at data centers located at physically different locations by using virtualization technology. A service user does not have to install computing resources, e.g., an application, a storage, an operating system (OS), and security software, into his/her own terminal in order to use them, but may select and use desired services from among services in a virtual space generated through the virtualization technology, at a desired point in time.

A user terminal of a specified service user is connected to the cloud computing server 14000 via a data communication network including the Internet and a mobile telecommunication network. User terminals may be provided cloud computing services, and particularly video reproduction services, from the cloud computing server 14000. The user terminals may be various types of electronic devices capable of being connected to the Internet, e.g., a desktop PC 14300, a smart TV 14400, a smart phone 14500, a notebook computer 14600, a portable multimedia player (PMP) 14700, a tablet PC 14800, and the like.

The cloud computing server 14100 may combine the plurality of computing resources 14200 distributed in a cloud network and provide user terminals with a result of combining. The plurality of computing resources 14200 may include various data services, and may include data uploaded from user terminals. As described above, the cloud computing server 14100 may provide user terminals with desired services by combining video database distributed in different regions according to the virtualization technology.

User information about users who have subscribed for a cloud computing service is stored in the user DB 14100. The user information may include logging information, addresses, names, and personal credit information of the users. The user information may further include indexes of videos. Here, the indexes may include a list of videos that have already been reproduced, a list of videos that are being reproduced, a pausing point of a video that was being reproduced, and the like.

Information about a video stored in the user DB 14100 may be shared between user devices. For example, when a video service is provided to the notebook computer 14600 in response to a request from the notebook computer 14600, a reproduction history of the video service is stored in the user DB 14100. When a request to reproduce the video service is received from the smart phone 14500, the cloud computing server 14000 searches for and reproduces the video service, based on the user DB 14100. When the smart phone 14500 receives a video data stream from the cloud computing server 14000, a process of reproducing video by decoding the video data stream is similar to an operation of the mobile phone 12500 described above with reference to FIG. 24.

The cloud computing server 14000 may refer to a reproduction history of a desired video service, stored in the user DB 14100. For example, the cloud computing server 14000 receives a request to reproduce a video stored in the user DB 14100, from a user terminal. If this video was being reproduced, then a method of streaming this video, performed by the cloud computing server 14000, may vary according to the request from the user terminal, i.e., according to whether the video will be reproduced, starting from a start thereof or a pausing point thereof. For example, if the user terminal requests to reproduce the video, starting from the start thereof, the cloud computing server 14000 transmits streaming data of the video starting from a first frame thereof to the user terminal. If the user terminal requests to reproduce the video, starting from the pausing point thereof, the cloud computing server 14000 transmits streaming data of the video starting from a frame corresponding to the pausing point, to the user terminal.

In this case, the user terminal may include the video decoding apparatus of the present disclosure as described above with reference to FIGS. 1A through 20. As another example, the user terminal may include the video encoding apparatus of the present disclosure as described above with reference to FIGS. 1A through 20. Alternatively, the user terminal may include both the video decoding apparatus and the video encoding apparatus of the present disclosure as described above with reference to FIGS. 1A through 20.

Various applications of the video encoding method, the video decoding method, the video encoding apparatus, and the video decoding apparatus according to embodiments described above with reference to FIGS. 1A through 20 are described above with reference to FIGS. 21 through 27. However, embodiments with respect to methods of storing the video encoding method and the video decoding method in a storage medium or methods of implementing the video encoding apparatus and the video decoding apparatus in a device according to various embodiments described above with reference to FIGS. 1A through 20 are not limited to embodiments described above with reference to FIGS. 21 through 27.

The resulting method, process, apparatus, product, and/or system is straightforward, cost-effective, uncomplicated, highly versatile, and accurate. Also, the process, apparatus, product, and system may be implemented by adapting known components for ready, efficient, and economical manufacturing, application, and utilization. Another important aspect of the present disclosure is that it valuably supports and services the historical trend of reducing costs, simplifying systems, and increasing performance. These and other valuable aspects of an embodiment of the inventive concept consequently further the state of the technology to at least the next level.

While the invention has been described in conjunction with a specific best mode, it is to be understood that many alternatives, modifications, and variations will be apparent to those skilled in the art in light of the foregoing description. That is, it is intended to embrace all such alternatives, modifications, and variations that fall within the scope of the included claims. All matters set forth herein or shown in the accompanying drawings are to be interpreted in an illustrative and non-limiting sense. The resulting method, process, apparatus, product, and/or system is straightforward, cost-effective, uncomplicated, highly versatile, and accurate. Also, the process, apparatus, product, and system may be implemented by adapting known components for ready, efficient, and economical manufacturing, application, and utilization. Another important aspect of the present disclosure is that it valuably supports and services the historical trend of reducing costs, simplifying systems, and increasing performance. These and other valuable aspects of an embodiment of the inventive concept consequently further the state of the technology to at least the next level.

While the invention has been described in conjunction with a specific best mode, it is to be understood that many alternatives, modifications, and variations will be apparent to those skilled in the art in light of the foregoing description. That is, it is intended to embrace all such alternatives, modifications, and variations that fall within the scope of the included claims. All matters set forth herein or shown in the accompanying drawings are to be interpreted in an illustrative and non-limiting sense.

The invention claimed is:

1. A motion vector encoding apparatus comprising:
   a predictor configured to obtain motion vector predictor candidates by using at least one of a spatial candidate block and a temporal candidate block of a current block, and to determine motion vector predictor of the current block among the motion vector predictor candidates, a motion vector of the current block, and a motion vector resolution of the current block; and
   an encoder configured to encode information representing the motion vector predictor of the current block, a residual motion vector between the motion vector of the current block and the motion vector predictor of the current block, and information representing the motion vector resolution of the current block,
   wherein the encoder adaptively down-scales the residual motion vector based on the motion vector resolution of the current block and a minimum motion vector resolution to encode the residual motion vector.

2. The motion vector encoding apparatus of claim 1, wherein the plurality of predetermined motion vector resolutions include a resolution of a pixel unit that is greater than a resolution of one-pel unit.

3. The motion vector encoding apparatus of claim 1, wherein the predictor performs searching in a reference block in pixel units of a first motion vector resolution by using a set of first motion vector candidates including one or more motion vector predictor candidates selected from the motion vector predictor candidates, and
   performs searching in the reference block in pixel units of a second motion vector resolution by using a set of second motion vector candidates including one or more motion vector predictor candidates selected from the motion vector predictor candidates,
   wherein the first motion vector resolution and the second motion vector resolution are different from each other, and
   the set of the first motion vector predictor candidates and the set of the second motion vector predictor candidates are obtained from candidate blocks that are different from each other from among candidate blocks included in the spatial candidate block and the temporal candidate block.

4. The motion vector encoding apparatus of claim 1, wherein the predictor performs searching in a reference block in pixel units of a first motion vector resolution by using a set of first motion vector candidates including one or more motion vector predictor candidates selected from the motion vector predictor candidates, and
   performs searching in the reference block in pixel units of a second motion vector resolution by using a set of second motion vector candidates including one or more motion vector predictor candidates selected from the motion vector predictor candidates,
wherein the first motion vector resolution and the second motion vector resolution are different from each other, and
the set of the first motion vector predictor candidates and the set of the second motion vector predictor candidates include different numbers of motion vector predictors from each other.

5. The motion vector encoding apparatus of claim 1, wherein, when a pixel unit of the motion vector resolution of the current block is greater than a pixel unit of the minimum motion vector resolution, the encoder down-scales the residual motion vector according to the motion vector resolution of the current block to encode the residual motion vector.

6. The motion vector encoding apparatus of claim 1, wherein, when the current block is a current block coding unit of an image, a motion vector resolution is equally determined with respect to each coding unit, and there is a prediction unit that is predicted in an advanced motion vector prediction (AMVP) mode in the current coding unit, the encoder encodes the information indicating a motion vector resolution of the prediction unit predicted in the AMVP mode as information representing the motion vector resolution of the current block.

7. The motion vector encoding apparatus of claim 1, wherein, when the current block is a current block coding unit of an image, a motion vector resolution is equally determined with respect to each prediction unit, and there is a prediction unit that is predicted in an advanced motion vector prediction (AMVP) mode in the current coding unit, the encoder encodes information representing a motion vector resolution for each prediction unit predicted in the AMVP mode in the current block, as information representing the motion vector resolution of the current block.

8. A motion vector decoding apparatus comprising:
an obtainer configured to obtain motion vector predictor candidates by using at least one of a spatial candidate block and a temporal candidate block of a current block, to obtain information representing motion vector predictor of the current block from among the motion vector predictor candidates, and to obtain a residual motion vector between a motion vector of the current block and the motion vector predictor of the current block, and information representing a motion vector resolution of the current block; and
a decoder configured to reconstruct the motion vector of the current block based on the residual motion vector, the information representing the motion vector predictor of the current block, and the information representing the motion vector resolution of the current block,
wherein the decoder adaptively up-scales the residual motion vector based on the motion vector resolution of the current block and a minimum motion vector resolution to reconstruct the residual motion vector.

9. The motion vector decoding apparatus of claim 8, wherein the plurality of predetermined motion vector resolutions include a resolution of a pixel unit that is greater than a resolution of one-pel unit.

10. The motion vector decoding apparatus of claim 8, wherein the motion vector predictor candidates of the plurality of predetermined motion vector resolutions comprise a set of first motion vector predictor candidates including one or more motion vector predictor candidates of a first motion vector resolution and a set of second motion vector predictor candidates including one or more motion vector predictor candidates of a second motion vector resolution,
wherein the first motion vector resolution and the second motion vector resolution are different from each other, and
the set of the first motion vector predictor candidates and the set of the second motion vector predictor candidates are obtained from candidate blocks that are different from each other from among candidate blocks included in the spatial candidate block and the temporal candidate block.

11. The motion vector decoding apparatus of claim 8, wherein the motion vector predictor candidates of the plurality of predetermined motion vector resolutions comprise a set of first motion vector predictor candidates including one or more motion vector predictor candidates of a first motion vector resolution and a set of second motion vector predictor candidates including one or more motion vector predictor candidates of a second motion vector resolution,
wherein the first motion vector resolution and the second motion vector resolution are different from each other, and
the set of the first motion vector predictor candidates include different numbers of motion vector predictor candidates from each other.

12. The motion vector decoding apparatus of claim 8, wherein, when a pixel unit of the motion vector resolution of the current block is greater than a pixel unit of the minimum motion vector resolution, the decoder up-scales the residual motion vector according to the motion vector resolution of the current block to reconstruct the residual motion vector.

13. The motion vector decoding apparatus of claim 8, wherein, when the current block is a current block coding unit of an image, a motion vector resolution is equally determined with respect to each coding unit, and there is a prediction unit that is predicted in an advanced motion vector prediction (AMVP) mode in the current coding unit, the obtainer obtains information representing the motion vector resolution of the prediction unit predicted in the AMVP mode, as information representing the motion vector resolution of the current block, from a bitstream.

14. A method for decoding a motion vector, the method comprising:
obtaining motion vector predictor candidates by using at least one of a spatial candidate block and a temporal candidate block of a current block;
obtaining information representing motion vector predictor of the current block from among the motion vector predictor candidates;
obtaining a residual motion vector between a motion vector of the current block and the motion vector predictor of the current block, and information representing a motion vector resolution of the current block; and
reconstructing the motion vector of the current block based on the residual motion vector, the information representing the motion vector predictor of the current block, and the information representing the motion vector resolution of the current block,
wherein the reconstructing of the motion vector of the current block comprises adaptively up-scaling the residual motion vector based on the motion vector resolution of the current block and a minimum motion vector resolution to reconstruct the residual motion vector.

15. The method of claim 14, wherein the plurality of predetermined motion vector resolutions include a resolution of a pixel unit that is greater than a resolution of one-pel unit.

16. The method of claim 14, wherein the motion vector predictor candidates of the plurality of predetermined motion vector resolutions comprise a set of first motion vector predictor candidates including one or more motion vector predictor candidates of a first motion vector resolution and a set of second motion vector predictor candidates including one or more motion vector predictor candidates of a second motion vector resolution,
- wherein the first motion vector resolution and the second motion vector resolution are different from each other, and
- the set of the first motion vector predictor candidates and the set of the second motion vector predictor candidates are obtained from candidate blocks that are different from each other from among candidate blocks included in the spatial candidate block and the temporal candidate block.

17. The method of claim 14, wherein the motion vector predictor candidates of the plurality of predetermined motion vector resolutions comprise a set of first motion vector predictor candidates including one or more motion vector predictor candidates of a first motion vector resolution and a set of second motion vector predictor candidates including one or more motion vector predictor candidates of a second motion vector resolution,
- wherein the first motion vector resolution and the second motion vector resolution are different from each other, and
- the set of the first motion vector predictor candidates include different numbers of motion vector predictor candidates from each other.

18. The method of claim 14, wherein the reconstructing the motion vector of the current block based on the residual motion vector, the information representing the motion vector predictor of the current block, and motion vector resolution information of the current block comprises,
- when a pixel unit of the motion vector resolution of the current block is greater than a pixel unit of the minimum motion vector resolution, up-scaling the residual motion vector according to the motion vector resolution of the current block to reconstruct the residual motion vector.

19. The method of claim 14, wherein the obtaining the residual motion vector between the motion vector of the current block and the motion vector predictor of the current block and information representing the motion vector resolution of the current block comprises,
- when the current block is a current block coding unit of an image, a motion vector resolution is equally determined with respect to each coding unit, and there is a prediction unit that is predicted in an advanced motion vector prediction (AMVP) mode in the current coding unit, obtaining information representing the motion vector resolution of the prediction unit predicted in the AMVP mode, as information representing the motion vector resolution of the current block, from a bitstream.

20. A non-transitory computer-readable recording medium having recorded thereon a program for performing the method of claim 14.

* * * * *